US012496512B2

(12) United States Patent
Kaku et al.

(10) Patent No.: US 12,496,512 B2
(45) Date of Patent: Dec. 16, 2025

(54) SEAT SYSTEM

(71) Applicant: TS TECH CO., LTD., Asaka (JP)

(72) Inventors: Hiroyuki Kaku, Shioya-gun Tochigi (JP); Takako Miyoshi, Shioya-gun Tochigi (JP); Michinobu Waku, Shioya-gun Tochigi (JP); Marie Soma, Shioya-gun Tochigi (JP); Atsushi Kusano, Shioya-gun Tochigi (JP); Satoru Kaneda, Shioya-gun Tochigi (JP); Munetaka Kowa, Shioya-gun Tochigi (JP); Yosuke Higashi, Shioya-gun Tochigi (JP); Ryuichiro Hirose, Shioya-gun Tochigi (JP); Ryosuke Sato, Shioya-gun Tochigi (JP)

(73) Assignee: TS TECH CO., LTD., Saitama (JP)

( * ) Notice: Subject to any disclaimer, the term of this patent is extended or adjusted under 35 U.S.C. 154(b) by 297 days.

(21) Appl. No.: 18/302,143

(22) Filed: Apr. 18, 2023

(65) Prior Publication Data

US 2023/0256328 A1 Aug. 17, 2023

Related U.S. Application Data

(63) Continuation of application No. PCT/JP2021/037271, filed on Oct. 8, 2021.

(30) Foreign Application Priority Data

Oct. 19, 2020 (JP) ................................ 2020-175078
Oct. 19, 2020 (JP) ................................ 2020-175108
(Continued)

(51) Int. Cl.
*A63F 13/218* (2014.01)
*A63F 13/214* (2014.01)
(Continued)

(52) U.S. Cl.
CPC .......... *A63F 13/218* (2014.09); *A63F 13/214* (2014.09); *A63F 13/24* (2014.09); *A63F 13/26* (2014.09); *A63F 13/56* (2014.09)

(58) Field of Classification Search
CPC ........ A63F 13/20; A63F 13/21; A63F 13/211; A63F 13/218; A63F 13/24; A63F 13/26;
(Continued)

(56) References Cited

U.S. PATENT DOCUMENTS 6,329,620 B1 12/2001 Oishi et al.
6,450,886 B1 9/2002 Oishi et al.
(Continued)

FOREIGN PATENT DOCUMENTS

JP S61115116 A 6/1986
JP 2000134503 A 5/2000
(Continued)

OTHER PUBLICATIONS

Notice of Reasons for Refusal issued for Japanese Patent Application No. 2020-175108, Dispatch Date: Apr. 16, 2024, 6 pages including English machine translation.
(Continued)

*Primary Examiner* — Omkar A Deodhar
(74) *Attorney, Agent, or Firm* — HSML P.C.

(57) ABSTRACT

A seat system includes a seat, a controller, and a terminal. The seat includes a seat body, and a plurality of sensors configured to acquire information for use in detecting a motion of a user seated on the seat body. The controller is configured to acquire the information from the sensors. The terminal comprises a screen. The controller is configured to cause an object operated by the user to move based on the information acquired from the sensors, and to cause a movable object on the screen to move according to a motion of the object operated by the user.

24 Claims, 40 Drawing Sheets

(30) Foreign Application Priority Data

| | | |
|---|---|---|
| Mar. 9, 2021 | (JP) | 2021-036848 |
| Mar. 11, 2021 | (JP) | 2021-039336 |
| Mar. 24, 2021 | (JP) | 2021-049473 |

(51) Int. Cl.

| | |
|---|---|
| ***A63F 13/24*** | (2014.01) |
| ***A63F 13/26*** | (2014.01) |
| ***A63F 13/56*** | (2014.01) |

(58) Field of Classification Search

CPC .......... A63F 13/28; A63F 13/50; A63F 13/56; A63F 13/90

See application file for complete search history.

(56) References Cited

U.S. PATENT DOCUMENTS

| | | | | |
|---|---|---|---|---|
| 10,203,925 | B2 | 2/2019 | Nonaka et al. | |
| 10,457,179 | B1 * | 10/2019 | Kentley-Klay | B60N 2/879 |
| 11,055,048 | B2 | 7/2021 | Nonaka et al. | |
| 11,235,709 | B2 | 2/2022 | Lee et al. | |
| 11,504,626 | B2 | 11/2022 | Kaku et al. | |
| 11,541,780 | B2 | 1/2023 | Kaku | |
| 2001/0009037 | A1 | 7/2001 | Komata | |
| 2015/0379777 | A1 | 12/2015 | Sasaki | |
| 2018/0101350 | A1 | 4/2018 | Nonaka et al. | |
| 2019/0129678 | A1 | 5/2019 | Nonaka et al. | |
| 2020/0377036 | A1 * | 12/2020 | Lee | A63F 13/245 |
| 2021/0039537 | A1 | 2/2021 | Kaku et al. | |
| 2021/0188131 | A1 | 6/2021 | Kaku | |
| 2022/0111296 | A1 | 4/2022 | Kaku et al. | |
| 2022/0242292 | A1 | 8/2022 | Kaku et al. | |
| 2023/0016690 | A1 | 1/2023 | Kaku et al. | |
| 2023/0088875 | A1 | 3/2023 | Kaku | |

FOREIGN PATENT DOCUMENTS

| | | | |
|---|---|---|---|
| JP | 2000293292 | A | 10/2000 |
| JP | 2003519559 | A | 6/2003 |
| JP | 2004-085435 | A | 3/2004 |
| JP | 2006296737 | A | 11/2006 |
| JP | 2010187834 | A | 9/2010 |
| JP | 2011248465 | A | 12/2011 |
| JP | 2014174589 | A | 9/2014 |
| JP | 2017065504 | A | 4/2017 |
| JP | 2018060438 | A | 4/2018 |
| JP | 2018118597 | A | 8/2018 |
| JP | 2019077220 | A | 5/2019 |
| JP | 2019151251 | A | 9/2019 |
| JP | 2019153135 | A | 9/2019 |
| JP | 2020-066404 | A | 4/2020 |
| JP | 2020083210 | A | 6/2020 |

OTHER PUBLICATIONS

Notice of Reasons for Refusal issued for Japanese Patent Application No. 2020-175078, Dispatch Date: Apr. 16, 2024, 12 pages including English machine translation.

Afrika, Weekly Famitsu, Sep. 12, 2008, vol. 23, No. 37, pp. 130-135, in particular, p. 133 (14 pages including partial English translation).

Red Dead Redemption 2, Weekly Famitsu, Nov. 15, 2018, vol. 33, No. 48, pp. 152-155, in particular, p. 155 (8 pages including partial English translation).

International Search Report issued for International Patent Application No. PCT/JP2021/037271, Date of mailing: Dec. 28, 2021, 14 pages including English translation.

Written Opinion issued for International Patent Application No. PCT/JP2021/037271, Date of mailing: Dec. 28, 2021, 15 pages including English translation.

Notice of Reasons for Refusal issued for Japanese Patent Application No. 2020-175108, Dispatch date: Jul. 23, 2024, 8 pages including English machine translation.

Notice of Reasons for Refusal issued for Japanese Patent Application No. 2021-039336, Dispatch date: Oct. 1, 2024, 8 pages including English machine translation.

Notice of Reasons for Refusal issued for Japanese Patent Application No. 2021-036848, Dispatch date: Jan. 21, 2025, 4 pages including English machine translation.

Decision of Refusal issued for Japanese Patent Application No. 2021-039336, Dispatch date: Feb. 18, 2025, 8 pages including English machine translation.

* cited by examiner

SEAT SYSTEM

REFERENCE TO RELATED APPLICATIONS

This application is a continuation application of International Application No. PCT/JP2021/037271 filed on Oct. 8, 2021 which claims priority from Japanese Patent Application Nos. 2020-175078 and 2020-175108 filed on Oct. 19, 2020, Japanese Patent Application No. 2021-036848 filed on Mar. 9, 2021, Japanese Patent Application No. 2021-039336 filed on Mar. 11, 2021, and Japanese Patent Application No. 2021-049473 filed on Mar. 24, 2021. The disclosures of these applications are incorporated herein by reference in their entirety.

TECHNICAL FIELD

The present disclosure relates to a seat system comprising a sensor.

BACKGROUND ART

A vehicle seat conventionally known in the art includes a plurality of pressure sensors provided on the seat to detect a sitting posture of an occupant seated on the seat (JP 2017-65504 A).

Devices for providing experiences are also known in the art which use seats including a plurality of sensors. Such devices include a device for experiencing an appropriate sitting posture (JP 2019-077220 A), a device for experiencing a foot-lifting activity (JP 2019-151251 A), and a device for experiencing a 100-meter dash game (JP 2019-153135 A).

A car seat system known in the art includes a footrest and moves the footrest or a seat up and down to allow an occupant to be seated in an optimal posture (JP 2018-118597 A). Such a seat system includes a pressure detecting means for the footrest, and two seat-pressure detection means for the seat bottom respectively located at the front and at the rear of the seat bottom. The height of the footrest or the seat is adjusted so that the differences between a pressure detected by the pressure detecting means for the footrest and the pressures detected by the seat-pressure detection means are reduced.

A seat cushion known in the art comprises a first cushion placed on a seat bottom of a seat such as a chair, and a second cushion placed on a backrest of the seat (JP 2006-296737 A). In such art, the second cushion comprises a plurality of fixing belts. One end of each fixing belt is sewed onto a left side or a right side of the second cushion at positions opposed to each other, and the other end of each fixing belt includes a hook-and-loop fastener. The second cushion can be fixed to the backrest by wrapping the fixing belt around the rear side of the backrest and fastening the hook-and-loop fasteners.

DESCRIPTION

The vehicle seat described in JP 2017-65504 A only evaluates and presents the sitting posture of the occupant, thus the effective use of the vehicle seat is an issue. It is desirable to improve the entertainability of the seat in an attempt to suggest a new value for the seat.

In the devices described in JP 2019-077220 A, JP 2019-151251 A, and JP 2019-153135 A, the performance of the occupant seated on the seat can only be perceived by an indication displayed on a screen or a sound. It is desirable to provide a seat system capable of providing an experience on the seat perceivable by various bodily sensations.

The inventors and their colleagues have been contemplating a system that detects motions of an occupant seated on a seat using pressure sensors provided on the seat, and that can be applied to various devices. In such a system, it is an important aspect to set a height of a seat bottom or a footrest at an appropriate height according to the purpose. However, since the seat-pressure detection means is only provided at the front and at the rear of the seat bottom in the art described, for example, in JP 2018-118597 A, it is not possible to set the height of the seat bottom or the footrest at an appropriate height to make the pressure exerted by each leg of the occupant an appropriate value. Thus, it is desirable to provide a seat system appropriate for detecting motions of the legs of the occupant.

It is also desirable to be able to remove a seat cushion from a seat and carry the seat cushion and/or to make and keep the seat cushion to assume a compact state such as when storing the seat cushion. On the other hand, providing a fastener or the like to keep the seat cushion in the compact state will undesirably increase the number of components. It is desirable to keep the seat cushion in a compact state, and also restrain the number of components from increasing.

Thus, in one aspect, a seat system disclosed herein comprises a seat, a controller, and a terminal. The seat comprises a seat body, and a plurality of sensors configured to acquire information for use in detecting a motion of a user seated on the seat body. The controller is configured to acquire the information from the sensors. The terminal comprises a screen. The controller is configured to cause an object operated by the user to move based on the information acquired from the sensors, and to cause a movable object on the screen to move according to a motion of the object operated by the user.

According to this configuration, since the movable object on the screen is moved in response to the movement of the object operated by the user, i.e., the motion of the movable object is determined based on the motion of the object operated by the user, the entertainability of the seat S can be improved.

The movable object may be a character representing an animal. The controller may be configured such that if it is determined, based on the information acquired from the sensors, that the user has made a first motion to feed the character, a food icon for the animal is displayed on the screen and the character is moved toward a location of the food icon.

According to this configuration, since the animal on the screen comes closer to the food when the user makes the first motion on the seat to feed the animal, the actual behavior of the animal can be simulated, and thus the entertainability of the seat can be improved.

The movable object may be a character representing an animal. The controller may be configured such that if it is determined, based on the information acquired from the sensors, that the user has made a second motion to attack the character, an image indicating an attack is displayed on the screen and the character is caused to run away or to fall to the ground.

According to this configuration, since the user can repel the animal on the screen by making a second motion on the seat to attack the animal, the entertainability of the seat can be improved.

The movable object may be a character representing an animal. The controller may be configured such that if it is determined that an output value from the sensors has not changed, the character on the screen is increased in number, and if it is determined that the output value from the sensors has changed, the character is caused to run away.

According to this configuration, since the animal on the screen increases in number when the user does not move on the seat, i.e., is not making a motion that scares the animal, and the animal on the screen runs away when the user moves on the seat, the actual behavior of the animal can be simulated.

The controller may be configured such that if an amount of fluctuation per unit time in an output value of the sensors is greater than a predetermined value, it is determined that the user is surprised and an image indicating a surprise is displayed on the screen.

According to this configuration, since other people can know via the screen that the user is surprised, entertainability can be improved.

The controller may be configured such that if it is determined that the user is surprised, the character on the screen is increased in number.

According to this configuration, since the character increases in number when the user is surprised, a game can be provided in which the user tries, for example, not to be surprised so that the character does not increase in number, and thereby entertainability can be improved.

The terminal may comprise a first screen, and a second screen disposed on the right of the first screen. The controller may be configured such that if it is determined, based on the information acquired from the sensors, that the object operated by the user is located at a right end of the first screen and is heading to the right, the object operated by the user is moved onto the second screen.

According to this configuration, the object operated by the user can be moved across two screens.

In another aspect, a seat system disclosed herein comprises a seat body, a sensor, an actuator, and a controller. The seat body comprises a seat bottom and a backrest. The sensor is located at the seat body and configured to acquire a measurement value for use in detecting a motion of a user seated on the seat body. The actuator is provided at the seat body and configured to move a seating surface of the seat body in contact with the user. The controller is connected to the sensor and capable of acquiring the measurement value from the sensor.

The controller is configured to instruct the user to assume a predetermined posture or to make a predetermined motion, and to move the actuator to move the seating surface on the condition that the measurement value acquired by the sensor has changed or has not changed.

According to this configuration, since the seating surface is moved by the actuator on the condition that the measurement value has changed or has not changed, the user can experience the seat system while feeling various stimulations received from the seat body.

In still another aspect, a seat system disclosed herein comprises a seat body, a plurality of sensors, a height-adjustment mechanism, and a controller. The seat body comprises a seat bottom. The plurality of sensors are provided at the seat bottom, and configured to detect pressures exerted on a seating surface of the seat bottom. The height-adjustment mechanism is configured to change a height of the seat bottom. The controller controls the height-adjustment mechanism based on pressures detected by the pressure sensors. The plurality of pressure sensors include a front-right sensor located frontward in the front-rear direction and rightward in the left-right direction of a midsection of the seating surface of the seat bottom, and a front-left sensor located frontward in the front-rear direction and leftward in the left-right direction of the midsection of the seating surface of the seat bottom. The controller controls the height-adjustment mechanism to change the height of the seat bottom such that pressures detected by the front-right sensor and the front-left sensor satisfy a predetermined condition.

According to this configuration, since the seat bottom comprises the front-right sensor and the front-left sensor, and the controller controls the height-adjustment mechanism such that the pressures detected by the front-right sensor and the front-left sensor satisfy a predetermined condition, it is possible to locate the seat bottom at an appropriate height for detecting the motions of the legs of the occupant. Thus, it is possible to accurately detect the motions of the legs of the occupant.

The controller may be configured, if the pressures detected by the front-right sensor and the front-left sensor are equal to or smaller than a predetermined value, to move the seat bottom upward, and to stop the seat bottom when amounts of change per unit time in the pressures detected by the front-right sensor and the front-left sensor become equal to or smaller than a first threshold.

The controller may be configured, if the pressures detected by the front-right sensor and the front-left sensor are not equal to or smaller than the predetermined value, to move the seat bottom downward until amounts of change per unit time in the pressures detected by the front-right sensor and the front-left sensor become equal to or greater than a second threshold and then to move the seat bottom upward, and to stop the seat bottom when the amounts of change per unit time in the pressures detected by the front-right sensor and the front-left sensor become equal to or smaller than a first threshold.

In yet another aspect, a seat system disclosed herein comprises a seat body, a plurality of sensors, a footrest, a footrest-adjustment mechanism, and a controller. The seat body comprises a seat bottom. The plurality of sensors are provided at the seat bottom, and configured to detect pressures exerted on a seating surface of the seat bottom. The footrest supports a foot of an occupant seated on the seat bottom. The footrest-adjustment mechanism is configured to change a height of the footrest relative to the seat bottom. The controller controls the footrest-adjustment mechanism based on pressures detected by the pressure sensors. The plurality of pressure sensors include a front-right sensor located frontward in the front-rear direction and rightward in the left-right direction of a midsection of the seating surface of the seat bottom, and a front-left sensor located frontward in the front-rear direction and leftward in the left-right direction of the midsection of the seating surface of the seat bottom. The controller controls the footrest-adjustment mechanism to change the height of the footrest such that pressures detected by the front-right sensor and the front-left sensor satisfy a predetermined condition.

According to this configuration, since the seat bottom comprises the front-right sensor and the front-left sensor, and the controller controls the footrest-adjustment mechanism such that the pressures detected by the front-right sensor and the front-left sensor satisfy a predetermined condition, it is possible to locate the footrest at an appropriate height for detecting the motions of the legs of the occupant. Thus, it is possible to accurately detect the motions of the legs of the occupant.

The controller may be configured, if the pressures detected by the front-right sensor and the front-left sensor are equal to or smaller than a predetermined value, to move the footrest downward, and to stop the footrest when amounts of change per unit time in the pressures detected by the front-right sensor and the front-left sensor become equal to or smaller than a first threshold.

The controller may be configured, if the pressures detected by the front-right sensor and the front-left sensor are not equal to or smaller than the predetermined value, to move the footrest upward until amounts of change per unit time in the pressures detected by the front-right sensor and the front-left sensor become equal to or greater than a second threshold and then to move the footrest downward, and to stop the footrest when the amounts of change per unit time in the pressures detected by the front-right sensor and the front-left sensor become equal to or smaller than a first threshold.

The first threshold is preferably, but not necessarily, a value greater than zero.

According to this configuration, since the pressure values detected by the front-right sensor and the front-left sensor easily change when the occupant moves his/her legs up and down, it is easier to detect the motions of the legs of the occupant.

The controller may be configured to determine that a right leg of an occupant seated on the seat body has been lifted based on a pressure detected by the front-right sensor decreasing, and determine that a left leg of the occupant seated on the seat body has been lifted based on a pressure detected by the front-left sensor decreasing.

In still another aspect, a seat disclosed herein may be applied to the seat systems described above and functions as a controller for operating an operable object. The seat comprises a seat body and a sensor. The sensor is configured to acquire information in use for detecting a motion of a user seated on the seat body.

The surface of the seat body has a design that resembles an operating portion of a controller, and the sensor is located in a position in correspondence with the design.

According to this configuration, since the user can operate an operable object by making a motion corresponding to the design, located on the surface of the seat body, that resembles the operating portion of the controller, the entertainability of the seat can be improved.

In yet another aspect, a seat cushion disclosed herein may be applied to the seat systems described above. The seat cushion is placed on a seat comprising seat bottom and a backrest, and comprises a first cushion placed on the seat bottom, and a second cushion placed on the backrest. The first cushion has a seating surface facing an occupant, and a mounting surface facing the seat bottom. The first cushion comprises a first band and a first to-be-fixed portion. The first band extends from one of a right side portion and a left side portion of the first cushion, and comprises a first fixing portion fixed to another of the right side portion and the left side portion. The first to-be-fixed portion is disengageably engaged with the first fixing portion. When the seat cushion is in a state for storage, the first band allows the first fixing portion to be engaged with the first to-be-fixed portion, with the second cushion being sandwiched between the first band and the seating surface. When the seat cushion is placed on the seat bottom, the first band allows the first fixing portion to be engaged with the first to-be-fixed portion, with the seat bottom being sandwiched between the first band and the mounting surface.

According to this configuration, the first band comprising the first fixing portion, and the first to-be-fixed portion disengageably engaged with the first fixing portion allows the seat cushion to be stored in a compact state, and to be fixed to the seat bottom of the seat. In this way, the number of components of the seat cushion can be restrained from increasing while keeping the seat cushion compact.

In the above-described seat cushion, the first cushion may further comprise a first ancillary band extending from the another of the right side portion or the left side portion of the first cushion, and the first to-be-fixed portion may be provided on the first ancillary band.

According to this configuration, since it becomes easier to engage the first fixing portion with the first to-be-fixed portion, storage and attachment of the seat cushion can be made easier.

In the above-described seat cushion, the sensors may comprise a sensor provided at the first cushion for detecting the occupant, and a sensor provided at the second cushion for detecting the occupant.

According to this configuration, a system using the sensors can be implemented in a simple manner by placing the seat cushion on, for example, an already-existing chair.

In the above-described seat cushion, the sensors may be pressure sensors.

In the above-described seat cushion, the first cushion and the second cushion may be configured such as to comprise outer coverings, the outer coverings including a first line formed by a seam extending in a left-right direction, and a second line formed by a seam extending in a direction intersecting the left-right direction, and at least one of the sensors is located at a position in which the first line intersects the second line.

According to this configuration, the positions of the sensors may be made easy to identify.

The above-described seat cushion may further comprise a first wiring that extends from the second cushion and is connected to the sensor of the second cushion, and a cover that covers a post of the backrest and the first wiring disposed along the post when the second cushion is placed on the backrest.

According to this configuration, the first wiring connected to the sensor can be protected by the cover.

The above-described seat cushion may be configured to further comprise a controller connected to the sensor of the first cushion and the sensor of the second cushion, wherein when the seat cushion is placed on the seat bottom and the controller is located under the seat bottom, the first band allows the first fixing portion to be engaged with the first to-be-fixed portion, with the seat bottom and the controller being sandwiched between the first band and the mounting surface.

According to this configuration, the controller can be fixed to the seat bottom of the seat by the first band. The number of components of the seat cushion can thereby be restrained from increasing.

In the above-described seat cushion, the second cushion may be configured to comprise a second band extending from an upper end of the second cushion and comprising a second fixing portion fixed to a lower end of the second cushion, a second to-be-fixed portion disengageably engaged with the second fixing portion, and an opposing surface facing the backrest, wherein the second band is engaged with the second to-be-fixed portion, with the backrest being sandwiched between the second band and the opposing surface.

According to this configuration, it is possible to fix the second cushion on the backrest of the seat. The seat cushion is thereby more securely fixed to the seat.

In the above-described seat cushion, the second cushion may be configured to further comprise a second ancillary band extending from the lower end of the second cushion, wherein the second to-be-fixed portion is provided on the second ancillary band.

According to this configuration, since it is easier to engage the second fixing portion with the second to-be-fixed portion, attachment of the seat cushion can be made easier.

In the above-described seat cushion, the first fixing portion and the first to-be-fixed portion may form a slide fastener, and the slide fastener may comprise a two-sided slider The above aspects, other advantages and further features will become more apparent by describing in detail illustrative, non-limiting embodiments thereof with reference to the accompanying drawings, in which.

FIRST EXAMPLE

Figure 1:
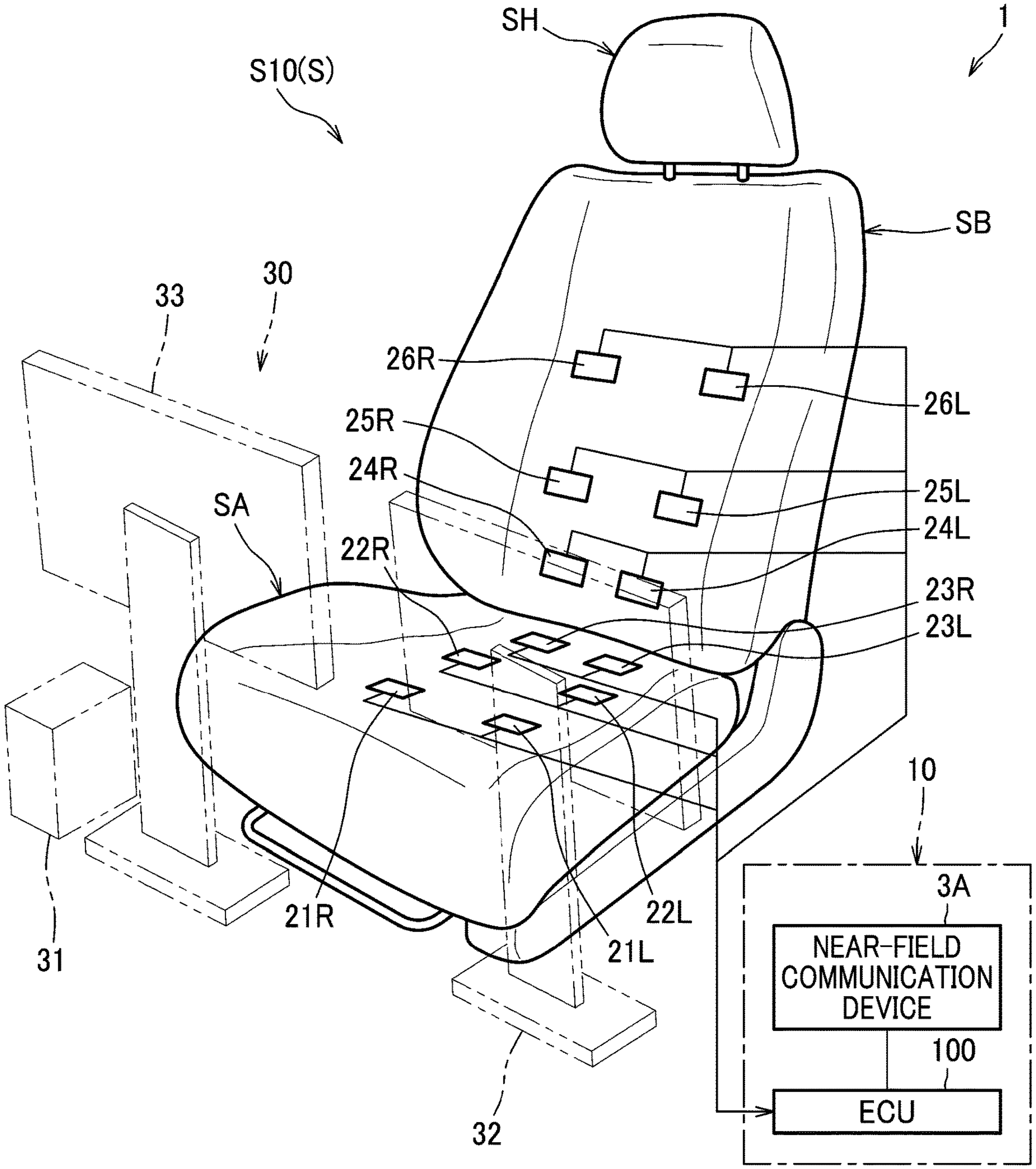
FIG. 1 is an illustration of a seat system (seat experience system) according to a first example.

A first example of a seat system will be described in detail referring to the drawings where appropriate.

As shown in FIG. 1, a seat experience system 1 as the seat system of the first example comprises a seat S, and a seat experience device 10.

The seat S comprises a seat body S10, and pressure sensors 21 to 26. The seat body S10 comprises a seat bottom SA, a backrest SB, and a headrest SH. The seat bottom SA and the backrest SB have outer coverings under which a plurality of pressure sensors 21 to 26 are provided. The pressure sensors 21 to 26 are sensors for detecting motions of a user seated on the seat body S10.

The pressure sensors 21 to 26 are arranged to be capable of detecting a state of a seating surface facing the user seated on the seat body S10. The pressure sensors 21 to 26 acquire values of pressure from the user seated on the seat body S10.

The respective pressure sensors 21 to 26 are provided in pairs, i.e., each located left and right, symmetric with respect to a laterally central position of the seat S. In the following description and drawings, pressure sensors 21 to 26 located on the left side may be identified by reference characters with “L” appended thereto, and pressure sensors 21 to 26 located on the right side may be identified by reference characters with “R” appended thereto. The pressure sensors 21 to 26 located on the left are also referred to as “left sensors” and the pressure sensors 21 to 26 located on the right are also referred to as “right sensors” in the following description.

The pressure sensors 21 to 23 are provided in the seat bottom SA.

The pressure sensors 21 are provided in positions under the thighs of the user and are capable of determining values of pressure from the thighs of the user.

The pressure sensors 22 and the pressure sensors 23 measure pressure from the buttocks of the user. Since the pair of pressure sensors 22 and the pair of pressure sensors 23 both measure pressure from the buttocks of the user, only one pair may be provided.

The pressure sensors 22 and the pressure sensors 23 are located rearward of and distanced far from the pressure sensors 21. Specifically, the pressure sensors 23 are provided in positions corresponding to the lowermost portions of ischial bones of the user. These positions are subjected to the largest load of the user. The pressure sensors 22 are located a little frontward of the pressure sensors 23.

The pressure sensors 24 to 26 are provided in the backrest SB. The pressure sensors 24 are provided in positions corresponding to the back of the lumbar region of the user.

The pressure sensors 25 are located at positions a little higher than the positions of the pressure sensors 24.

The pair of pressure sensors 24 and the pair of pressure sensors 25 both measure pressure from the lumbar region of the user; thus, only one pair may be provided.

The pressure sensors 26 are located above and distanced far from the pressure sensors 24 and the pressure sensors 25. The pressure sensors 26 are located at positions corresponding to the shoulders of the user, and are capable of determining values of pressure from the shoulders of the user.

In this example, the seat experience system 1 provides a safari game using the pressure sensors 21 to 26. The safari game is a game in which various animals appear in grassland, and an object operated by the user can interact with pettable animals and/or repel beasts of prey.

The seat experience device 10 comprises an electronic control unit (ECU) 100 and a terminal 30. The terminal 30 comprises a controller 31, a first display device 32, and a second display device 33.

A near-field communication device 3A which enables near-field wireless communication, such as Bluetooth (registered trademark), Wi-Fi (registered trademark), etc. is connected to the ECU 100. The ECU 100 is connected to the pressure sensors 21 to 26. In this example, the ECU 100 and the near-field communication device 3A is provided at the seat body S10.

The ECU 100 and the controller 31 each include a central processing unit (CPU), a read-only memory (ROM), a random-access memory (RAM), a rewritable nonvolatile memory, etc. (not shown), and execute a pre-stored program. The ECU 100 has a function of transmitting measurement values acquired from the pressure sensors 21 to 26 to the controller 31 via the near-field communication device 3A.

Figure 8A:
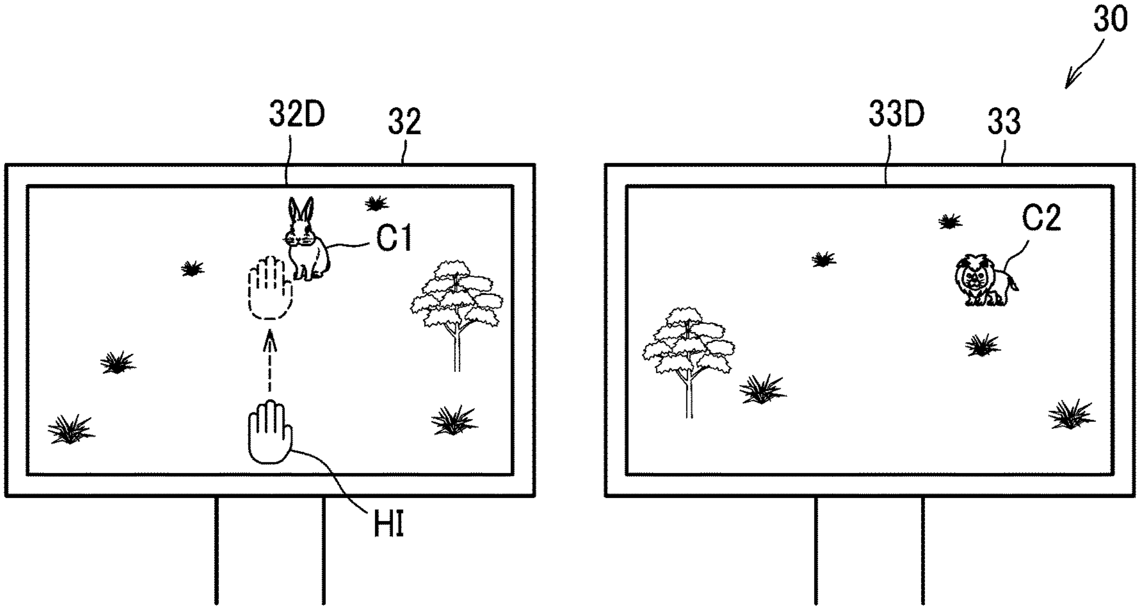
FIG. 8A is an illustration of a grassland image shown during the safari game.

Each display device 32, 33 has, as shown in FIG. 8A, a screen 32D, 33D that displays an image. Specifically, the first display device 32 has a first screen 32D, and the second display device 33 has a second screen 33D. The screens 32D, 33D are touch panels including buttons displayed thereon which are operable by the user to start the safari game and to perform other operations.

Referring back to FIG. 1, the display devices 32, 33 are arranged side-by-side in the left-right direction in front of the seat body S10 with the screens 32D, 33D facing the seat body S10. Specifically, the second display device 33 is located on the right side of the first display device 32.

The controller 31 of the terminal 30 operates according to programs and thereby functions as means for executing the safari game. In the following description, the functions and operations of “the controller 31 of the terminal 30” are described simply as the functions and operations of the terminal 30.

The terminal 30 has functions of acquiring measurement values from the pressure sensors 21 to 26 via the ECU 100 and other components, and operating a hand icon HI shown in FIG. 8A on the screens 32D, 33D. Herein, the hand icon HI is an object operated by the user (user-operated object), and is shown as a graphical representation of a human hand. In the safari game, the user-operated object is normally the hand icon HI. However, the user-operated object may change according to the situation of the game.

The terminal 30 has a function of determining motions of a first character C1 and a second character C2 based on a motion of the user-operated object. The first character C1 and the second character C2 are examples of objects moving on the screens 32D, 33D. Herein, the first character C1 is a graphical representation of a pettable animal such as a rabbit or the like and the second character C2 is a graphical representation of a beast of prey such as a lion or the like.

In a vast grassland image in which animals appear here and there, the terminal 30 has a function of causing the hand icon HI to move upward, downward, rightward, and leftward as shown in FIG. 8A, based on pressure values acquired from the pressure sensors 21 to 26. When it is determined, based on pressure values acquired from the pressure sensors 21 to 26, that the hand icon HI is located at a right end of the first screen 32D and is heading rightward, the terminal 30 is configured to cause the hand icon HI to move onto the second screen 33D. When it is determined, based on pressure values acquired from the pressure sensors 21 to 26, that the hand icon HI is located at a left end of the second screen 33D and is heading leftward, the terminal 30 is configured to cause the hand icon HI to move onto the first screen 32D.

When a distance from the hand icon HI to the first character C1 becomes equal to or shorter than a predetermined distance in the grassland image shown in FIG. 8A, the terminal 30 is configured to execute an interaction process for playing a game which allows the user to interact with pettable animals. When a distance from the hand icon HI to the second character C2 becomes equal to or shorter than a predetermined distance in the grassland image shown in FIG. 8A, the terminal 30 is configured to execute a repel process for playing a game which allows the user to repel beasts of prey.

When it is determined in the interaction process that the user has made a first motion to feed the first character C1, the terminal 30 has a functions of displaying on the first screen 32D or the second screen 33D a food icon FI representing food for the animal (see FIG. 8B) and causing the first character C1 to move toward the position of the food icon FI. In the following description, the first motion is also referred to as "feeding motion".

When it is determined in the interaction process that output values from the pressure sensors 21 to 26 have not changed, the terminal 30 has a function of causing the first character C1 on the first screen 32D or the second screen 33D to increase in number. When it is determined that the output values from the pressure sensors 21 to 26 have changed, more specifically, the output values from the pressure sensors 21 to 26 have changed in a manner different from that when the first motion was made during the interaction process, the terminal 30 has a function of causing the first character(s) C1 to run away.

When it is determined in the repel process, based on the pressure values acquired from the pressure sensors 21 to 26, that the user has made a second motion to attack the second character C2, the terminal 30 has functions of causing an image indicating an attack to be displayed on the first screen 32D or the second screen 33D and causing the second character C2 to run away. In the following description, the second motion is also referred to as "attacking motion".

When amounts of fluctuation per unit time in output values of the pressure sensors 21 to 26 are equal to or greater than a predetermined value in the repel process, the terminal 30 has functions of determining that the user is surprised and causing an image indicating the surprise to be displayed on the first screen 32D or the second screen 33D. In this example, the image indicating the surprise is an image showing the number of times the user has been surprised. When it is determined in the repel process that the user is surprised, the terminal 30 has a function of causing the second character C2 on the first screen 32D or the second screen 33D to increase in number.

Next, the operation of the terminal 30 will be described in detail.

Figure 2:
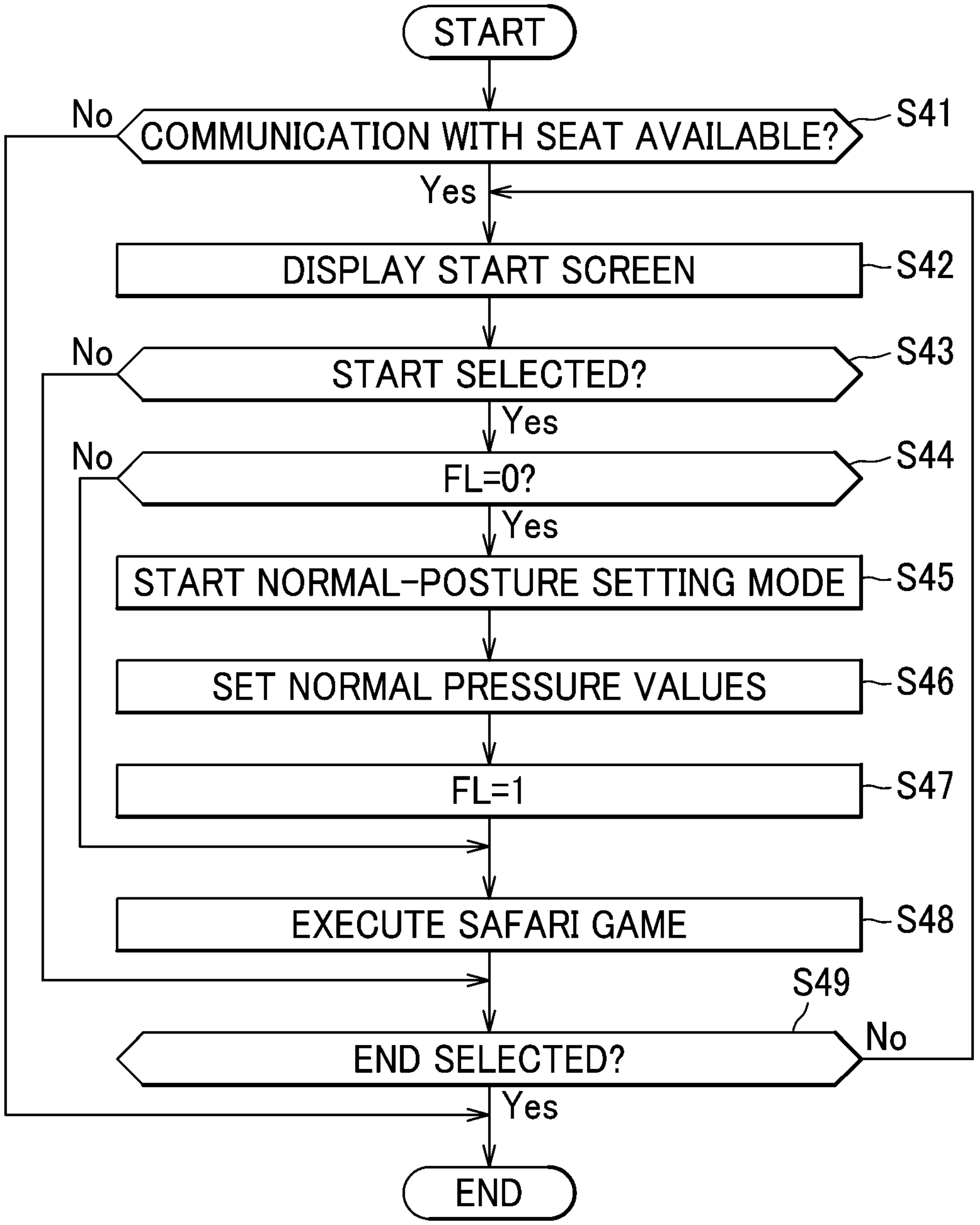
FIG. 2 is a flowchart showing a process executed by a terminal.

When the user launches an application for playing the safari game, the terminal 30 starts the process shown in FIG. 2 (START). In this process, the terminal 30 first determines whether or not communication with the seat S is available (S41).

If it is determined in step S41 that communication is not available (No), the terminal 30 ends the present process. If it is determined in step S41 that communication is available (Yes), the terminal 30 causes a start screen for the safari game (see FIG. 7A) to be displayed on the first screen 32D (S42).

Figure 7A:
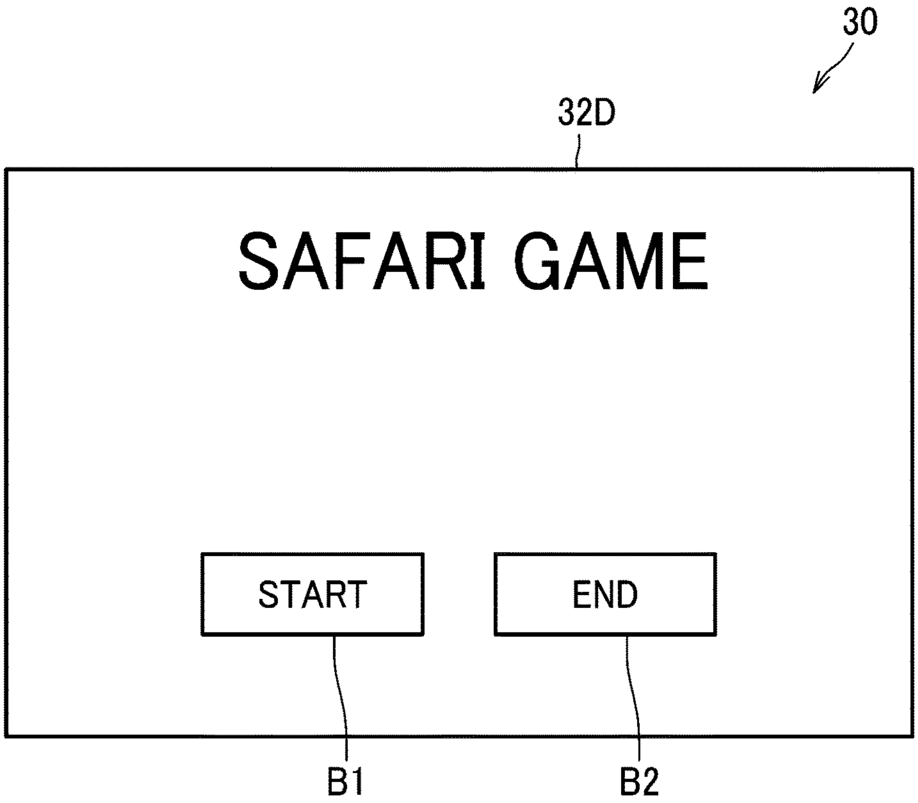
FIG. 7A is an illustration of a start screen.

On the start screen shown in FIG. 7A, a start button B1 for starting the safari game and a button B2 for ending the safari game is displayed.

After step S42, the terminal 30 determines whether or not the start button B1 has been selected (S43). If it is determined in step S43 that the start button B1 has been selected (Yes), the terminal 30 determines whether or not a flag FL is set to 0 (S44). The flag FL indicates whether a normal-posture setting mode for the safari game has been executed in the past.

The normal-posture setting mode is a mode in which an ordinary sitting posture of the user is set as a normal posture. In the normal-posture setting mode, the terminal 30 acquires values of pressure from the user in the ordinary posture, and sets normal pressure values that serve as a basis for determining a posture or for executing other processes in the safari game based on the values of pressure.

If it is determined in step S44 that FL is not set to 0 (No), i.e., the normal-posture setting mode has been executed in the past, the terminal 30 skips the normal-posture setting mode (S45 to S47) and starts the safari game (S48). If it is determined in step S44 that FL is set to 0 (FL=0) (Yes), i.e., the normal-posture setting mode has not been executed in the past, the terminal 30 starts the normal-posture setting mode (S45).

Figure 7B:
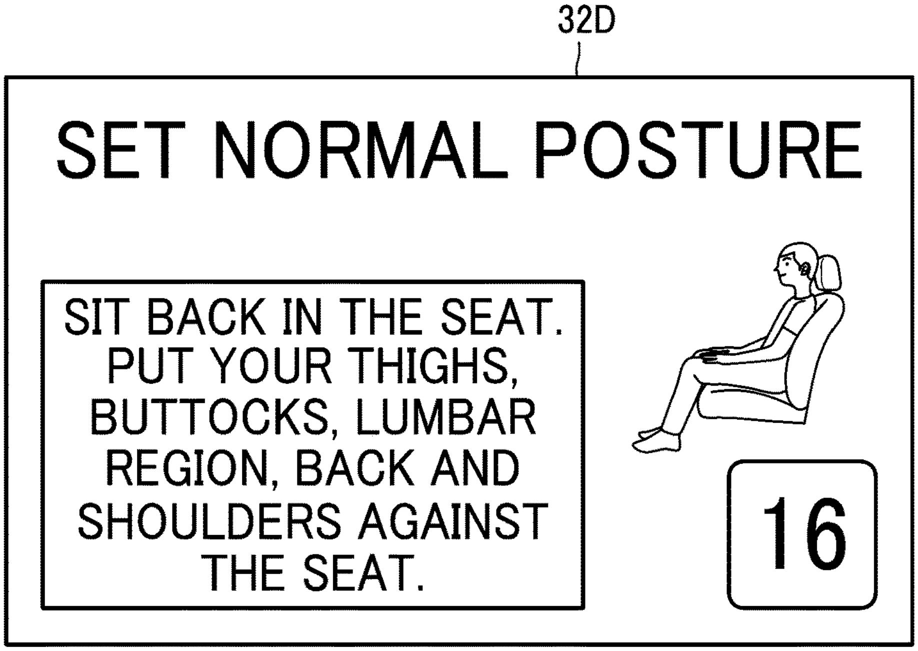
FIG. 7B is an illustration of a screen for setting a normal posture.

When the normal-posture setting mode is started, the terminal 30 displays the image shown in FIG. 7B on the first screen 32D. The image shown in FIG. 7B shows a message "Sit back in the seat. Put your thighs, buttocks, lumbar region, back and shoulders against the seat." and a countdown indicator indicating the remaining time for acquiring pressure values from the pressure sensors 21 to 26. In this example, the number "16" indicating a countdown of 16 counts is shown as the countdown indicator at the start of the normal-posture setting mode.

During the countdown of 16 counts, the terminal 30 acquires pressure values from the pressure sensors 21 to 26. To be more specific, the terminal 30 does not acquire pressure values during the first 8 counts, and acquires pressure values while counting down the remaining 8 counts. That is, the terminal 30 does not acquire pressure values for a predetermined period of time after the normal-posture setting mode starts, and acquires pressure values after lapse of the predetermined period of time. By not acquiring the pressure values for a predetermined period of time after the normal-posture setting mode starts, it is possible to eliminate unstable pressure values which may occur, for example, when the user is being reseated on the seat S, so that more accurate pressure values can be acquired.

To be more specific, the terminal 30 acquires pressure values from the pressure sensors 21 to 26 at a predetermined cycle while counting down 8 counts. For example, if the terminal 30 acquires the pressure values at a cycle of 20 Hz, and 1 count is 1 second, 161 pressure values will be acquired from one pressure sensor.

As shown in FIG. 2, the terminal 30 sets, as a normal pressure value for each of the pressure sensors 21 to 26, a range of values including marginal values provided on the plus side and the minus side of an average value of the pressure values acquired from the corresponding pressure sensor 21 to 26 (S46).

After step S46, the terminal 30 sets the flag FL to 1 (S47) and starts the safari game (S48). In the safari game, the terminal 30 first causes a game screen shown in FIG. 8A to be displayed. At the start of the safari game, the terminal 30 causes the grassland image including various animals to be displayed. The processes of the safari game will be described later.

When the safari game ends, the terminal 30 causes the start screen shown in FIG. 7A to be displayed. Referring back to FIG. 2, after step S48 or when it is determined No in step S43, the terminal 30 determines whether or not the button B2 for ending the safari game has been selected (S49). If it is determined in step S49 that the button B2 is not selected (No), the terminal 30 returns to the process of step S42. If it is determined in step S49 that the button B2 is selected (Yes), the terminal 30 ends the present process.

Figure 3:
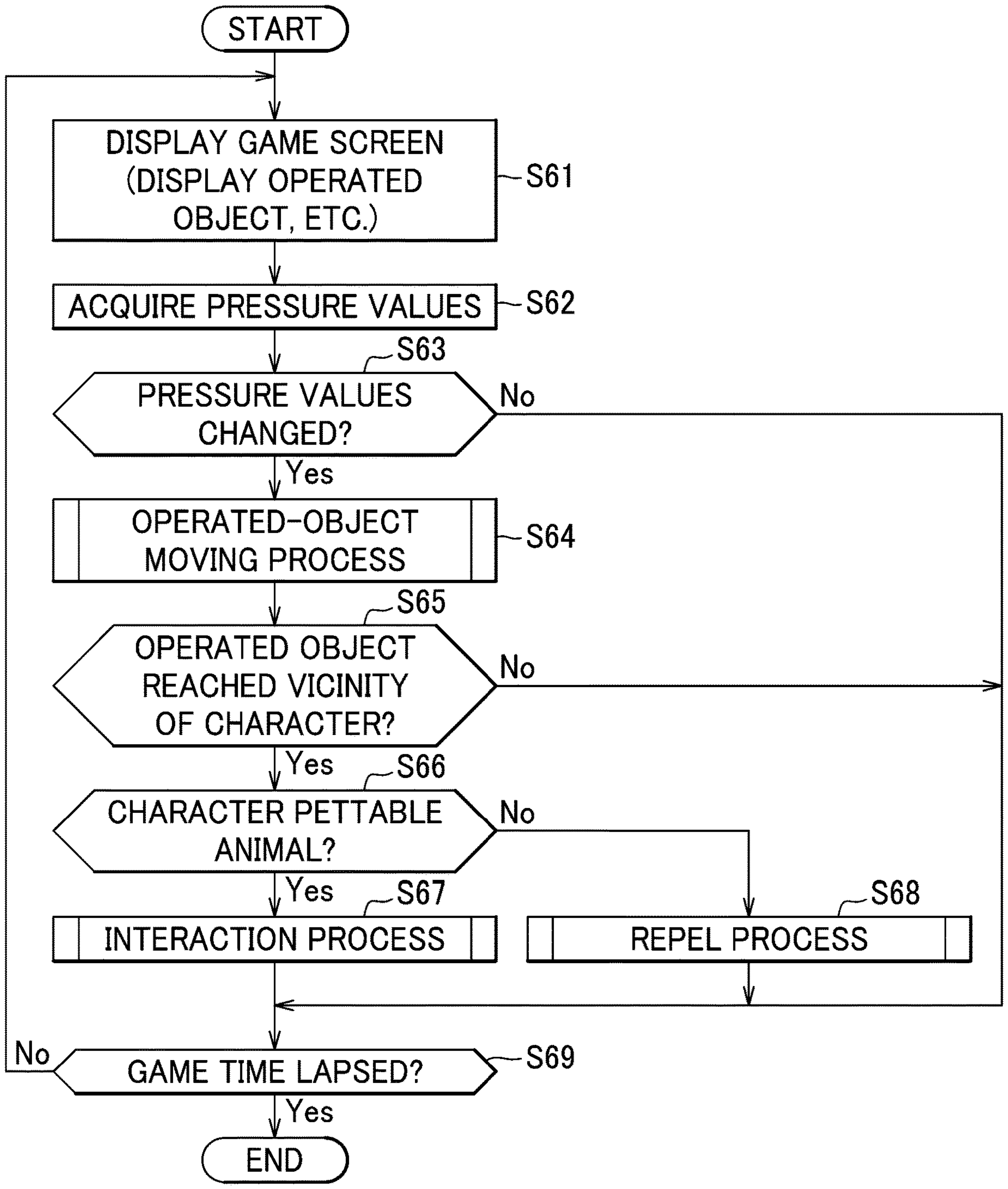
FIG. 3 is a flowchart showing a process executed during a safari game.

As shown in FIG. 3, in the safari game, the terminal 30 first causes a game screen such as shown in FIG. 8A to be displayed on each screen 32D, 33D (S61). At this point, the terminal 30 causes the hand icon HI, which is the user-operated object, to be displayed on the first screen 32D, and the characters C1, C2, which are not user-operated objects, and a background including trees and plants to be displayed on the screens 32D, 33D.

After step S61, the terminal 30 acquires pressure values from each of the pressure sensors 21 to 26 (S62). After step S62, the terminal 30 determines whether or not the acquired pressure values have changed to determine whether or not the user has moved on the seat S (S63). To be more specific, the terminal 30 determines, in step S63, whether a pressure value of one or a plurality of predetermined sensors among the pressure sensors 21 to 26 are out of a range of a corresponding normal pressure value to thereby determine whether the pressure values have changed.

If it is determined in step S63 that the pressure values have changed (Yes), the terminal 30 executes an operated-object moving process (S64) for moving the hand icon HI on the first screen 32D or the second screen 33D. The operated-object moving process will be described later.

After moving the hand icon HI in step S64, the terminal 30 determines in step S65 whether or not the hand icon HI, which is the operated object, has reached the vicinity of a character, i.e., the first character C1 or the second character C2 (S65). If it is determined in step S65 that the hand icon HI has reached the vicinity of the character (Yes), the terminal 30 determines whether or not the character in the vicinity of the hand icon HI is a pettable animal (S66).

If it is determined in step S66 that the character is a pettable animal (Yes), the terminal 30 executes the interaction process which allows the user to interact with the pettable animal by feeding food to the pettable animal (S67). The interaction process will be described later.

If it is determined in step S66 that the character is not a pettable animal (No), the terminal 30 executes the repel process for repelling a beast (S68). After steps S67, S68, or if it is determined No in steps S63, S65, the terminal 30 determines whether or not a game time, which is a period of time for execution of the safari game, has lapsed (S69).

If it is determined in step S69 that the game time has not lapsed (No), the terminal 30 returns to the process of step S61. If it is determined in step S69 that the game time has lapsed (Yes), the terminal 30 ends the present process.

Figure 4:
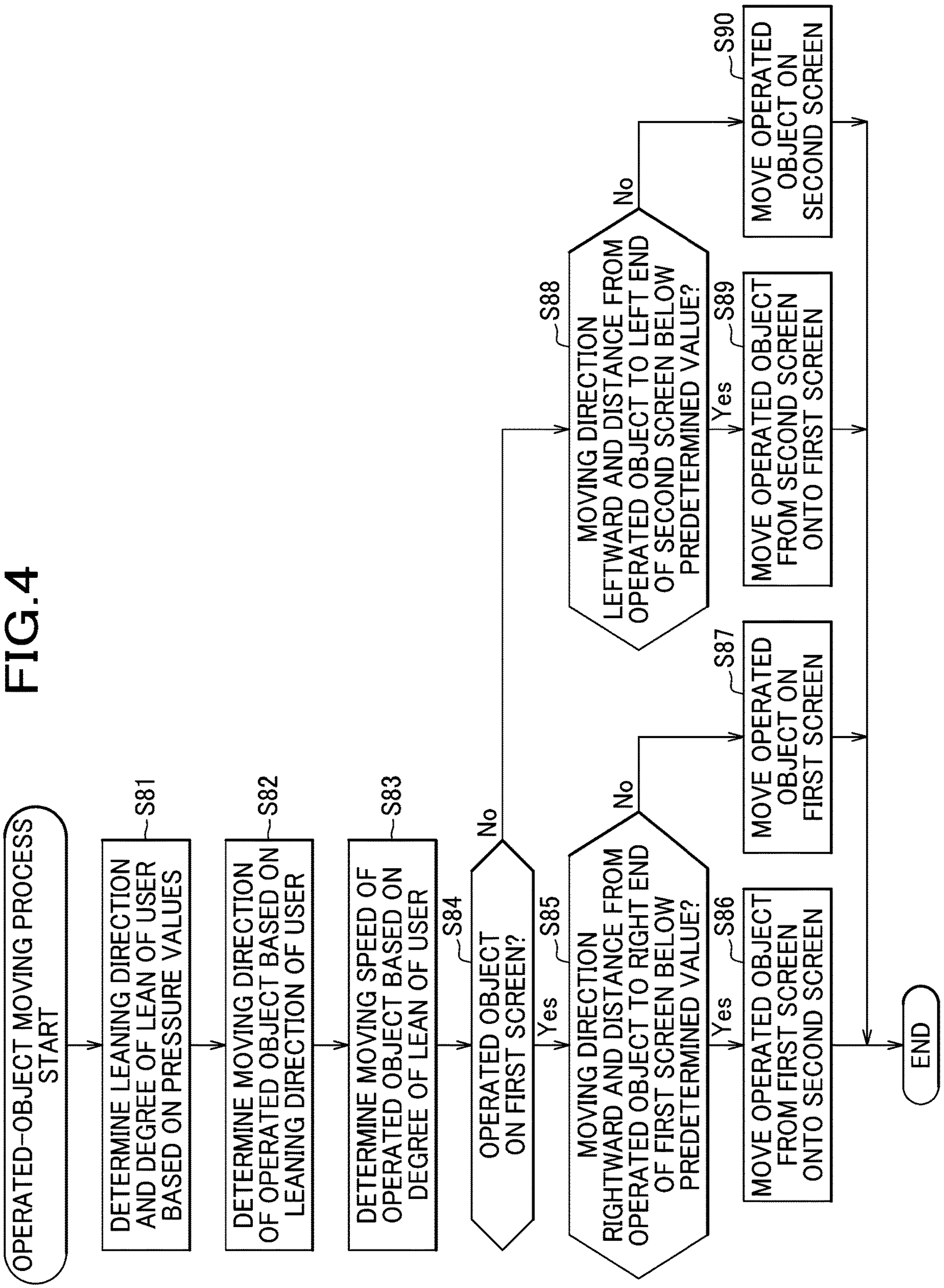
FIG. 4 is a flowchart showing an operated-object moving process.

As shown in FIG. 4, in the operated-object moving process, the terminal 30 first determines a direction in which the user is leaning (hereinafter referred to as "leaning direction") and the degree of the lean based on the pressure values (S81). Specifically, for example, if an output value of a left pressure sensor is greater than an output value of a right pressure sensor, of a pair of pressure sensors disposed side by side in the left-right direction (for example, pressure sensors 21, 23), the terminal 30 determines that the leaning direction is left. If the output value of the right pressure sensor is greater than the output value of the left pressure sensor, the terminal 30 determines that the leaning direction is right.

Further, if an output value of a front pressure sensor is greater than an output value of a rear pressure sensor, of a pair of pressure sensors aligned in the front-rear direction (for example, pressure sensors 21, 23), the terminal 30 determines that the leaning direction is frontward. If the output value of the rear pressure sensor is greater than the output value of the front pressure sensor, the terminal 30 determines that the leaning direction is rearward.

The terminal 30 may also determine that the leaning direction is forward and to the left, forward and to the right, rearward and to the left, or rearward and to the right based on the output values of the sensors of the pair of pressure sensors disposed side by side in the left-right direction and the pair of pressure sensors aligned in the front-rear direction.

The terminal 30 determines the degree of the lean such that the greater the difference between the output values of the pair of left and right pressure sensors or the pair of frontward and rearward pressure sensors, for determining the leaning direction, the greater the degree of the lean.

After step S81, the terminal 30 determines the direction of movement (moving direction) of the hand icon HI on the screens 32D, 33D based on the leaning direction determined in step S81 (S82). The relationship between the leaning direction and the moving direction on the screens 32D, 33D can be set as desired. For example, the moving direction can be determined "upward" when the leaning direction is "frontward", the moving direction can be determined "downward" when the leaning direction is "rearward", the moving direction can be determined "leftward" when the leaning direction is "leftward", and the moving direction can be determined "rightward" when the leaning direction is "rightward".

After step S82, the terminal 30 determines a moving speed of the hand icon HI based on the degree of lean determined in step S81 (S83). Specifically, the terminal 30 determines the moving speed in step S83 such that the greater the degree of lean, the greater the moving speed.

After step S83, the terminal 30 determines whether or not the hand icon HI is present on the first screen 32D (S84). If it is determined in step S84 that the hand icon HI is present on the first screen 32D (Yes), the terminal 30 determines whether or not a first condition is satisfied, i.e., whether or not the direction of movement of the hand icon HI is rightward, and the distance from the hand icon HI to the right end of the first screen 32D is below a predetermined value (S85). Herein, the predetermined value is set at a value close to zero.

Figure 10A:
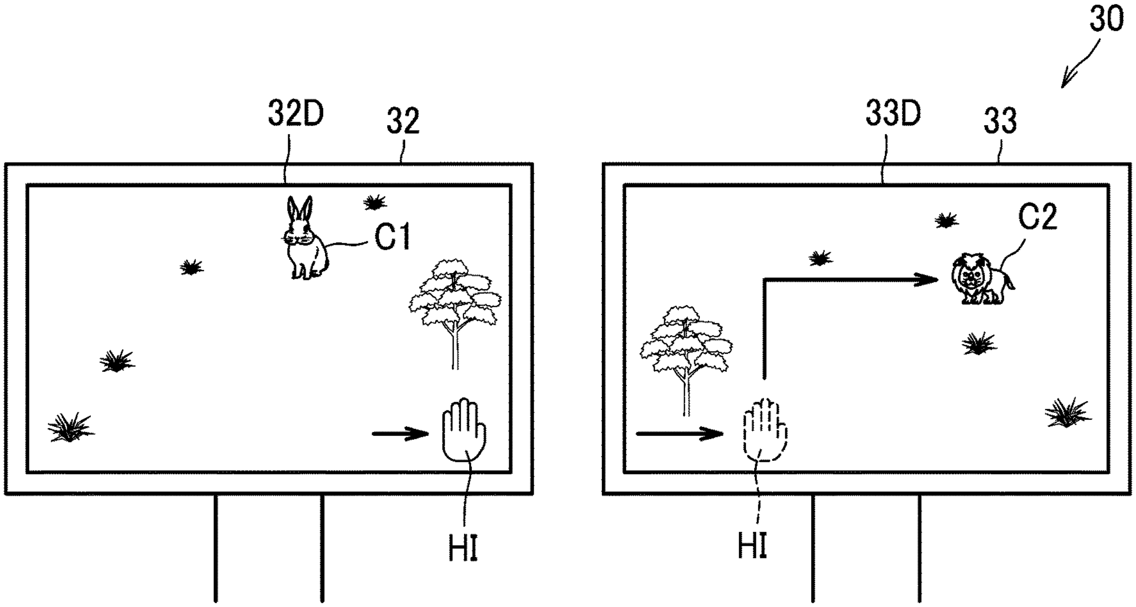
FIG. 10A is an illustration showing the operated object moving from the first screen to the second screen.

Thus, the terminal 30 determines whether or not the first condition is satisfied to determine whether or not the hand icon HI is heading further rightward when the hand icon HI has moved to and is located at the right end of the first screen 32D. If it is determined in step S85 that the first condition is satisfied (Yes), the terminal 30 causes the hand icon HI to move, as shown in FIG. 10A, from the first screen 32D onto the second screen 33D (S86) and ends the present process. If it is determined in step S85 that the first condition is not satisfied (No), the terminal 30 causes the hand icon HI to move on the first screen 32D (S87) and ends the present process.

If it is determined in step S84 that the hand icon HI is not present on the first screen 32D, i.e., the hand icon HI is present on the second screen 33D (Yes), the terminal 30 determines whether or not a second condition is satisfied, i.e., whether or not the direction of movement of the hand icon HI is leftward, and the distance from the hand icon HI to the left end of the second screen 33D is below a predetermined value (S88). Herein, the predetermined value is set at a value close to zero.

If it is determined in step S88 that the second condition is satisfied (Yes), the terminal 30 moves the hand icon HI from the second screen 33D onto the first screen 32D (S89) and ends the present process. If it is determined in step S88 that the second condition is not satisfied (No), the terminal 30 moves the hand icon HI on the second screen 33D (S90) and ends the present process.

Figure 5:
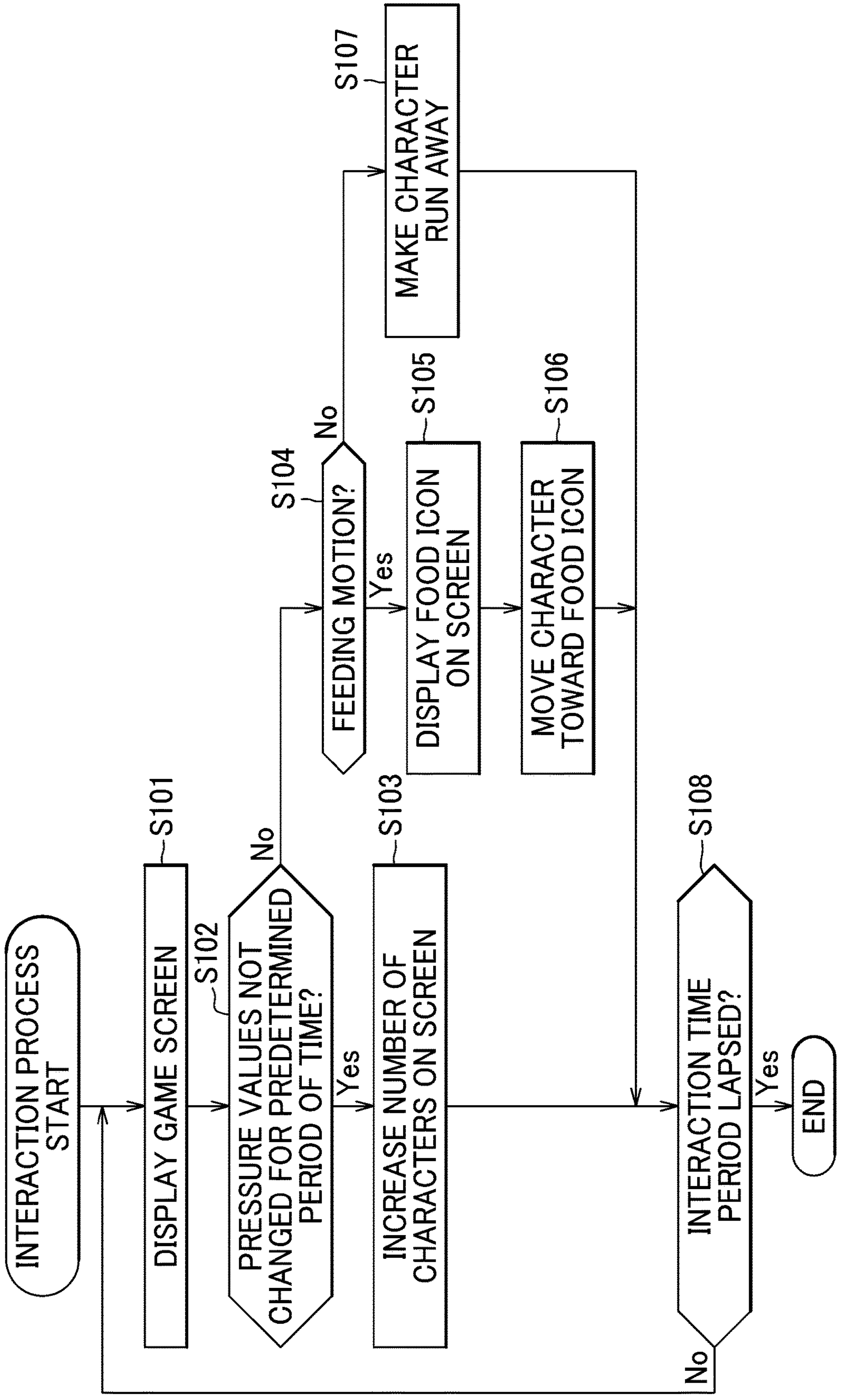
FIG. 5 is a flowchart showing an interaction process.
Figure 8B:
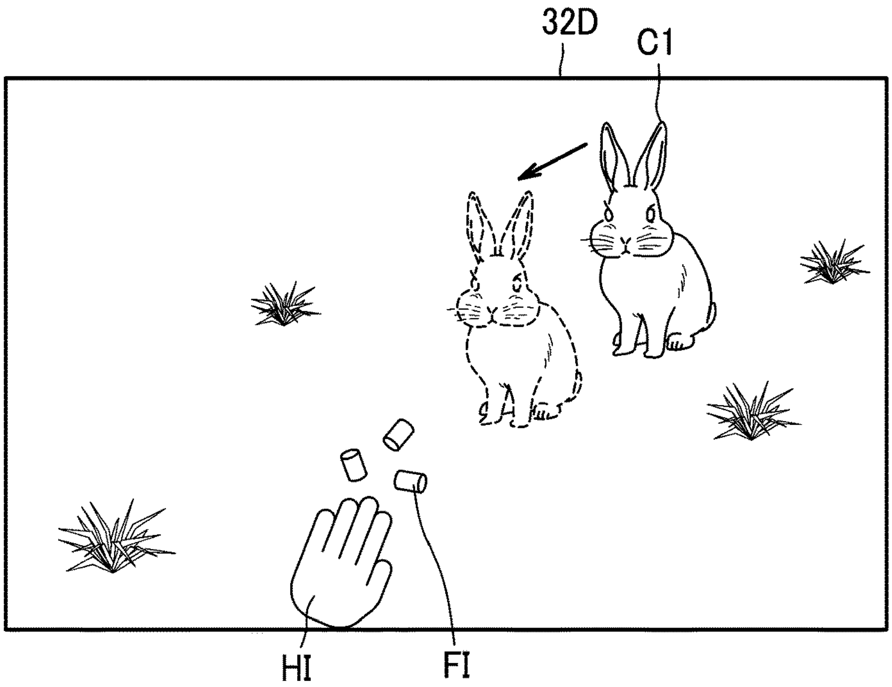
FIG. 8B is an illustration of an image shown during the interaction process.

As shown in FIG. 5, in the interaction process, the terminal 30 first causes the game screen for the interaction process shown in FIG. 8B to be displayed on the first screen 32D (S101). In the game screen shown in FIG. 8B, an enlarged image of the first character C1, which is the pettable animal, is displayed. In the present example, the game screen for the interaction process is displayed on the first screen 32D because the first character C1 is present on the first screen 32D in the grassland image shown in FIG. 8A. However, the game screen for the interaction process may be displayed on the second screen 33D if the first character C1 is present on the second screen 33D.

Figure 9A:
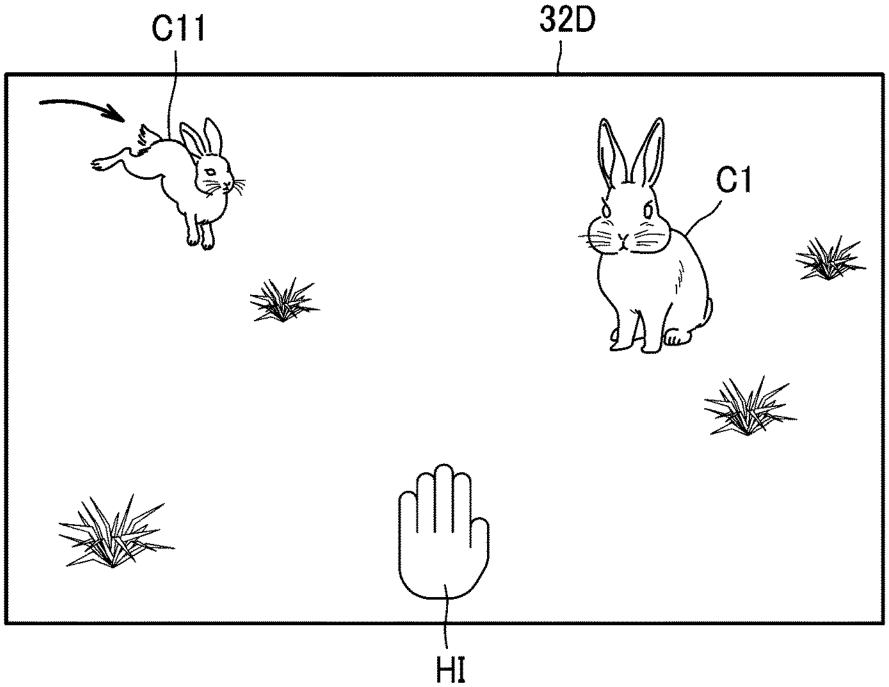
FIG. 9A is an illustration of an image showing animals on the screen increasing in number during the interaction process.

After step S101, the terminal 30 determines whether or not the pressure values have not changed during a predetermined period of time to determine whether or not the user is sitting still on the seat S (S102). If it is determined in step S102 that the pressure values have not changed (Yes), the terminal 30 causes the character on the first screen 32D to increase in number, as shown in FIG. 9A, by displaying a new first character C11 different from the first character C1 on the first screen 32D (S103).

If it is determined in step S102 that pressure values have changed (No), the terminal 30 determines whether or not the user has made the feeding motion on the seat S based on the pressure values (S104). Herein, the feeding motion may be any kind of motion. For example, the feeding motion may be a motion of the user lifting a foot up or a motion of the user leaning forward.

If the feeding motion is, for example, a motion of the user leaning forward, it can be determined that a user is leaning forward and making the feeding motion when an output value of a front pressure sensor is greater than an output value of a rear pressure sensor, of a pair of pressure sensors aligned in the front-rear direction (for example, pressure sensors 21, 23), similar to the method of determining the leaning direction as described above. Further, it is also possible to determine that the user is leaning forward and making the feeding motion when an output value of any one of the pressure sensors provided in the backrest SB becomes smaller than the corresponding normal pressure value.

If it is determined in step S104 that the feeding motion has been made (Yes), the terminal 30 displays, as shown in FIG. 8B, a food icon FI on the first screen 32D (S105). To be more specific, the terminal 30 causes, for example, the food icon FI on the hand icon HI to move to a predetermined position in such a manner that the food icon FI moves to the vicinity of the first character C1 in a parabolic trajectory. Since the food icon FI moves in response to the feeding motion of the user in the interaction process, the user-operated object in the interaction process is the food icon FI.

After step S105, the terminal 30 causes the first character C1 to move toward the food icon FI located at the predetermined position (S106). The first character C1 thereby moves in response to the motion of the food icon FI moving to the predetermined position.

Figure 9B:
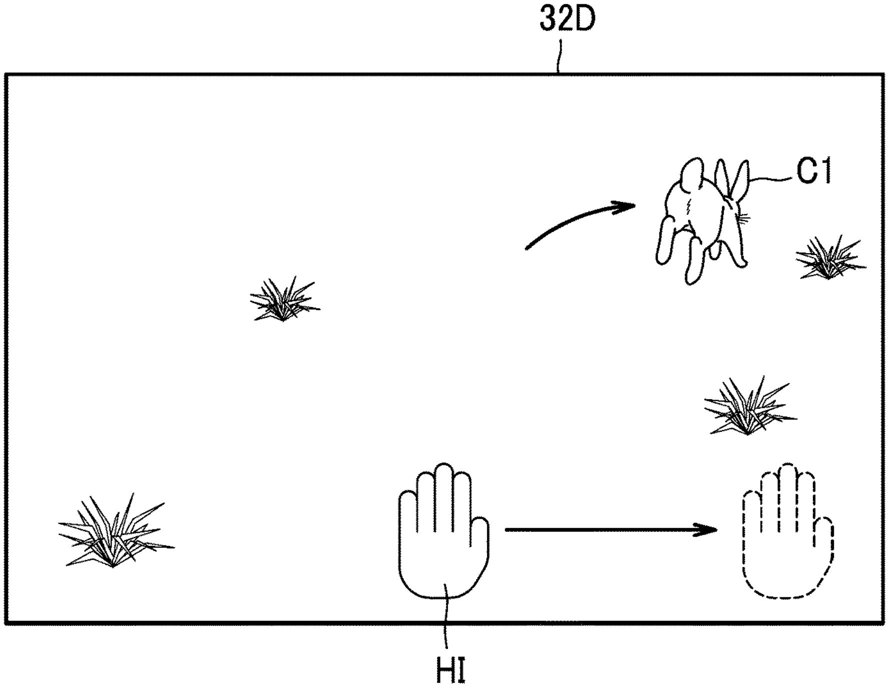
FIG. 9B is an illustration of an image showing animals on the screen running away.

If it is determined in step S104 that the feeding motion has not been made, i.e., a motion other than the feeding motion has been made (No), the terminal 30 causes, as shown in FIG. 9B, the first character C1 on the first screen 32D to make a run-away motion and run outside of the first screen 32D (S107). After steps S103, S106, S107, the terminal 30 determines whether or not an interaction time period, which is the execution period of the interaction process, has lapsed (S108).

If it is determined in step S108 that the interaction time period has not lapsed (No), the terminal 30 returns to the process of step S101. If it is determined in step 108 that the interaction time period has lapsed (Yes), the terminal 30 ends the present process.

Figure 6:
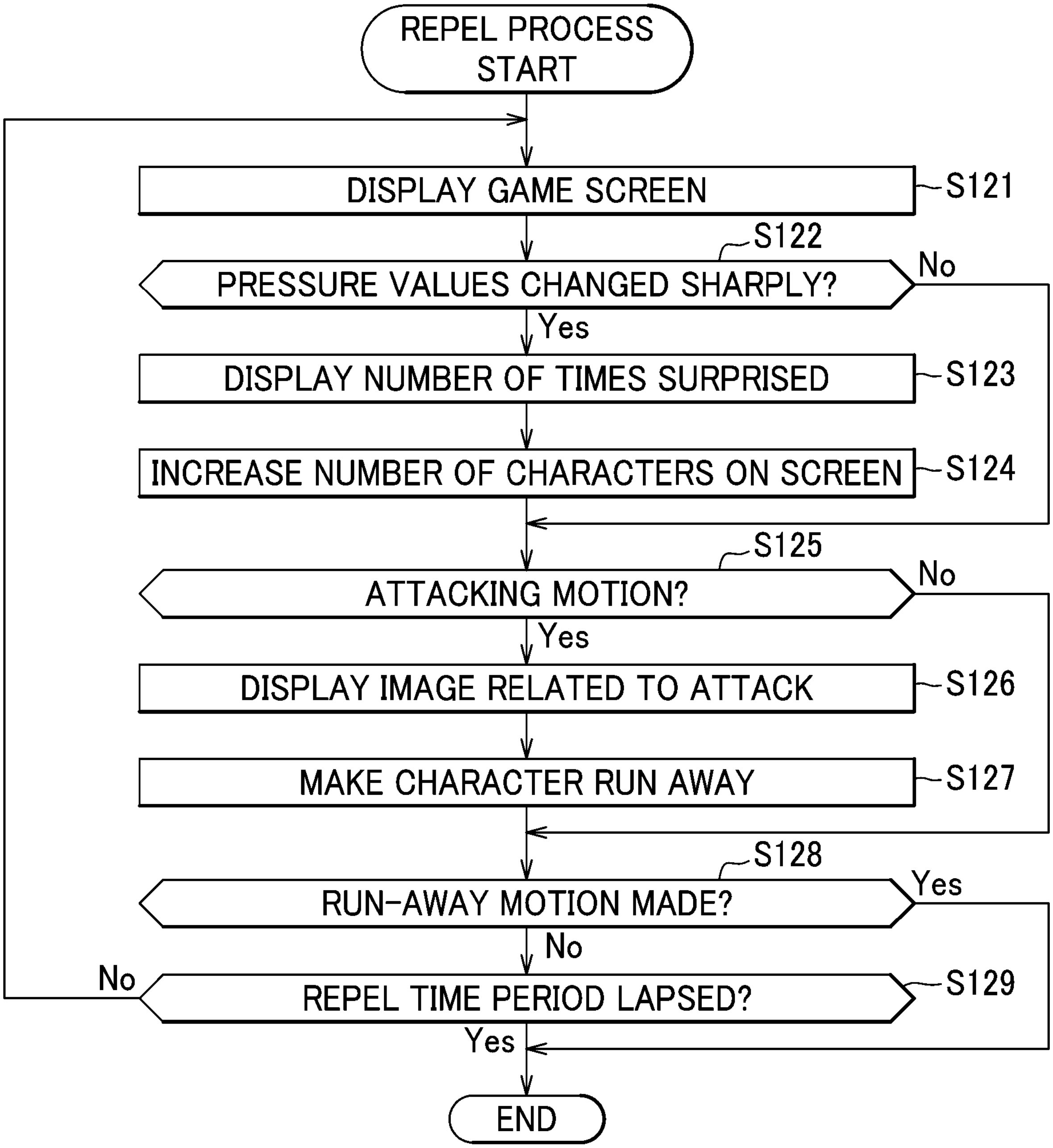
FIG. 6 is a flowchart showing a repel process.
Figure 10B:
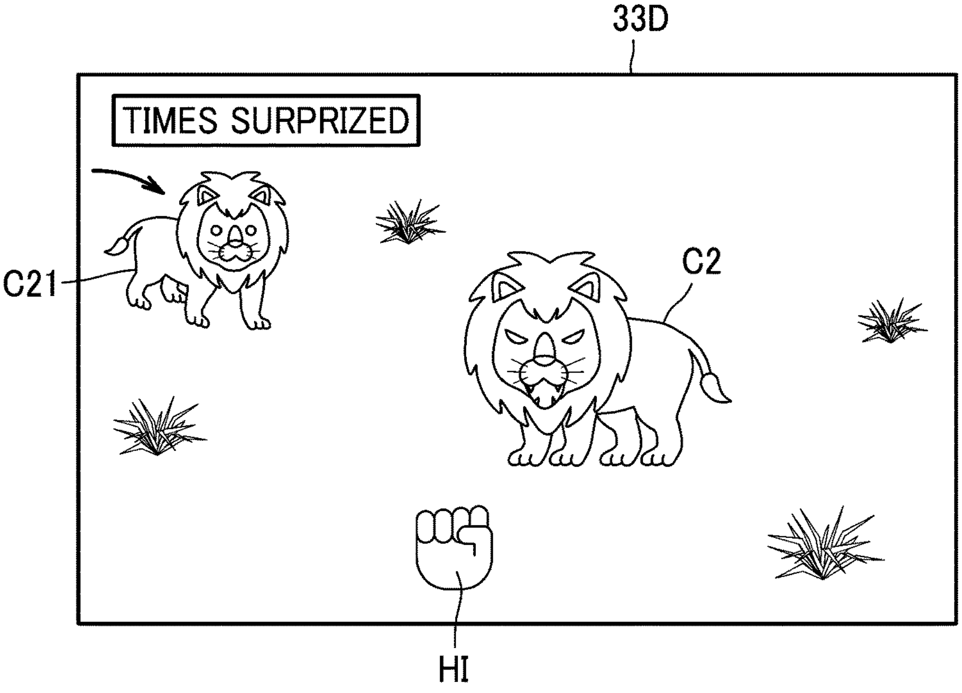
FIG. 10B is an illustration of an image shown during the repel process.

As shown in FIG. 6, in the repel process, the terminal 30 first causes the game screen for the repel process, as shown in FIG. 10B, to be displayed on the second screen 33D (S121). In the game screen shown in FIG. 10B, an enlarged image of the second character C2, which is the beast, is displayed. In the present example, the game screen for the repel process is displayed on the second screen 33D because the second character C2 is present on the second screen 33D in the grassland image shown in FIG. 8A. However, the game screen for the repel process may be displayed on the first screen 32D if the second character C2 is present on the first screen 32D.

After step S121, the terminal 30 determines whether or not the pressure values have changed sharply to determine whether or not the user has made a surprise motion (S122). Herein, the surprise motion may be any kind of motion. The surprise motion may be, for example, a large motion of the user bending his/her upper body backward. In this case, it is possible to determine that the surprise motion has been made, for example, when an output value of any one of the pressure sensors provided in the backrest SB becomes higher than the corresponding normal pressure value.

When it is determined in step S122 that the pressure values have changed sharply (Yes), the terminal 30 causes, as shown in FIG. 10B, the number of times the user has been surprised to be displayed on the second screen 33D. Specifically, in this example, the words "TIMES SURPRISED" and a numeric character indicating the number of times is displayed as an image showing the number of times the user has been surprised.

After step S123, the terminal 30 causes the character on the second screen 33D to increase in number, as shown in FIG. 10B, by displaying a new second character C21 different from the second character C2 on the second screen 33D (S124). After step S124, or if it is determined No in step S122, the terminal 30 determines whether or not the user has made an attacking motion (S125).

Herein, the attacking motion may be any kind of motion. For example, the attacking motion may be a motion in which the user raises his/her buttocks from the seat S and then hits his/her buttocks against the seat S. In this case, it can be determined whether or not the attacking motion has been made by determining whether or not the pressure values of the pressure sensors 23 provided in the seat bottom SA decrease to values smaller than the corresponding normal pressure values and then increase to values greater than the corresponding normal pressure values.

Figure 11:
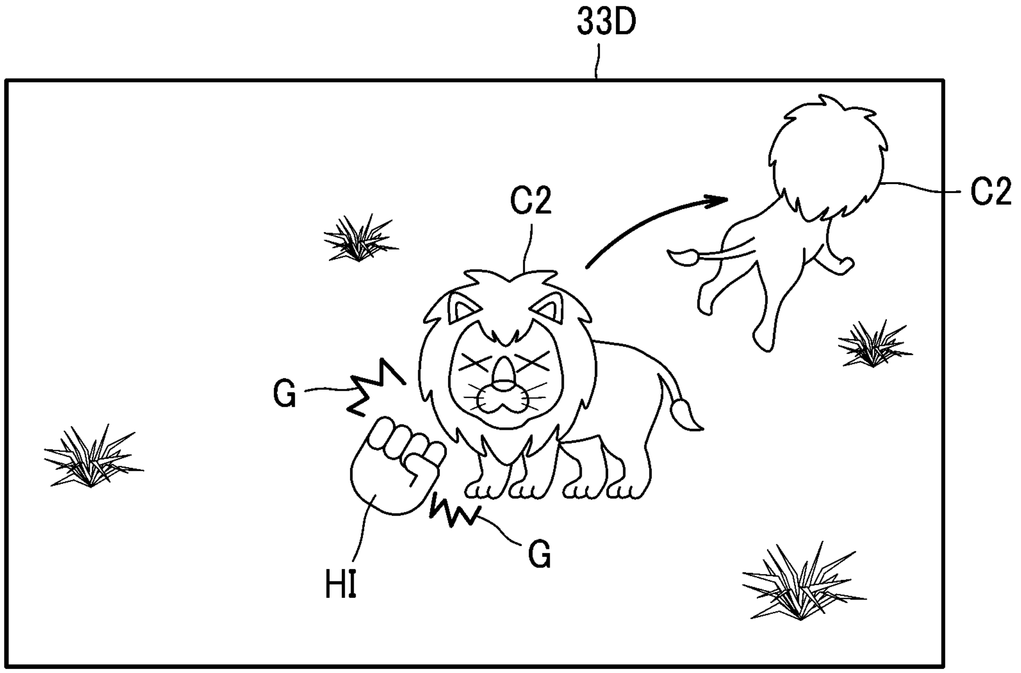
FIG. 11 is an illustration of a situation in which an animal is attacked during the repel process.

If it is determined in step S125 that the attacking motion has been made (Yes), the terminal 30 causes an image related to the attack, as shown in FIG. 11, to be displayed on the second screen 33D (S126). Specifically, in this example, the terminal 30 changes the hand icon HI to a graphical representation of a first to cause the image related to the attack to be displayed, and shows a graphical image G of a shock wave to indicate that the first has hit the beast.

After step S126, the terminal 30 causes the second character C2 on the second screen 33D to run away to the outside of the second screen 33D (S127). After step S127, or if it is determined No in step S125, the terminal 30 determines whether or not the user has made a motion to run away from the beast (S128). Herein, the run-away motion may be any motion. For example, the run-away motion may be a motion of the user lifting his/her legs up and down alternately. In this case, it can be determined whether or not the run-away motion has been made by determining whether or not the output values of the left sensor 21L and the right sensor 21R located under the thighs of the user have decreased alternately to values smaller than corresponding normal pressure values.

If it is determined in step S128 that the run-away motion has been made (Yes), the terminal 30 ends the present process. If it is determined in step S128 that the run-away motion has not been made (No), the terminal 30 determines whether or not a repel time period, which is an execution period of the repel process, has lapsed (S129).

If it is determined in step S129 that the repel time period has not lapsed (No), the terminal 30 returns to the process of step S121. If it is determined in step S129 that the repel time period has lapsed (Yes), the terminal 30 ends the present process.

Next, one example of a specific operation of the seat experience system 1 will be described in detail.

When the user operates the terminal 30 to launch the safari game in a state in which the devices (S, 30) of the seat experience system 1 are capable of communicating as shown in FIG. 1, the processes of step S41 (Yes) and step S42 are sequentially executed in the process shown in FIG. 2. The start screen shown in FIG. 7A is thereby displayed on the first screen 32D.

When the user selects the start button B1, it is determined Yes in step S43, and the terminal 30 proceeds to step S44. Herein, if the normal-posture setting mode has never been executed by the user in the past, it is determined Yes in step S44 and the normal-posture setting mode is executed (S45 to S47).

In the normal-posture setting mode, the screen shown in FIG. 7B is displayed. The user reseats himself/herself on the seat S according to instructions shown on the screen so that his/her whole body closely contacts the seat S. While the countdown indicator on the screen counts down from 16 to 0, the terminal 30 acquires values of pressure via the sensors 21 to 26 from the user keeping his/her posture.

The terminal 30 sets the normal pressure values for determining postures in the safari game and for other operations based on the pressure values acquired in the normal-posture setting mode. The terminal 30 sets the normal pressure values, and then displays the grassland image shown in FIG. 8A. When the grassland image is displayed, the hand icon HI moves on the first screen 32D in response to the user leaning on the seat S in either the forward, rearward, leftward, or rightward direction.

For example, if the user leans forward when the grassland image is displayed, the hand icon HI moves on the first screen 32D. When the distance between the hand icon HI and the first character C1 becomes shorter than the predetermined distance, it is determined Yes in steps S65, S66 shown in FIG. 3 and the terminal 30 proceeds to the interaction process.

In the interaction process, the terminal 30 causes the image shown in FIG. 8B to be displayed. When the user leans frontward, for example, and makes a motion on the seat S to feed an animal during the interaction process, the food icon FI is displayed on the hand icon HI and moves from the hand icon HI to a predetermined position on the ground in a parabolic trajectory.

Once the food icon FI is placed on the ground at the predetermined position, the first character C1 moves toward the food icon FI and makes a motion to eat the food icon FI. When the user does not move on the seat S during the interaction process, a first character C11 different from the first character C1 appears on the first screen 32D as shown in FIG. 9A, whereby the character on the first screen 32D increases in number.

When the user makes a motion other than the feeding motion during the interaction process, the first character C1 on the first screen 32D runs away to the outside of the first screen 32D as shown in FIG. 9B.

In order for the user to repel the second character C2 on the second screen 33D, the user leans rightward to move the hand icon HI to the right, as shown in FIG. 10A. At this point in time, if the hand icon HI is located at the right end of the first screen 32D, the user keeping leaning rightward causes the hand icon HI to move from the first screen 32D onto the second screen 33D.

When the hand icon HI moves closer to the second character C2, the terminal 30 executes the processes of step S65 (Yes) and step 66 (No) in this sequence and thereby proceeds to the repel process. In the repel process, the terminal 30 causes the image shown in FIG. 10B to be displayed. In the image shown in FIG. 10B, the terminal 30 may cause the second character C2 to make, for example, a roaring motion to surprise the user.

If the user is surprised and bends his/her body backward during the repel process, the words "TIMES SURPRISED" and the numeric character is displayed. The numeric character indicating the number of times surprised increases according to the number of times the user is surprised.

When the user is surprised during the repel process, a second character C21 different from the second character C2 appears on the second screen 33D and causes the character on the second screen 33D to increase in number. When the user attacks the animal in the repel process as shown in FIG. 11, the hand icon HI changed to the shape of the first moves toward the second character, and the graphical image G of the shock wave is displayed when the hand icon HI comes close to the second character C2. When the second character C2 is attacked in such a manner, the second character C2 runs away to the outside of the second screen 33D.

According to the above-described seat experience system 1, the following advantageous effects can be obtained:

Since the movable objects (characters C1, C2) on the screen are moved in response to the movement of the user-operated object (HI, FI), the entertainability of the seat S can be improved.

Since the seat experience system 1 is configured such that the animal on the screen comes closer to the food when the user makes the feeding motion (first motion) on the seat S, the actual behavior of the animal can be simulated, and thus the entertainability of the seat S can be improved.

Since the seat experience system 1 is configured such that the animals on the screen run away when the user makes the attacking motion (second motion) on the seat S (i.e., it is possible to repel the animals on the screen), the entertainability of the seat S can be improved.

Since, in the interaction process, the animal on the screen increases in number when the user does not move on the seat S, i.e., the user is not making a motion that scares the animal, and the animal on the screen runs away when the user moves on the seat S, the actual behavior of the animal can be simulated.

In the repel process, it can be determined that the user is surprised based on the output values of the pressure sensors 21 to 26. Since an image related to the surprise is displayed on the screen when the user is surprised, other people can know via the screen that the user is surprised; thus entertainability can be improved.

Since the seat experience system 1 is configured such that the character increases in number when the user is surprised, a game can be provided in which the user tries, for example, not to be surprised so that the character does not increase in number, and thereby entertainability can be improved.

The seat experience system 1 is configured such that when the hand icon HI is located at the right end of the first screen 32D and is heading to the right, the hand icon HI is moved onto the second screen 33D; thus, the hand icon HI can be moved across two screens.

The above-described first example may be implemented in other forms modified where appropriate as described below. In the following description, the same reference characters will be applied to structures similar to those of the above example and explanation thereof will be omitted.

The application carried out by the seat system is not limited to the safari game but may be used for any kind of game. For example, a feeding game for feeding animals, as shown in FIG. 12, can be implemented.

The feeding game is a game in which the user selects food and an animal coming close to the food changes depending on the selected food. In the example of FIG. 12, the terminal 30 only comprises the first screen 32D in contrast to the above example.

Figure 13:
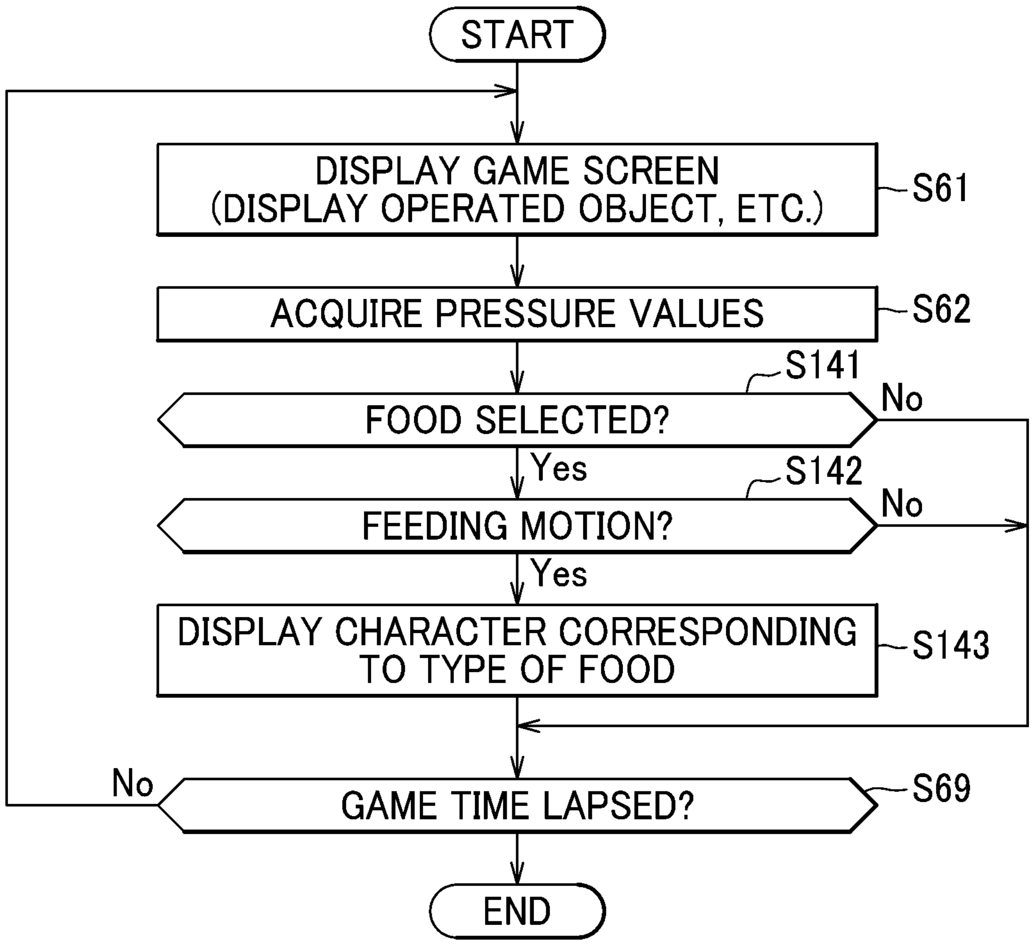
FIG. 13 is a flowchart showing the process executed during the feeding game.

The terminal 30 executes the process shown in FIG. 13 in the feeding game. The process shown in FIG. 13 includes the same steps as the steps S61, S62, S69 of FIG. 3 described above, and includes additional steps S141 to S143.

Figure 12A:
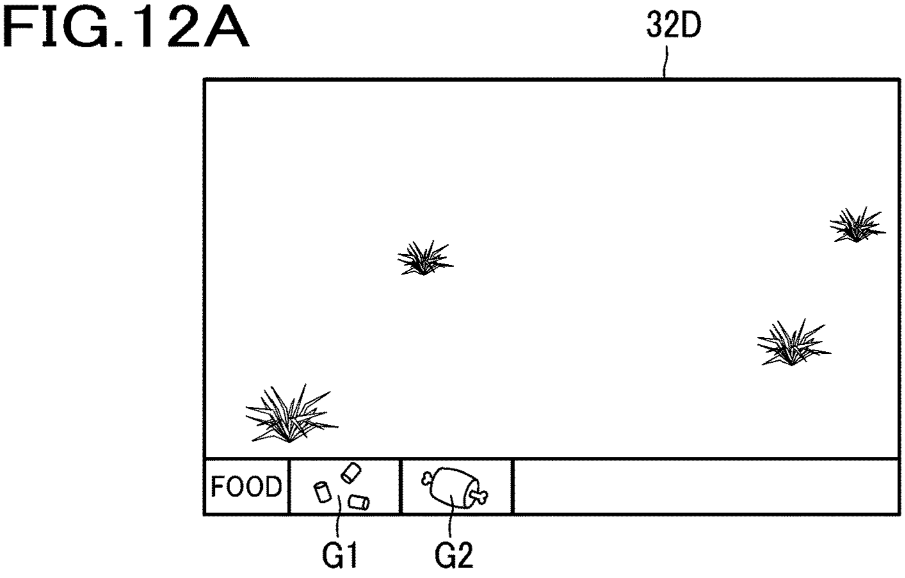
FIG. 12A is an illustration of a background image shown during a feeding game according to a modified example of the first example.
Figure 12B:
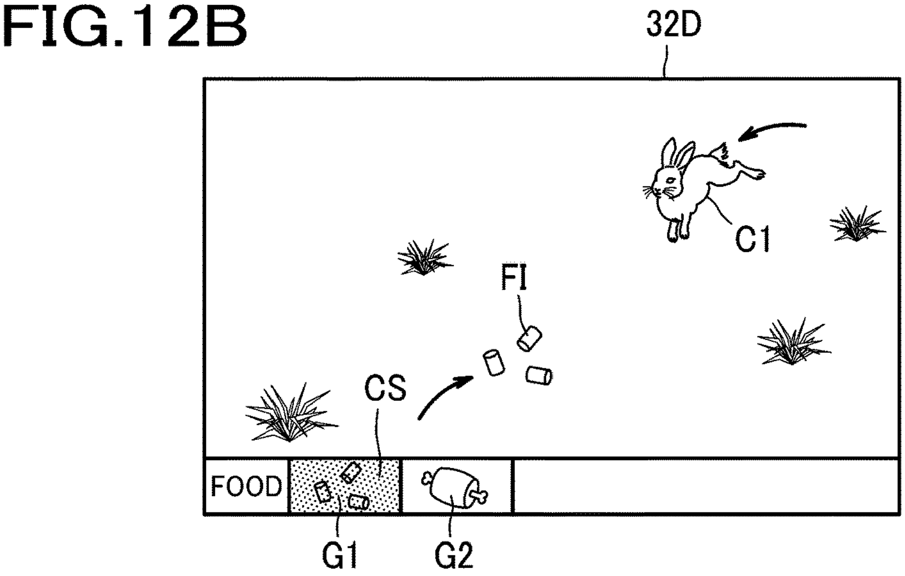
FIG. 12B is an illustration of an image shown during the feeding game including a character and a food icon on the background image.
Figure 12C:
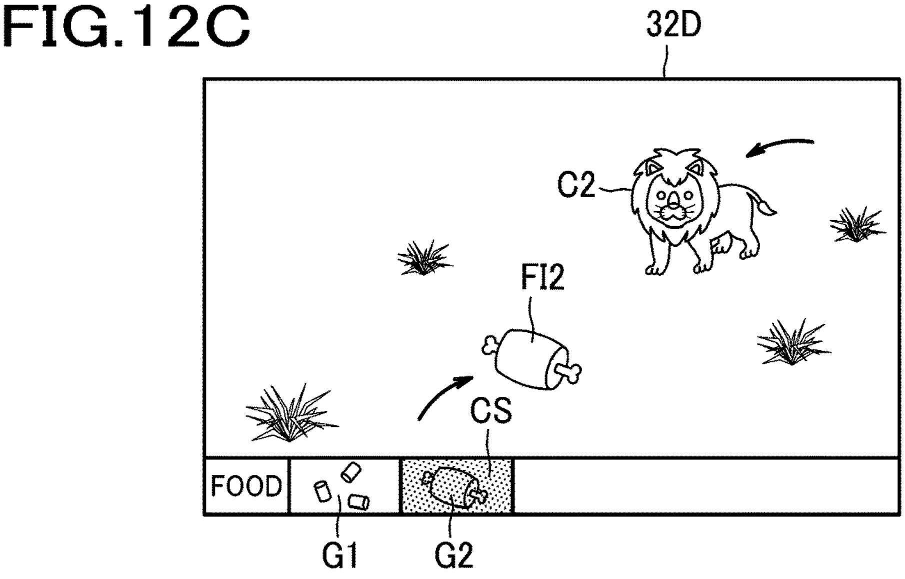
FIG. 12C is an illustration of an image shown during the feeding game including another character and another food icon on the background image.

When the feeding game is started, the terminal 30 causes a game screen shown in FIG. 12A to be displayed on the first screen 32D and then acquires pressure values (S61, S62). In the game screen of the feeding game shown in FIG. 12A, a background image of grass and a first food graphical image G1 and a second food graphical image G2 for selecting a type of food are displayed.

According to this configuration, the first food graphical image G1 is an image showing food for rabbits, and the second food graphical image G2 is an image showing food for lions. Three or more graphical images for food may be provided.

Referring back to FIG. 13, after step S62, the terminal 30 determines whether or not a motion for selecting the type of food has been made by the user (S141). The motion for selecting the type of food may be any kind of motion. For example, the user can move a cursor CS for selecting the type of food, shown by a dotted-hatch pattern in FIGS. 12B, 12C, to the right or left by leaning his/her body to the right or left, and can select the type of food by moving his/her legs up and down.

If it is determined in step S141 that the motion for selecting the type of food has been made (Yes), the terminal 30 determines whether or not the feeding motion has been made (S142). Determination of the feeding motion can be made in the same way as the above-described example.

If it is determined in step S142 that the feeding motion has been made (Yes), the terminal 30 causes the food icon (FI, FI2) corresponding to the type of food to move to a predetermined position, and then causes a character (C1, C2) corresponding to the type of food to be displayed on the first screen 32D (S143). The terminal 30 subsequently executes the process of step S69 in a similar manner as the above-described example.

It is also possible in this configuration to move the character (C1, C2) in response to movement of the food icon (FI, FI2), which is the user-operated object.

The game may also be a capturing game for capturing animals. In the capturing game, a grassland image (FIG. 8A) similar to the above-described example may be, for example, displayed on the screen and the hand icon HI may be moved in a similar manner as that of the above-described example. The game may be configured such that when the distance from the hand icon HI to the character becomes equal to or shorter than a predetermined distance, it is determined whether or not a capturing motion has been made, and the character is captured when it is determined that the capturing motion has been made. The capturing motion may be, for example, a motion of the user lifting both legs at the same time. In this case, it can be determined that the user has lifted both legs at the same time when the pressure values of the left and right pressure sensors corresponding to the thighs of the user both become smaller than the corresponding normal pressure values.

The game may be played by a plurality of users cooperating to play the game. For example, the above-described capturing game may be configured as a game played by two users cooperating to play the game. Specifically, a first user seated in a first seat may select a target (animal) to be captured, and a second user seated in a second seat may capture the animal. The selecting motion made by the first user on the first seat for selecting the target may be, for example, a motion of the first user leaning to the left or right. Based on this motion, it is possible for the first user to move a cursor on the screen to select an animal on the screen. The capturing motion made by the second user on the second seat may be, for example, a motion similar to the above-described capturing motion.

Although the operated object is the hand icon HI or the food icon FI displayed on the screens 32D, 33D in the above described example, the operated object may be, for example, a virtual operated object that is not displayed on a screen. For example, a background on a screen may be configured to move as if a virtual person or car is moving when the user leans forward, rearward, leftward, or rightward in the above-described safari game.

Although the second character C2 is caused to run away when the user makes an attacking motion in the above-described example, the second character C2 may be caused to fall down when the user makes an attacking motion.

The controller may determine whether or not the user using the seat S is a child by determining whether or not the user's weight is equal to or smaller than a predetermined value based on pressure values from the pressure sensors. If it is determined that the user's weight is greater than the predetermined value, i.e., the user is not a child, the controller may cause a realistic image closer to an actual animal to be displayed on the screen as the graphical representation of the animal, and if it is determined that the user's weight is equal to or smaller than the predetermined value, i.e., the user is a child, the controller may cause a cute image far from the actual animal, as used in an animated cartoon, to be displayed on the screen as the graphical representation of the animal.

Further, if it is determined that the user is a child, during the process of causing the animal to increase in number in the interaction process described above, the controller may increase the number of animals appearing on the screen compared to when it is determined that the user is not a child.

The attacking motion may be, for example, a motion of repeatedly punching by moving both hands back and forth alternately. In this case, the attacking motion can be determined from high and low pressures randomly input to the plurality of pressure sensors in the backrest. When such punching motion is used as the attacking motion, it may be determined whether the user is leaning frontward by a pair of front and rear pressure sensors provided in the seat bottom, and increase an attacking force if it is determined that the user is leaning frontward compared to when it is determined that the user is not leaning frontward. For example, it is possible to display a life gauge of the beast on the screen, and reduce the life gauge by a greater amount if it is determined that the attacking motion is made in a leaning-frontward posture compared to when it is determined that the attacking motion is made in a posture other than the leaning-frontward posture.

The attacking motion may, for example, be a motion of repeatedly kicking by moving both legs back and forth alternately. In this case, the attacking motion can be determined from high and low pressures randomly input to the plurality of pressure sensors in the backrest or the seat bottom. When such kicking motion is used as the attacking motion, it may be determined whether the user is leaning rearward by a pair of front and rear pressure sensors provided in the seat bottom, and increase the attacking force if it is determined that the user is leaning rearward compared to when it is determined that the user is not leaning rearward. Specifically, similar to the punching motion, the reduction of the life gauge may be set such that the stronger the attacking force, the greater the reduction amount of the life gauge of the beast. Further, the attacking force may be set such that the heavier the user, the greater the attacking force.

The above-described process of repelling the beast by the attacking motion may be used in various battle games. In this case, the target of attack may include, not only animals including human beings, but imaginative animals such as dragons, robots, structures such as cars, and other objects.

The seat experience system may have various functions as described below.

The seat experience system may comprise a plurality of, i.e., three or more, display devices. The plurality of display devices may be disposed, for example, at the front, right, left, and rear of the seat body. In this case, the seat may serve as a controller to operate the switching between the display devices. For example, the controller can change the display device to be controlled (controlled display device) based on the measurement values from the sensor, i.e., change a view on its screen in response to the user's motion, for example, to proceed to the next stage of the game. In one example, if the weight of the user is put on the right side of the user's body, the display device located on the right of the controlled display device may be defined as the next display device to be controlled, and if the weight of the user is put on the left side of the user's body, the display device located on the left of the controlled display device may be defined as the next display device to be controlled. If the seat body is installed to be rotatable about a vertical axis, the display device located at the front of the seat body may be the defined as the controlled display device.

The seat experience system may be configured to suggest a service to be provided after the experience by a voice or a view on the display device in response to a posture or a motion of the user experiencing the seat experience system. For example, a massage, a bath, a yoga lesson, etc., may be proposed to a user with a stiff or an intense motion.

The seat experience system may be configured to grant points (including scores of the game and points having a monetary value which can be used in other services and the like and given to the user by associating the points to the user's ID) to the user according to the contents of the experience or the posture and/or motion of the user. The definition of points is the same hereinafter. These points may preferably, but not necessarily, be used for services in various facilities, food and drinks, etc.

The seat experience system may be configured such that a plurality of systems (each comprising a seat body, a controller, etc.) are connected such as to be capable of communicating information with each other. In this case, it may be preferable, but not necessary, to provide a server that collects information communicated among the plurality of systems and transmits data and instructions to each system.

When a plurality of users are seated on corresponding systems and experience the seat experience at the same time, the seat experience system may be configured to allow the users to make a decision based on majority rule by shifting their weights. For example, shifting of one's weight to the right may mean Yes, and shifting of one's weight to the left may mean No. A decision such as whether or not to play the game once more may be made based on majority rule by this shifting of weight.

It is desirable to expand the range of entertainment provided by the seat experience system.

The seat experience system may comprise, not only a sensor capable of detecting the seating surface of the seat body, but also an input device provided on a member other than the seat body as a device to input signals to the controller.

Herein, for example, a sensor provided in the seat body is referred to as a first controller and a sensor provided in a member other than the seat body is referred to as a second controller.

Figure 14:
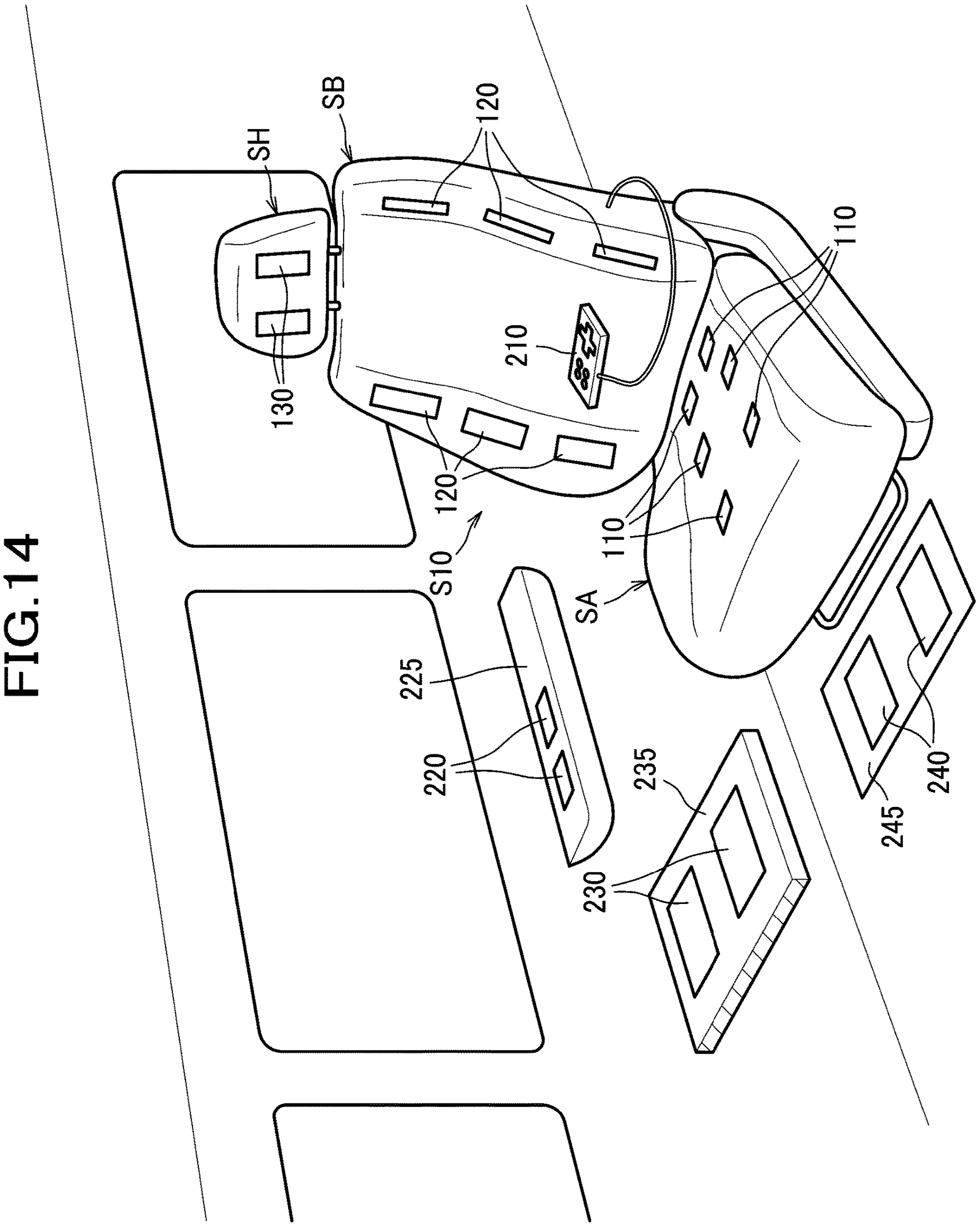
FIG. 14 is an illustration for explaining examples of controllers provided in the seat experience system.

As shown in FIG. 14, sensors 110 provided in the seat bottom SA, sensors 120 provided in the backrest SB, and sensors 130 provided in the head rest SH may be given as examples of the first controller provided in the seat body S10. The first controller provided in the seat body S10 may also include sensors of a mat placed on the seat body. That is, the first controller needs only to include a sensor that acquires information related to a user being seated, i.e., postures and motions of the user being seated on the seat body S10.

A push-button type hand-held controller 210 provided separately from the seat body S10, sensors 220 provided on an armrest 225 in a room or a vehicle, sensors 230 provided on a table 235 in the room or the vehicle, or on a table 235 located on the rear side surface of a front seat of two seats aligned in the front-rear direction, sensors 240 provided in a mat 245 placed on the floor in front of the seat body S10, etc. may be given as examples of the second controller.

The controller of the seat experience system may be configured to operate based on signals from both of the first controller and the second controller. This allows the controller to obtain information different from the information related to the user being seated, i.e., postures and motions of the user being seated on the seat body S10. Thus, the range of operational characteristics of an object operated by the controller can be expanded.

For example, it is possible to set a complicated operational characteristic for a single operated object.

It is also possible to operate a first operated object (for example, move a first character in a game) by the first controller, and operate a second operated object (for example, move a second character in the game) by the second controller.

An operational characteristic for an object controlled by a signal of the first controller, and an operational characteristic for an object controlled by a signal of the second controller may be different. For example, the first controller can control the propulsion and the speed of the object, and the second controller can control directions (left/right, up/down, front/rear, traveling directions such as directions in which the object jumps, which direction is the front) of the object. The amount of travel, the propulsion, etc., of the object controlled by the first controller, and the amount of travel, the propulsion, etc., of the object controlled by the second controller may be different. Changing of the operational characteristic by the controller can further widen the variation of operations.

If an abnormal condition of at least one of a plurality of controllers is detected, the controller may limit the operation of a controlled object. Herein, limit includes limitation of use of the seat experience system itself and/or limitation of execution of some of the applications executable in the seat experience system. Even if some of the controllers are in abnormal conditions, the operated object may be operated by the other controllers if the other controllers are not in abnormal conditions. Further, information on whether these controllers are operating normally or abnormally is preferably, but not necessarily, displayed on a display device and the like.

The seat experience system may comprise three or more controllers.

For example, a controller provided at the seating surface of the seat body may be a first controller, and controllers provided at locations other than the seat body may be a second controller and a third controller. In the example shown in FIG. 14, for example, the hand-held controller 210 may be the second controller, and the sensor 240 in the mat 245 may be the third controller.

In this case, an order of priority may be given to the controllers. For example, the first controller may be given the highest priority, the second controller may be given the next highest priority, and the third controller may be given the lowest priority. When a single controlled object is moved by the controllers, the controlled object may be moved in response to a signal from the controller having the highest priority according to the above-described order of priority. This order of priority may be freely set by a user via a selection switch or the like.

The seat experience system may be configured such that points given to the user change according to the controller that is being used.

Points given to the user may also be changed when a greater number of controllers are being used. The points given to the user may be made greater if a greater number of controllers are used. For example, ten points may be given if only the first controller is used, twenty points may be given if the first and second controllers are used, twenty points may be given if the first and third controllers are used, and thirty points may be given if the first, second, and third controllers are used.

A result of the above-described safari game, for example, the number of surprises, may be uploaded to a cloud server. In this case, a world ranking can be viewed via the cloud server. One's records may be stored in the cloud server and looked back later. Records of other participants may also be viewed. One's records and the records of other participants may be compared.

The above-described seat experience system may also be applied to an autonomous car. In this case, the seat experience system is preferably, but not necessarily, set to be usable on the condition that the car is being autonomously driven. While the seat experience system is being used, usage of the seat experience system preferably, but not necessarily, is limited before autonomous driving is cancelled. In this case, an advanced notification means may be operated to announce that usage of the seat experience system will be limited after a predetermined time period by a voice or display to avoid a sudden limitation of usage.

The seat experience system may be set to be usable only while the car is stopped. It can be determined that the car is stopped when the car speed is zero, when the shift lever is located in a parking position, etc.

The controller of the seat experience system may be capable of acquiring an abnormality in the outside environment or a malfunction of the seat experience system itself. In this case, it is preferable to limit usage of the seat experience system when an abnormality or a malfunction is acquired. Such malfunction of the seat experience system itself includes, for example, a malfunction of the sensor, a malfunction of a harness (breaking of a wire), a malfunction in a ECU, a communication error (including a malfunction of the terminal), a malfunction in a temperature control device such as a heater or a fan provided at the seat, a malfunction of an actuator for moving a part of or the whole seat, a malfunction of other sensors such as a seat weight sensor or a temperature sensor, malfunctions relating to the remaining amount or the state of usage of consumables such as the amount of air freshener left for the seat being small, a malfunction of the car controller itself, etc. Further, an abnormality in an external environment is, for example, a state which is not desirable for executing the application, which includes a state in which another car is approaching, the road condition is bad, the car speed is high, an earthquake has occurred, a destination is near, a destination has been reached, it is predicted that the game will not end before a destination is reached, the amount of fuel left is small, the battery level is low, the temperature or humidity inside or outside the car is high, etc.

The way to limit usage may include, limiting usage if an abnormality or malfunction is detected once, or limiting usage if abnormalities or malfunctions are detected a plurality of times. The manner in which usage is limited may be set by a couple of steps. For example, in a first step, a notification via a message or voice that recommends that it is preferable to stop usage is provided, in a second step, a notification via a message or voice that strongly suggests to stop usage is provided, and in a third step, the system is forced to shut down.

When a malfunction of a sensor in a predetermined location is detected, the seat experience system may be configured to recommend a game using other sensors with no malfunction detected. For example, if a malfunction has occurred in a sensor located at the seating surface of the seat bottom, a game is recommend that uses sensors located at side portions on the left and right sides of the seating surface of the seat bottom protruding from the seating surface.

Although the pressure sensors 21 to 26 are given as examples of a sensor in the above-described example, the sensor may be, for example, an optical sensor, a capacitive sensor, a sensor that detects the volume of sounds, etc.

The sensor may be provided at the left and right side portions of the seat bottom or the backrest (the portions protruding from the seating surfaces), the headrest, the armrest, or parts provided around the seat (instrument panel, door, or floor), etc.

The seat may be a car seat used in an automobile, or a vehicle seat other than a car seat, for example, a seat used in a ship, aircraft, etc. The seat is not limited to a vehicle seat and may also be, for example, a chair without legs (zaisu), a chair used as furniture or used outdoors, a chair for a hospital waiting room, a bench for a park, a bed, a mattress, etc.

Although the terminal 30 located in front of the seat S is given as an example of a terminal comprising a controller in the above-described example, the terminal may be, for example, a portable terminal such as a tablet or a smart phone. The terminal may be installed on the seat and may be provided integrally with the seat. The terminal may be a terminal constituting a car navigation system. Further, the controller may be provided at the seat.

The elements described in the above example embodiment and its modified examples may be implemented selectively and in combination.

SECOND EXAMPLE

Next, a second example of the seat system will be described referring to FIGS. 15 to 22.

Figure 15:
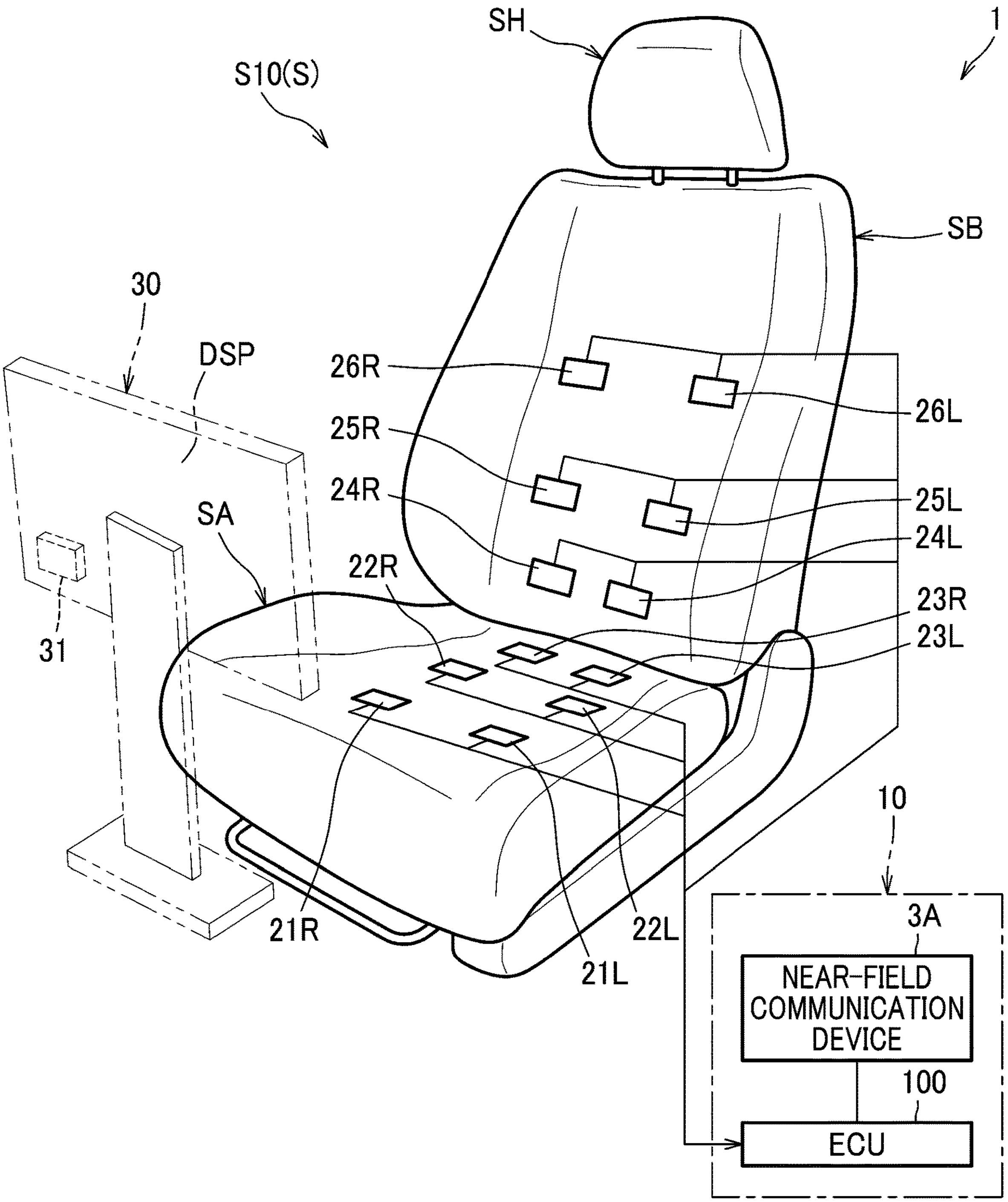
FIG. 15 is an illustration of a seat system (seat experience system) according to a second example.

As shown in FIG. 15, a seat experience system 1 as the seat system of the present example comprises a seat S and a seat experience device 10, similar to the first example.

As shown in FIG. 16, a seat bottom SA comprises a seat frame 11, a pad 12 that covers the seat frame 11, and an outer covering 13 that covers the pad 12. Pressure sensors 21 to 23 (pressure sensors 22 and 23 are shown in FIG. 16) are located between the pad 12 and the outer covering 13. An upper surface of the pad 12 located at a laterally central portion of the seat bottom SA extends horizontally in the left-right direction, and lateral ends of the pad 12 protrude outward further than the central portion toward a side on which a user is to be is seated. An upper surface of the outer covering 13 is a seating surface 15 which a user may contact. The seating surface 15 in this example includes a central portion 15C that is a laterally central portion of the seating surface 15, and side portions 15R, 15L that protrude further outward than the central portion 15C toward the side on which the user is to be seated.

In this example, the seat experience system 1 provides a tightrope game using the pressure sensors 21 to 23. In this example, the pressure sensors 21 to 23 are examples of sensors for acquiring measurement values for use in detecting motions of a user seated on the seat body S10 of the seat S. The tightrope game is a so-called simulation game in which a user can experience walking on a tightrope in simulation. The goal of the game is to walk across a rope having a predetermined length within a predetermined time limit. The game progresses at a bird's eye view viewing a person walking on the tightrope, as an example of an object traveling forward, from behind.

Figure 16A:
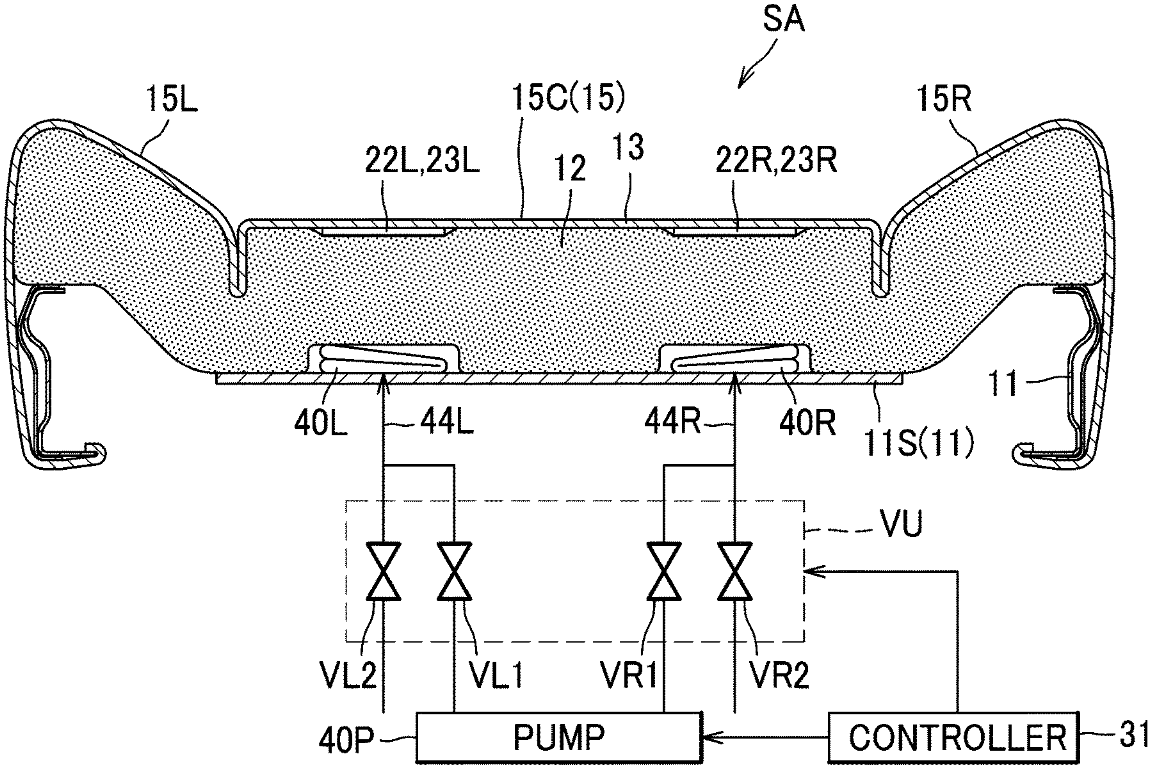
FIG. 16A is a cross-sectional view of a seat bottom, in which both air cells are deflated.
Figure 16B:
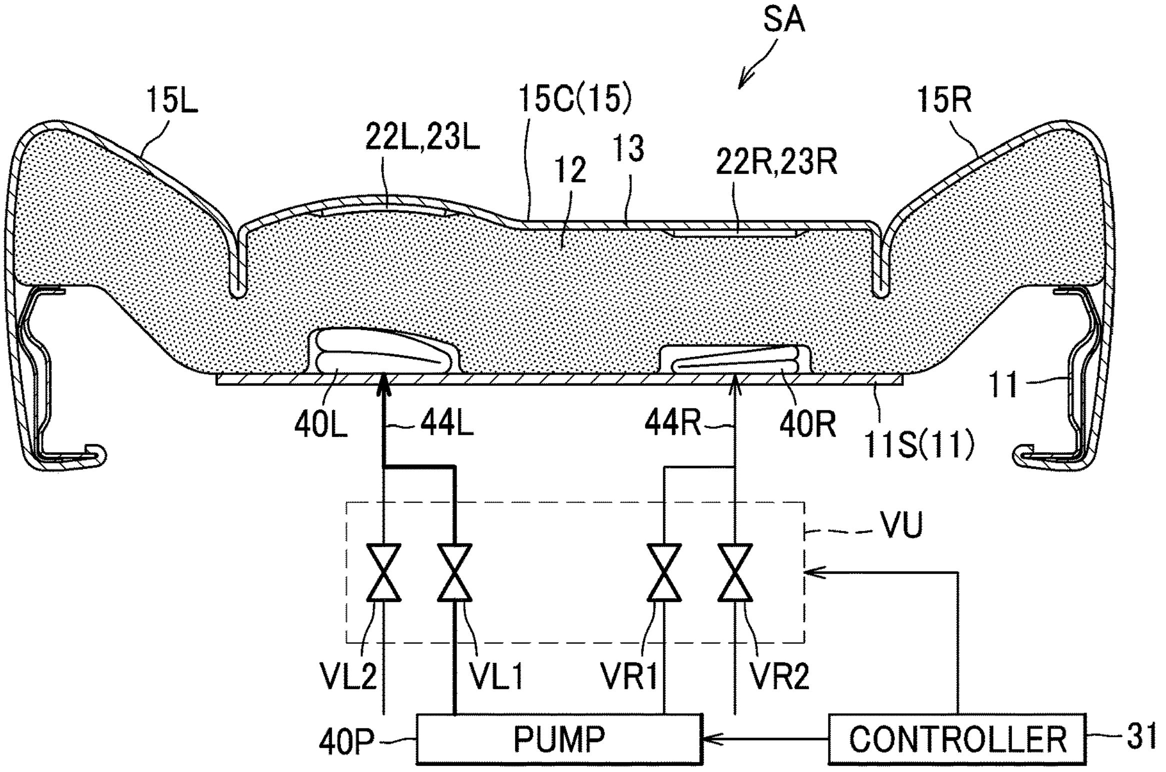
FIG. 16B is a cross-sectional view of the seat bottom, in which one of the air cells is inflated and the other of the air cells is deflated to thereby incline a seating surface.

As shown in FIGS. 16A, 16B, the seat bottom SA includes air cells 40R, 40L located under the pad 12. The air cells 40R, 40L are bags that can be inflated by air, and are examples of actuators provided in the seat body S10. The air cells 40R, 40L cause the surface (seating surface 15) of the seat body S10 to move toward the user or away from the user.

The seat frame 11 comprises a supporting portion 11S for supporting the pad 12 under the central portion 15C of the seating surface 15. The supporting portion 11S is formed in a shape of a plate. The air cells 40R, 40L are located between the pad 12 and the supporting portion 11S.

The right air cell 40R is located under the right pressure sensors 22R, 23R. The left air cell 40L is located under the left pressure sensors 22L, 23L. That is, the air cells 40R, 40L are provided as a pair of air cells located side by side in the left-right direction.

The seat body S10 further comprises a pump 40P, hoses 44R, 44L, and a valve unit VU located at appropriate areas such as areas under the seat bottom SA. The pump 40P supplies air to the air cells 40R, 40L. The hoses 44R, 44L connect the pump 40P and the air cells 40R, 40L. The valve unit VU adjusts air supplied to and discharged from the air cells 40R, 40L. Operation of the pump 40P and the valve unit VU is controlled by a controller 31.

The hose 44L connects the pump 40P and the air cell 40L. The valve unit VU comprises an inlet valve VL1 disposed between the pump 40P and the air cell 40L, and an outlet valve VL2 disposed between the air cell 40L and a passage open to the atmosphere. If the inlet vale VL1 is opened and the outlet valve VL2 is closed while the pump 40P is operating, air is supplied to air cell 40L to inflate the air cell 40L as shown in FIG. 16B. This pushes the seating surface 15, mainly the central portion 15C thereof, toward the user. The seating surface 15 of the seat bottom SA is thus generally inclined to the right.

On the other hand, if the pump 40P is stopped and the outlet valve VL2 is opened, air is discharged from the air cell 40L, and the air cell 40L is deflated as shown in FIG. 16A. The left side of the seating surface 15 is thereby retracted to make the central portion 15C of the seating surface 15 flat in the left-right direction (hereinafter, referred to simply as "the seating surface 15 is flat").

Similar to the air cell 40L, the hose 44R, the inlet valve VR1, and the outlet valve VR2 are provided for the air cell 40R. The seating surface 15 of the seat bottom SA is generally inclined to the left when the air cell 40R is inflated.

By moving the air cells 40R, 40L in this way, it is possible to advance/retract the seating surface 15 in contact with the user toward or away from the user and incline the seating surface 15.

In this example, the controller 31 is mainly configured as follows to provide the tightrope game.

The controller 31 instructs the user to assume a predetermined posture or to make a predetermined motion, and causes the seating surface 15 to move on the condition that measurement values (pressure values) acquired by the pressure sensors 21 to 23 have changed. In this example, the controller 31 instructs the user to sit on the seat body S10 with his/her weight equally balanced on the left and right as the predetermined posture. Further, the controller 31 instructs the user to move his/her legs alternately as the predetermined motion.

When the pressures change from the state of being equally balanced on the left and right to an unbalanced state, the controller 31 determines that the pressures have changed, and moves the air cells 40R, 40L to move the seating surface 15. Specifically, an average pressure of the pressure sensors 22R, 23R located under the buttocks of the user is set as the right side buttock pressure $P1_R$, and an average pressure of the pressure sensors 22L, 23L located under the buttocks of the user is set as the left side buttock pressure $P1_L$. When the difference between the pressure $P1_R$ and the pressure $P1_L$, acquired by the left and right pressure sensors 22R, 23R, 22L, 23L, exceeds a threshold value $P1th$, the controller 31 causes the air cells 40R, 40L to move.

If neither of the air cells 40R, 40L is pressurized when the difference between the pressures $P1_R$, $P1_L$ exceeds the threshold value $P1th$, the controller 31 pressurizes one of the air cells 40R, 40L corresponding to the smaller of the pressures $P1_R$, $P1_L$ to push one of the left and right sides of the seating surface 15 outward. This causes the seating surface 15 to be inclined in the left-right direction. The user is thereby pushed upward by one side of the seating surface 15 of the seat bottom SA and caused to tilt toward the other side of the seating surface 15.

If one of the air cells 40R, 40L is pressurized when the difference between the pressures $P1_R$, PILL exceeds the threshold value $P1th$, the controller 31 deflates the pressurized air cell 40 if the pressure P1 exerted on the side of the pressurized air cell 40 is higher than the pressure P1 exerted on the side of the other air cell 40. The protruding side of the seating surface 15 is thereby retracted to make the seating surface 15 flat. That is, if the user puts his/her weight heavily on the side of the seating surface 15 bulging (inflated) and lightly on the side of the seating surface 15 not bulging (not inflated), one of the air cells 40R, 40L, which is inflated, will be deflated and the seating surface 15 will become flat.

The controller 31 displays on a display DSP a person walking on a tightrope, as an object traveling forward, and if the seating surface is inclined to the left or right, displays the object on the display DSP tilted to the same side, i.e., to the left or right, as the side in which the seating surface 15 is inclined. If the seating surface is not inclined to the left or right, the controller 31 displays the person on the display DSP without causing the person to tilt to the left or right.

If the seating surface 15 is not inclined to the left or right, the controller 31 can cause the object on the display DSP to travel forward. Further, if it is determined that the user is moving his/her legs alternately up and down based on the respective measurement values ($P2_R$, $P2_L$) of the pressure sensors 21R, 21L, the controller 31 increases the traveling speed of the person shown on the display DSP.

Next, an example of a process executed by the controller 31 will be described referring to flowcharts.

Figure 17:
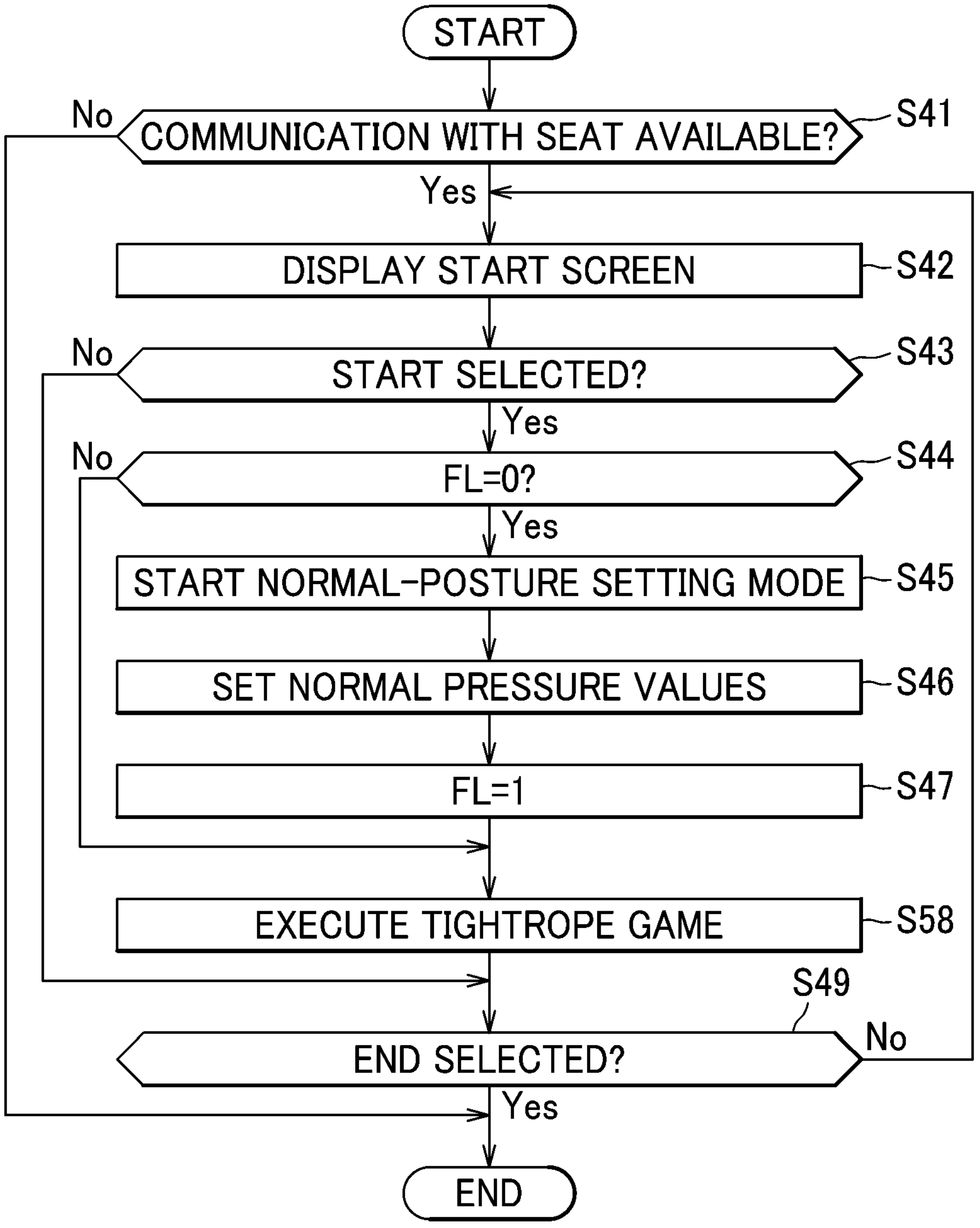
FIG. 17 is a flowchart showing a process executed by a terminal.

When the user launches an application for playing the tightrope game, the controller 31 starts the process shown in FIG. 17 (START). In this process, the controller 31 first determines whether or not communication with the seat S is available (S41).

If it is determined in step S41 that communication is not available (No), the controller 31 ends the present process. If it is determined in step S41 that communication is available (Yes), the controller 31 causes a start screen for the tightrope game (see FIG. 20A) to be shown on the display DSP (S42).

Figure 20A:
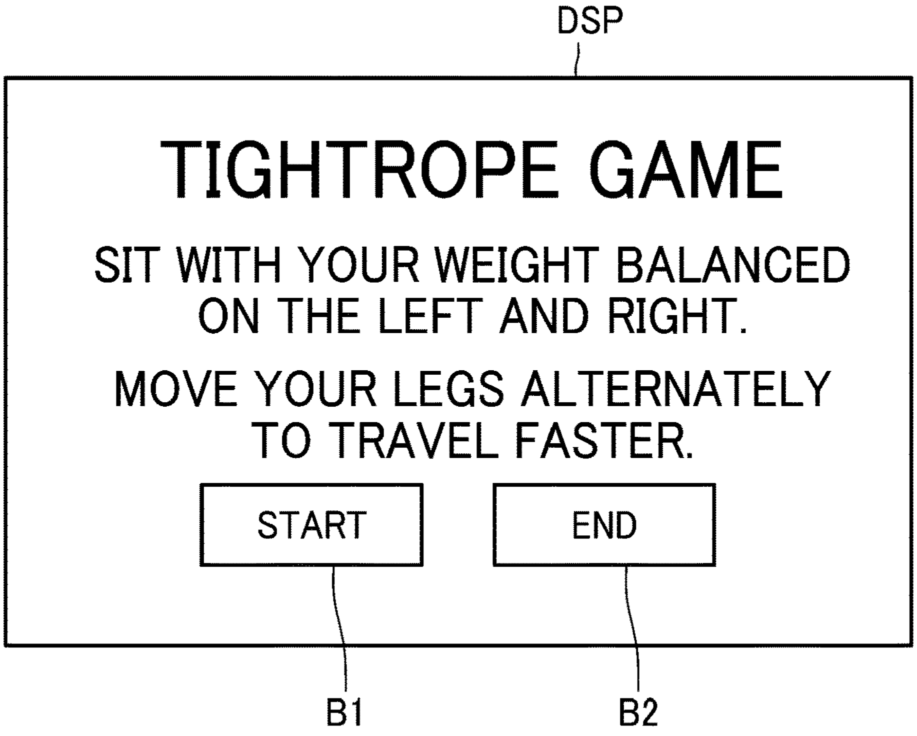
FIG. 20A is an illustration showing a start screen.

On the start screen shown in FIG. 20A, a start button B1 for starting the tightrope game and a button B2 for ending the tightrope game is displayed. Further, messages "sit with your weight balanced on the left and right" and "move your legs alternately to travel faster" are displayed as instructions to the user.

Referring back to FIG. 17, after step S42, the controller 31 determines whether or not the start button B1 has been selected (S43). If it is determined in step S43 that the start button B1 has been selected (Yes), the controller 31 determines whether or not a flag FL is 0 (S44). The flag FL indicates whether a normal-posture setting mode for the tightrope game has been executed in the past.

The normal-posture setting mode is a mode in which an ordinary sitting posture of the user is set as a normal posture. In the normal-posture setting mode, the controller 31 acquires values of pressure from the user in the ordinary posture, and sets normal pressure values that serve as a basis for setting the threshold value $P1th$ for the tightrope game based on the values of pressure.

If it is determined in step S44 that FL is not set to 0 (No), i.e., the normal-posture setting mode has been executed in the past, the controller 31 skips the normal-posture setting mode (S45 to S47) and starts the tightrope game (S58). If it is determined in step S44 that FL is set to 0 (FL=0) (Yes), i.e., the normal-posture setting mode has not been executed in the past, the controller 31 starts the normal-posture setting mode (S45).

Figure 20B:
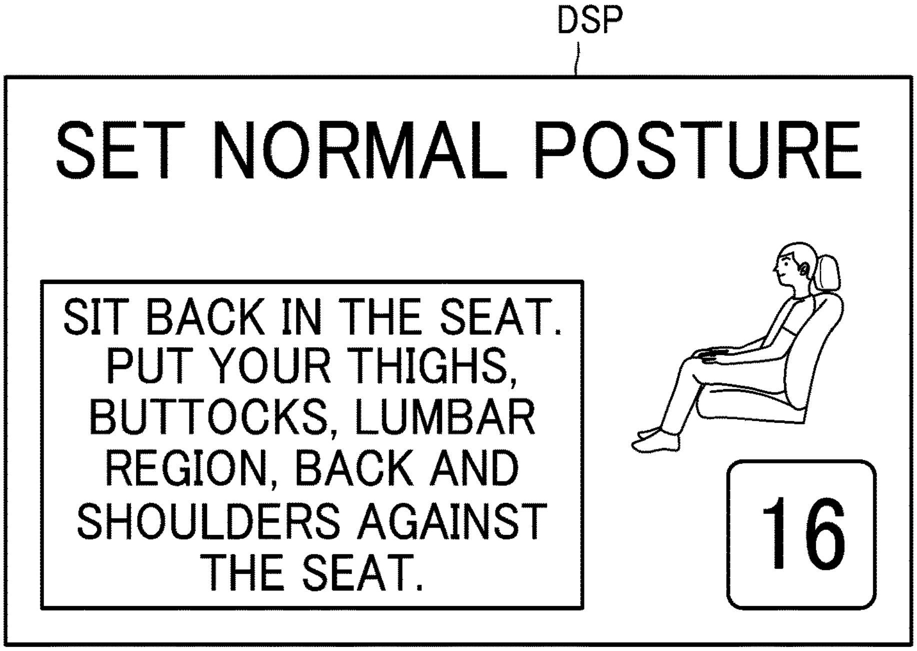
FIG. 20B is an illustration showing a screen for setting a normal posture.

When the normal-posture setting mode is started, the controller 31 displays the screen shown in FIG. 20B on the display DSP. The screen shown in FIG. 20B shows a message "Sit back in the seat. Put your thighs, buttocks, lumbar region, back and shoulders against the seat." and a countdown indicator indicating the remaining time for acquiring pressure values from the pressure sensors 21 to 26. In this example, the number "16" indicating a countdown of 16 counts is shown as the countdown indicator at the start of the normal-posture setting mode.

As shown in FIG. 17, the controller 31 sets respective average values of the pressure values acquired from the pressure sensors 21 to 26 as normal pressure values for the corresponding pressure sensors 21 to 26 (S46). A value determined by multiplying an average value of the normal pressure values of pressure sensors 22R, 23R, 22L, 23L by a predetermined coefficient is set as a threshold value $P1th$. In this way, regardless of whether the weight of the user is high or low, the air cells 40R, 40L are operated in a similar manner when the weight on the left and the right are unbalanced.

After step S46, the controller 31 sets the flag FL to 1 (S47) and starts the tightrope game (S58). In the tightrope game, the controller 31 first causes a game screen shown in FIG. 21A to be displayed. A tightrope RP and trees W are shown on the game screen. Herein, the tightrope RP and trees W are constituents forming a background that rolls down on the display DSP as the game progresses so that an atmosphere of a person virtually walking a tightrope is created. The process of the tightrope game will be described later.

When the tightrope game ends, the controller 31 causes the start screen shown in FIG. 20A to be displayed. Referring back to FIG. 17, after step S58, or if it is determined No in step S43, the controller 31 determines whether or not the button B2 for ending the tightrope game has been selected (S49). If it is determined in step S49 that the button B2 has not been selected (No), the controller 31 returns to the process of step S42. If it is determined in step S49 that the button B2 has been selected (Yes), the controller 31 ends the present process.

Figure 18:
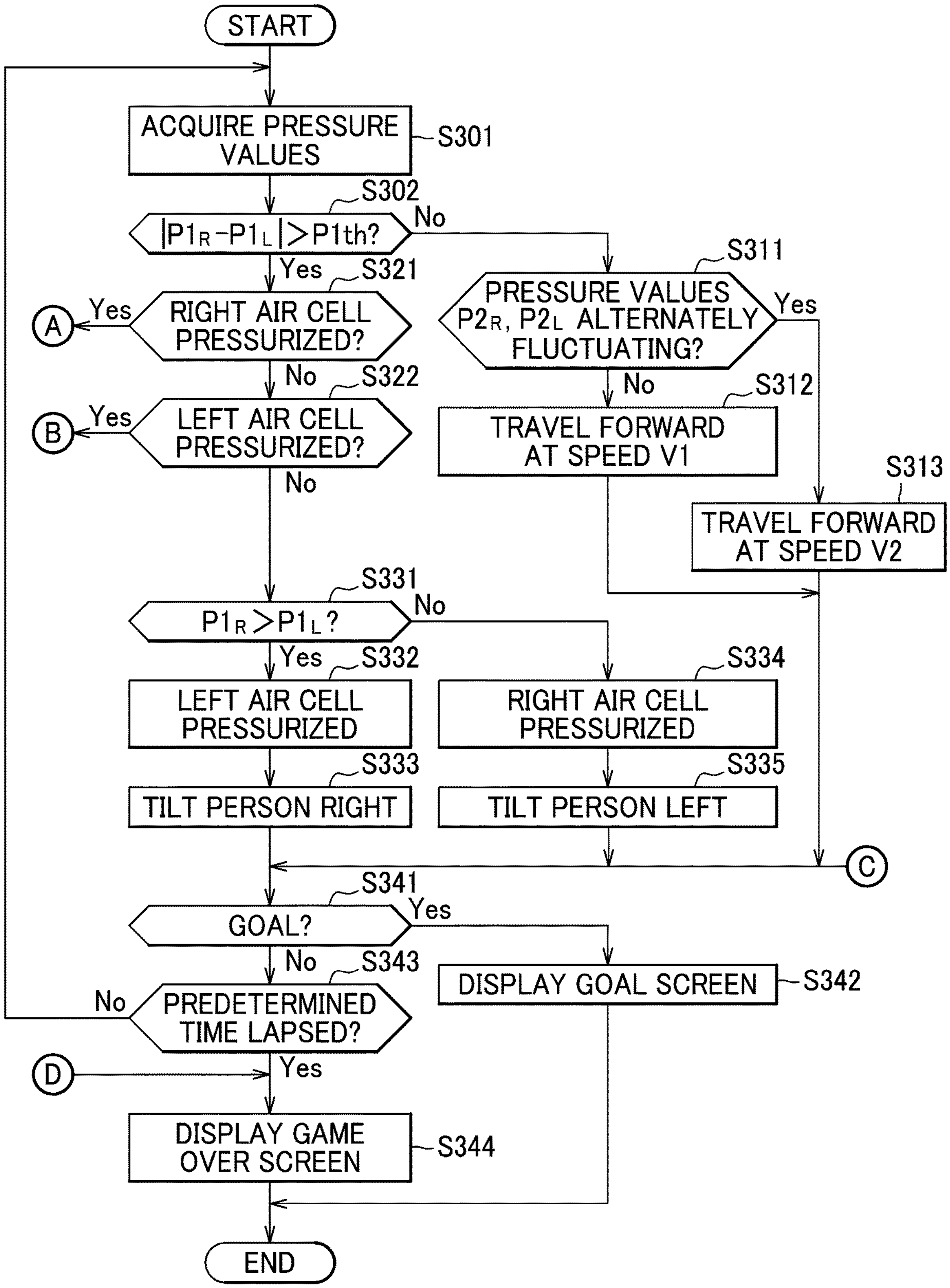
FIG. 18 is a flowchart showing a process executed during a tightrope game.

As shown in FIG. 18, when the tightrope game process is started, the controller 31 first acquires pressure values from each of the pressure sensors 21 to 26 (S301). In the tightrope game of the present example, the pressure values from the pressure sensors 21 to 23 of the seat bottom SA are used and the pressure values from the pressure sensors 24 to 26 of the backrest SB are not used.

The controller 31 determines whether or not the absolute value of the difference between pressure values $P1_R$, $P1_L$ is greater than the threshold value P1*th* (S302), and if not (No), the controller 31 determines if the pressure values $P2_R$ and $P2_L$ of the pressure sensors 21R, 21L are alternately fluctuating based on the pressure values $P2_R$ and $P2_L$ (S311). If it is determined that the pressure values $P2_R$ and $P2_L$ are not alternately fluctuating (No), the controller 31 causes the person on the display DSP to travel forward at a speed of V1 (S312), and if it is determined that the pressure values $P2_R$ and $P2_L$ are alternately fluctuating (Yes), the controller 31 causes the person on the display DSP to travel forward at a speed of V2 greater than V1 (S313).

Figure 19:
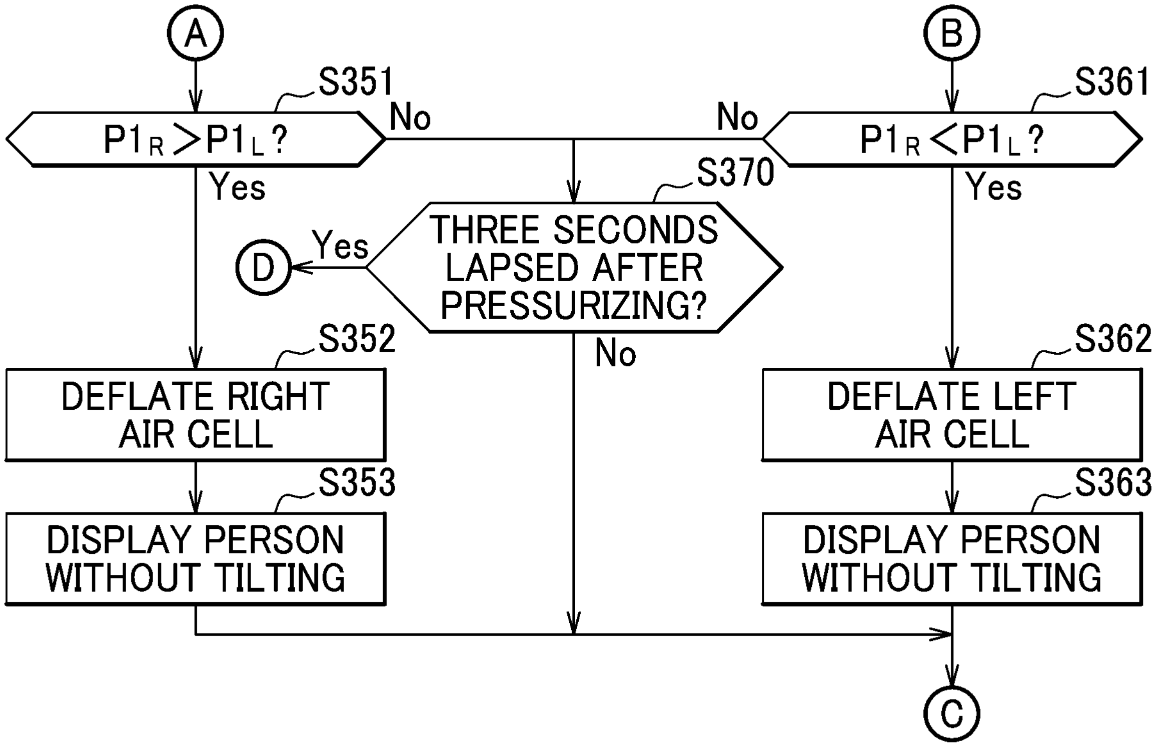
FIG. 19 is a flowchart showing a process executed during a tightrope game subsequent to the process shown in FIG. 18.

If it is determined in step S302 that the absolute value of the difference between pressure values $P1_R$ and $P1_L$ is greater than the threshold value P1*th* (Yes), the controller 31 determines whether the right air cell 40R is pressurized (S321), and if so (Yes), proceeds to step S351 of FIG. 19. If the right air cell 40R is not pressurized (No), it is determined whether the left air cell 40L is pressurized (S322), and if so (Yes), the controller 31 proceeds to step S361 of FIG. 19. The process of FIG. 19 will be described later. If the left air cell 40L is also not pressurized (No), i.e., if the seating surface 15 is flat, the controller 31 determines whether the pressure value $P1_R$ is greater than the pressure value $P1_L$ (S331). If the pressure value $P1_R$ is greater than the pressure value $P1_L$ (Yes), the controller 31 pressurizes the left air cell 40L (S332) and causes the person shown on the display DSP to tilt to the right (S333). On the other hand, if the pressure value $P1_R$ is not greater than the pressure value $P1_L$ (No), the controller 31 pressurizes the right air cell 40R (S334) and causes the person shown on the display DSP to tilt to the left (S335).

After steps S312, S313, S333, S335, the controller 31 determines whether the person has finished walking the tightrope, i.e., whether the distance the person traveled on the tightrope has reached a predetermined distance (S341), and if so (Yes), the controller 31 causes a goal screen to be displayed (S342) and ends the game process. On the other hand, if it is determined in step S341 that the person has not finished walking the tightrope, i.e., the distance the person traveled on the tightrope has not reached the predetermined distance (No), the controller 31 determines whether a predetermined time period (for example, thirty seconds) has lapsed from the start of the game (S343). If not (No), the controller 31 returns to step S301 and repeats the process. If so (Yes), the controller 31 causes a game over screen to be displayed (S344) and ends the game process.

The flowchart of FIG. 19 shows a process executed when the absolute value of the difference between the pressure $P1_R$ and the pressure $P1_L$ is greater than the threshold value P1*th*, i.e., an inclination from the left side to the right side of the seating surface 15 is greater.

When the right air cell 40R is pressurized and the inclination from the left side to the right side of the seating surface 15 is greater, the controller 31 determines in step S351 whether the pressure $P1_R$ is greater than the pressure $P1_L$. If the pressure $P1_R$ is greater than the pressure $P1_L$ (Yes), the controller 31 causes the air in the right air cell 40R to be deflated to depressurize the right air cell 40R (S352) and make the seating surface 15 flat. The controller 31 further causes the person shown on the display DSP to stand straight, i.e., not to tilt (S353), and proceeds to step S341.

If it is determined in step S351 that the pressure $P1_R$ is not greater than the pressure $P1_L$ (No), the controller 31 does not depressurize the right air cell 40R and proceeds to step S370.

On the other hand, if the left air cell 40L is pressurized and the inclination from the left side to the right side of the seating surface 15 is greater, the controller 31 determines in step S361 whether the pressure $P1_R$ is smaller than the pressure Ph. If the pressure $P1_R$ is smaller than the pressure $P1_L$ (Yes), the controller 31 causes the air in the left air cell 40L to be deflated to depressurize the left air cell 40L (S362) and make the seating surface 15 flat. The controller 31 further causes the person shown on the display DSP to stand straight, i.e., not to tilt (S363), and proceeds to step S341.

If it is determined in step S361 that the pressure $P1_R$ is not smaller than the pressure $P1_L$ (No), the controller 31 does not depressurize the left air cell 40R and proceeds to step 370.

The controller 31 determines, in step S370, whether a predetermined time period, for example, three seconds have lapsed after the air cells 40R, 40L have been pressurized. If it is determined that three seconds have lapsed (Yes), the controller 31 proceeds to step S344 and causes the game-over screen to be displayed. That is, if the seating surface 15 is inclined for three seconds due to the user losing left-right balance, the controller 31 ends the game. On the other hand, if it is determined that three seconds have not lapsed, the controller 31 proceeds to step S341.

Figure 21A:
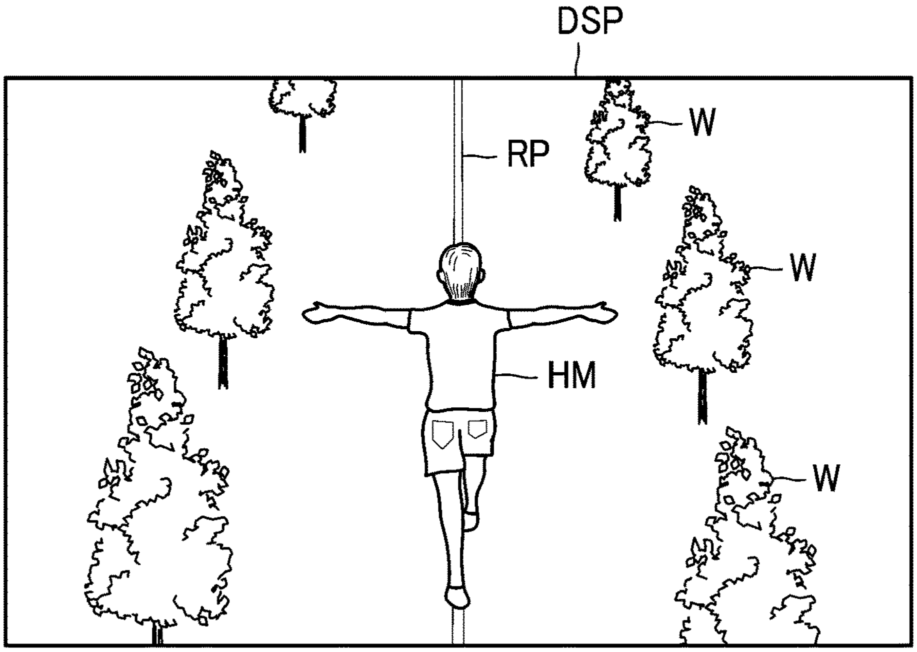
FIG. 21A is an illustration showing a screen after start of the tightrope game in which a person is not tilted.
Figure 21B:
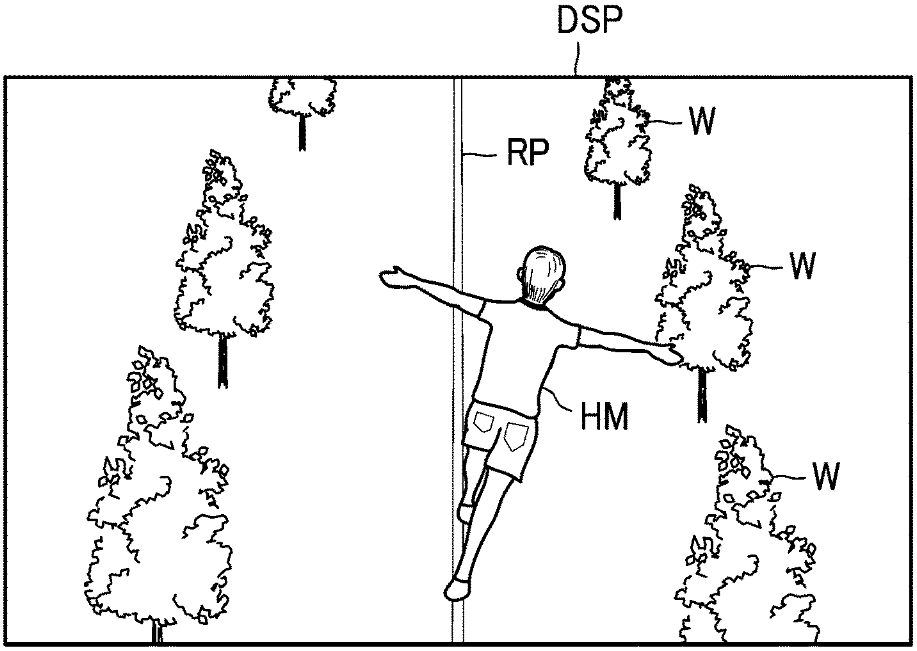
FIG. 21B is an illustration showing a screen after start of the tightrope game in which the person is tilted to the right.
Figure 22:
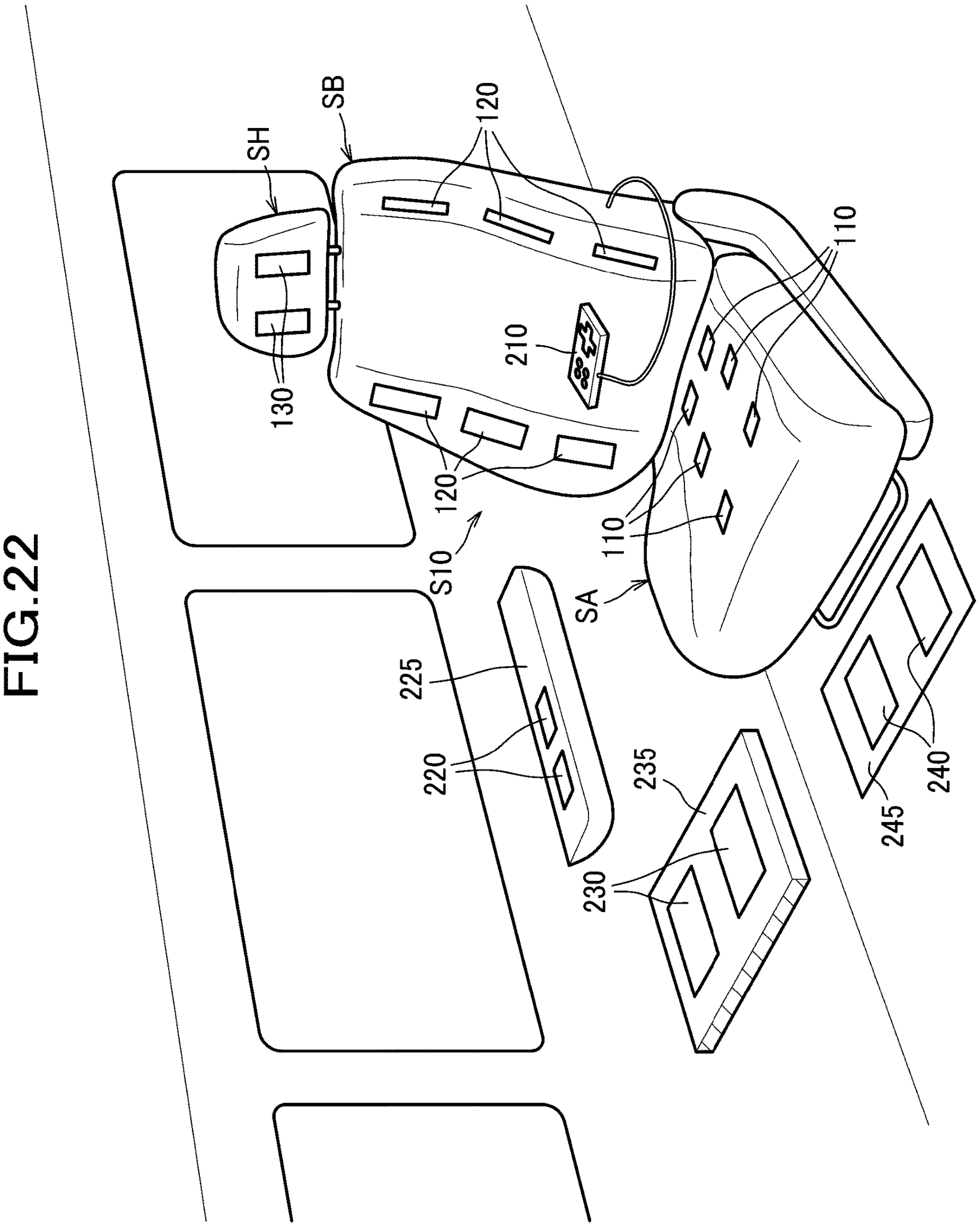
FIG. 22 is an illustration for explaining controllers provided in the seat experience system.

According to the above-described configuration, after the tightrope game is started, the controller 31 deflates both of the air cells 40R, 40L as shown in FIG. 16A, to make the seating surface 15 flat, and causes a screen to be displayed in which a person HM standing straight without being tilted to the left or right is walking on the rope RP such as shown in FIG. 21A.

If the user is sitting with his/her weight equally balanced on the left and right, and the absolute value of the difference between the pressure values $P1_R$, $P1_L$ is not greater than the threshold value P1*th*, the seating surface 15 does not move and the background rolls down on the display DSP causing the person HM to walk on the rope RP at a speed of V1.

If the user is sitting with his/her weight equally balanced on the left and right, the absolute value of the difference between the pressure values $P1_R$, $P1_L$ is not greater than the threshold value P1*th*, and the user is lifting his/her right and left legs alternately, the seating surface 15 does not move and the background rolls down on the display DSP causing the person HM to walk on the rope RP at a speed of V2.

If the user loses his/her balance and tilts to the right when the seating surface 15 is flat, the left air cell 40L is inflated to make the seating surface 15 incline to the right, and the person HM on the display DSP is also caused to tilt to the right.

If the user loses his/her balance and tilts to the left when the seating surface 15 is flat, the right air cell 40L is inflated to make the seating surface 15 incline to the left, and the person HM on the display DSP is also caused to tilt to the left.

If the user puts his/her weight on the left side when the seating surface 15 is inclined to the right, the left air cell 40L is deflated to make the seating surface 15 flat.

If the user puts his/her weight on the right side when the seating surface 15 is inclined to the left, the right air cell 40R is deflated to make the seating surface 15 flat.

In cases other than those described above, the air cells 40R, 40L do not move. The person HM reaches a goal if the person travels the predetermined distance, and the game is ended if the predetermined time period has lapsed from start of the game.

In such a seat experience system 1, if the user sits on the seat body S10 according to instructions from the controller 31 and loses his/her left-right balance, the seating surface 15 is inclined to intensify the sense of losing balance so that the user can experience losing his/her balance as if the experience is real. Since portions of the seating surface 15 that move are portions in which the pressure sensors 22R, 23R, 22L, 23L are located, the user can feel that the seating surface 15 is responding to a motion and/or a posture of the user.

Since the person HM on the display DSP is tilted to the same lateral side as that of the inclination of the seating surface 15 when the seating surface 15 is inclined to the left or the right, a more realistic experience can be provided to the user in conjunction with the screen shown on the display DSP.

The configuration of the second example can be incorporated into the above-described seat system of the first example. The elements described in the above example embodiments and its modified examples may be implemented selectively and in combination.

THIRD EXAMPLE

Next, the third example will be described referring mainly to FIGS. 23 to 31.

Figure 23:
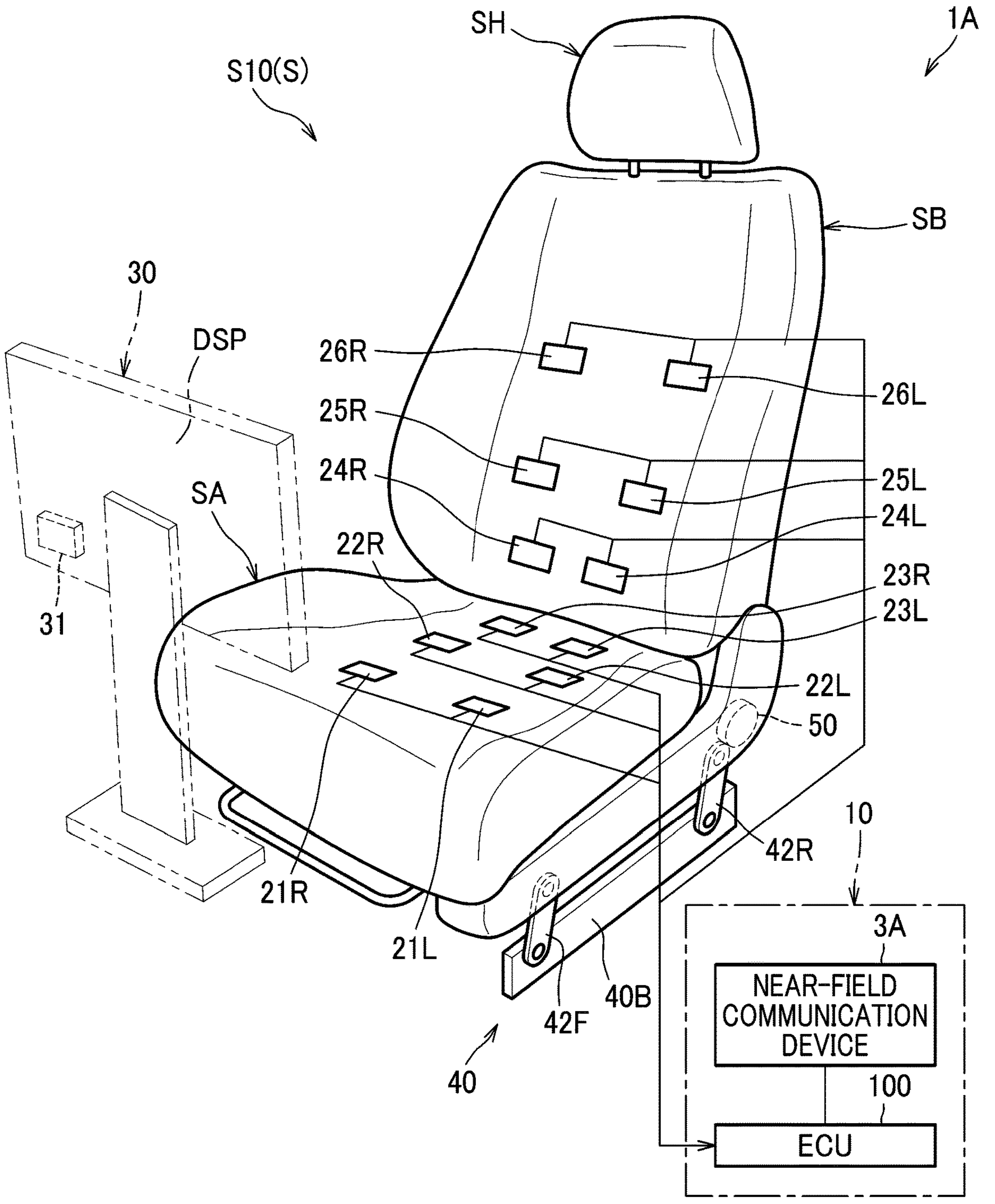
FIG. 23 is an illustration of a seat system according to a third example.

As shown in FIG. 23, a seat system 1A of the present example comprises a seat S and a seat experience device 10. The seat system 1A may be installed in an automobile, or a facility or the like other than an automobile.

The seat S comprises a seat body S10 and pressure sensors 21 to 26. The seat body S10 comprises a seat bottom SA, a backrest SB, and a headrest SH. The seat bottom SA and the backrest SB have outer coverings under which the plurality of pressure sensors 21 to 26 are provided.

Although not shown in the drawings, the seat bottom SA, the backrest SB, and the head rest SH each include a seat frame, a pad that covers the seat frame, and the outer covering that covers the pad. The plurality of pressure sensors 21 to 26 are located between the pad and the outer covering.

The pressure sensors 21 to 26 are arranged to be capable of detecting a state of a seating surface facing a user seated on the seat body S10. The pressure sensors 21 to 26 detect pressure exerted on the seating surface by the user seated on the seat body S10.

The respective pressure sensors 21 to 26 are provided in pairs, i.e., each located left and right, symmetric (side by side in the left-right direction) with respect to a laterally central position of the seat S. In the following description and drawings, pressure sensors 21 to 26 located on the left side may be identified by reference characters with "L" appended thereto, and pressure sensors 21 to 26 located on the right side may be identified by reference characters with "R" appended thereto.

The pressure sensors 21 to 23 are provided in the seat bottom SA.

The front-right sensor 21R, which is the right side sensor of the pressure sensors 21, is located frontward in the front-rear direction of a midsection of the seating surface of the seat bottom SA, and rightward in the left-right direction of a lateral midsection of the seating surface of the seat bottom SA. The front-right sensor 21R is located under the right thigh of the user and is capable of measuring pressure from the right thigh of the user.

The front-left sensor 21L, which is the left side sensor of the pressure sensors 21, is located frontward in the front-rear direction of the midsection of the seating surface of the seat bottom SA, and leftward in the left-right direction of the lateral midsection of the seating surface of the seat bottom SA. The front-left sensor 21L is located under the left thigh of the user and is capable of measuring pressure from the left thigh of the user.

The pressure sensors 22 and the pressure sensors 23 measure pressure from the buttocks of the user. Since the pair of pressure sensors 22 and the pair of pressure sensors 23 both measure pressure from the buttocks of the user, only one pair may be provided. The pressure sensors 22 and the pressure sensors 23 are located rearward of the midsection of the seating surface of the seat bottom SA in the front-rear direction.

The pressure sensors 22 and the pressure sensors 23 are located rearward of and distanced far from the pressure sensors 21. Specifically, the pressure sensors 23 are provided in positions corresponding to the lowermost portions of ischial bones of the user. These positions are subjected to the largest load of the user. The pressure sensors 22 are located a little frontward of the pressure sensors 23.

The pressure sensors 24 to 26 are provided in the backrest SB. The pressure sensors 24 are provided in positions corresponding to the back of the lumbar region of the user.

The pressure sensors 25 are located at positions a little higher than the positions of the pressure sensors 24.

The pair of pressure sensors 24 and the pair of pressure sensors 25 both measure pressure from the lumbar region of the user; thus, only one pair may be provided.

The pressure sensors 26 are located above and distanced far from the pressure sensors 24 and the pressure sensors 25. The pressure sensors 26 are located at positions corresponding to the shoulders of the user, and are capable of determining values of pressure from the shoulders of the user.

Figure 24C:
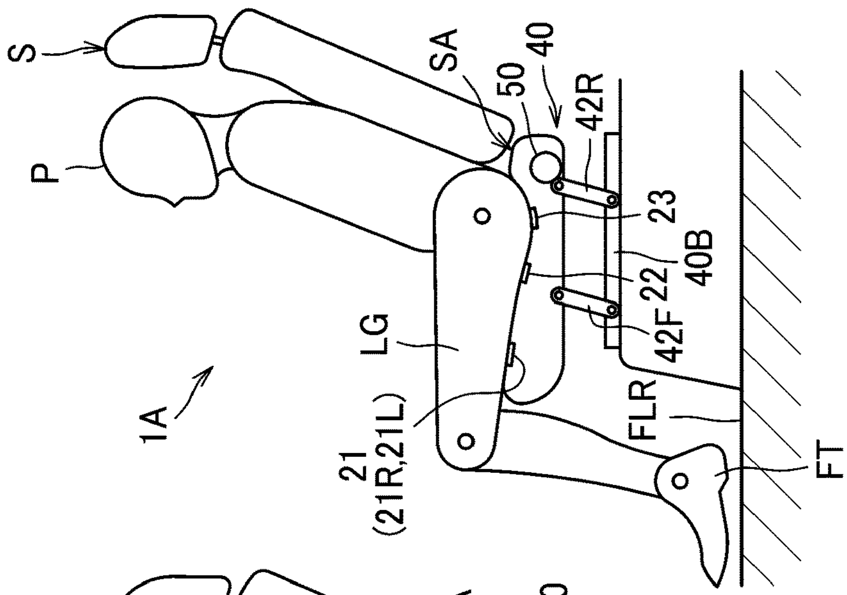
FIG. 24C is an illustration for explaining the vertical movement of the seat bottom, in which the seat bottom is located at a raised position.
Figure 24B:
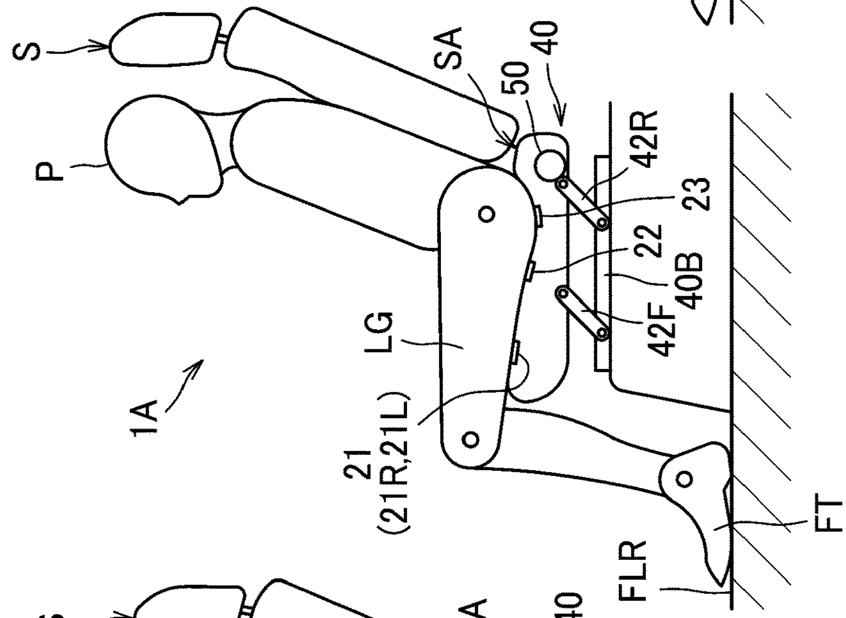
FIG. 24B is an illustration for explaining the vertical movement of the seat bottom, in which the seat bottom is located at an intermediate position.
Figure 24A:
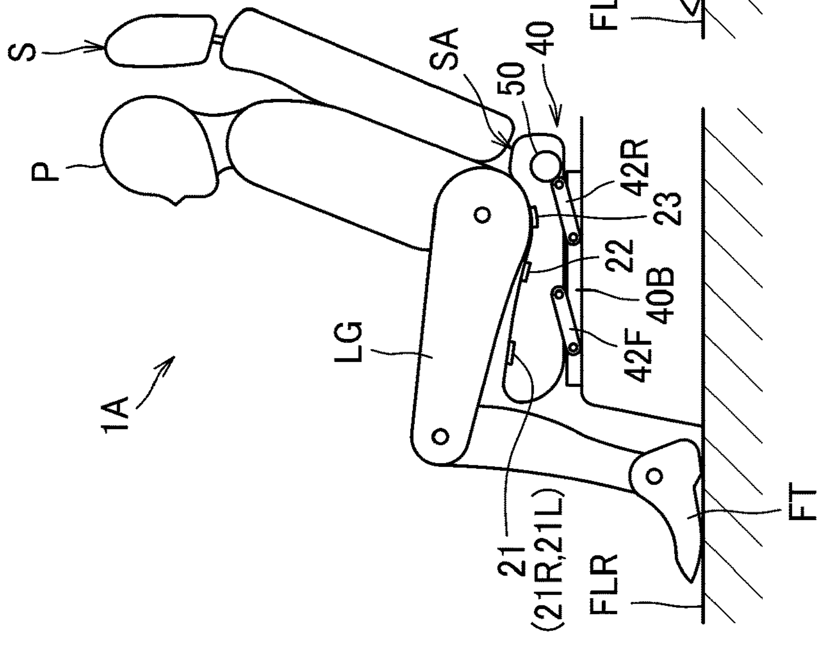
FIG. 24A is an illustration for explaining vertical movement of a seat bottom, in which the seat bottom is located at a dropped position.

The seat system 1A comprises a height-adjustment mechanism 40 configured to adjust a height of the seat bottom SA. The height-adjustment mechanism 40 comprises a base 40B, a front link 42F, a rear link 42R, and a drive source 50. The base 40B is installed on a room floor, an automobile floor, or a front-rear slide rail and supports the seat S. The front link 42F and the rear link 42R are rotatably connected to the base 40B at lower ends thereof, and are rotatably connected to a frame (not shown) of the seat bottom SA at upper ends thereof. The front link 42F is located frontward of the rear link 42R. The rear link 42R includes gear teeth (not shown) arranged on the upper end thereof along an ark with a center positioned on a rotation axis of the upper end. The drive source 50 includes a motor rotatable in the normal and reverse directions, and a reduction gear (not shown). An output gear that reduces the rotation speed of the motor is engaged with the gear teeth of the rear link 42R and rotates to causes the rear link 42R to rotate. As shown in FIGS. 24A to 24C, the base 40B, the front link 42F, the rear link 42R, and the frame of the seat bottom SA forms a four-bar linkage. As shown in FIG. 24A, the seat bottom SA is located at a lower position when the front link 42F and the rear link 42R are collapsed to nearly horizontal positions. When the seat bottom SA is located at the lower position, as shown in FIG. 24A, and the motor of the drive source 50 rotates in the normal direction, the front link 42F and the rear link 42R rise as shown in FIGS. 24B, 24C causing the seat bottom SA to move upward. On the other hand, when the seat bottom SA is located at a higher position as shown in FIG. 24C, and the motor of the drive source 50 rotates in the reverse direction, the front link 42F and the rear link 42R collapse as shown in FIGS. 24B, 24A causing the seat bottom SA to move downward.

Referring back to FIG. 23, the seat experience device 10 comprises an electronic control unit (ECU) 100 and a terminal 30. The terminal 30 comprises a controller 31.

A near-field communication device 3A which enables near-field wireless communication, such as Bluetooth (registered trademark), Wi-Fi (registered trademark), etc., is connected to the ECU 100. The ECU 100 is connected to the pressure sensors 21 to 26. In this example, the ECU 100 and the near-field communication device 3A is provided at the seat body S10.

The ECU 100 and the controller 31 each include a central processing unit (CPU), a read-only memory (ROM), a random-access memory (RAM), a rewritable nonvolatile memory, etc. (not shown), and execute a pre-stored program. The ECU 100 has a function of transmitting measurement values acquired from the pressure sensors 21 to 26 to the controller 31 via the near-field communication device 3A. That is, the controller 31 is connected to the pressure sensors 21 to 26 and is capable of acquiring measurement values from the pressure sensors 21 to 26.

The terminal 30 further includes a display DSP as a screen. Herein, the display DSP is a touch panel including buttons displayed thereon, which are operable by the user to start a game or to perform other operations. The controller 31 of the terminal 30 operates according to a program to control the height-adjustment mechanism 40 based on pressures detected by the pressure sensors 21 as well as to provide applications such as a game to an occupant. The terminal 30 is located in front of the seat body S10 with the display DSP facing the seat body S10.

In the present example, the seat system 1A can provide, as one example, a game using the pressure sensors 21 to 23, in which characters compete with each other in response to the user lifting his/her legs up and down. The controller 31 configured to provide such game determines that the right leg of the occupant P seated on the seat body S10 has been lifted when the occupant P lifts his/her right leg based on a pressure $\mathbf{P1}_R$ of the front-right sensor 21R decreasing. On the other hand, the controller 31 determines that the left leg of the occupant P seated on the seat body S10 has been lifted based on a pressure $\mathbf{P1}_L$ of the front-left sensor 21L decreasing. When it is determined that the right leg or the left leg has been lifted, a character shown on the display DSP is moved forward by one step. A detailed description of the contents and processes of the game will be omitted. An application that can be provided by determining that the right or left leg has been lifted is not limited to such competing game.

Next, adjustment of the height of the seat bottom SA will be described. FIGS. 24A to 24C show the occupant P seated on the seat body S10. If the seat bottom SA is located at a lower level as shown in FIG. 24A, feet FT of the occupant P may contact the floor FLR, legs LG of the occupant P may be located apart from the seat bottom SA, and almost no pressure may be exerted on the pressure sensors 21. In such case, the pressures $\mathbf{P1}_R$, $\mathbf{P1}_L$ of the pressure sensors 21 (21R, 21L) barely change even if the occupant P moves his/her legs LG up and down, which is disadvantageous for detecting the motions of the legs LG. If the height of the seat bottom SA is located at an intermediate level as shown in FIG. 24B, the feet FT of the occupant P may contact the floor FLR, and the legs LG of the occupant P may press the pressure sensors 21 at just the right amount of pressure and assume an appropriate state. If the height of the seat bottom SA is located at a higher level as shown in FIG. 24C, the feet FT of the occupant P may be located apart from the floor FLR, and the legs LG of the occupant P may press the pressure sensors 21 too much. In the case shown in FIG. 24C, the pressure values $\mathbf{P1}_R$, $\mathbf{P1}_L$ of the pressure sensors 21 (21R, 21L) change when the occupant P moves his/her legs LG up and down allowing the detection of the motions of the legs LG. However, it may be difficult for the applicant P to move his/her legs LG and/or the range of fluctuation of the pressures $\mathbf{P1}_R$, $\mathbf{P1}_L$ may change, compared to the appropriate state shown in FIG. 24B, which may prevent the controller 31 from making an appropriate determination of the motion.

Herein, although it is described that the height of the seat bottom SA is appropriate at the position shown in FIG. 24B, as one example, the appropriate position of the seat bottom SA changes depending on the lengths of the legs LG of the occupant P. Thus, in the seat system 1A of the present example, the controller 31 controls the height-adjustment mechanism 40 such that the relationship between the floor FLR and the height of the seating surface of the seat bottom SA becomes appropriate for the seated occupant P such as shown in FIG. 24B. This adjustment in height may be started when the user inputs instructions for adjustment via the display or other input means. Alternatively, the rearward pressure sensors 22, 23 of the seat bottom SA may detect pressure exerted by the weight of the occupant P and start the adjustment when values of the pressure become stable.

When the height of the seat bottom SA is adjusted, the controller 31 controls the height-adjustment mechanism 40 to change the height of the seat bottom such that pressures detected by the front-right sensor 21R and the front-left sensor 21L satisfy a predetermined condition. Specifically, the controller 31 causes the seat bottom SA to move upward if the pressures $\mathbf{P1}_R$, $\mathbf{P1}_L$ detected by the front-right sensor 21R and the front-left sensor 21L are equal to or smaller than a reference value Ps, and causes the seat bottom SA to stop if amounts of change per unit time ΔP in pressures detected by the front-right sensor 21R and the front-left sensor 21L become equal to or smaller than a first threshold value ΔPth1.

If the pressures $\mathbf{P1}_R$, $\mathbf{P1}_L$ detected by the front-right sensor 21R and the front-left sensor 21L are not equal to or smaller than the reference value Ps, the controller 31 causes the seat bottom SA to move downward until the amounts of change per unit time ΔP in pressures detected by the front-right sensor 21R and the front-left sensor 21L become equal to or greater than a second threshold value ΔPth2. Subsequently, the seat bottom SA is moved upward, and when the amounts of change per unit time ΔP in pressures detected by the front-right sensor 21R and the front-left sensor 21L become equal to or smaller than the first threshold value ΔPth1 the seat bottom SA is stopped.

In this example, the amount of change ΔP is the amount of change of the pressures per unit time and is a positive value. The amount of change ΔP for the pressure $\mathbf{P1}_R$ may be calculated, for example, as the absolute value of the difference between the previous value and the present value of the pressure $\mathbf{P1}_R$ ($|\Delta \mathbf{P1}_R|$). The amount of change ΔP for the pressure $\mathbf{P1}_L$ may also be calculated as the absolute value of the difference between the previous value and the present value of the pressure $\mathbf{P1}_L$ ($|\Delta \mathbf{P1}_L|$).

The reference value Ps is a value for determining whether the seat bottom SA is too low for a seated occupant, and is a value which causes the pressures $P1_R$, $P1_L$ to become too low for most occupants P.

The first threshold value ΔPth1 is a value greater than zero. The first threshold value ΔPth1 is a small value, but is an appropriate value set so that detection is also possible when the occupant P starts lifting his/her legs LG.

The second threshold value ΔPth2 is a value greater than the first threshold value ΔPth1, and is a value at which it is assumed that the pressures $P1_R$, $P1_L$ exhibit values close to the reference value Ps.

The pressures $P1_R$, $P1_L$ are usually approximately the same value. Thus, the determination of the condition of "whether or not the pressures $P1_R$, $P1_L$ are equal to or smaller than the reference value Ps" in the present example includes the following determinations and may include determinations equivalent to the following:

(1) The pressures $P1_R$, $P1_L$ are both equal to or smaller than the reference value Ps;

(2) At least one of the pressures $P1_R$, PILL is equal to or smaller than the reference value Ps;

(3) An average value of the pressures $P1_R$, $P1_L$ is equal to or smaller than the reference value Ps;

(4) Paying attention to only one of the pressures $P1_R$, $P1_L$, the one of the pressures $P1_R$, $P1_L$ is equal to or smaller than the reference value Ps.

The determination of the condition of whether or not the amount of change ΔP is greater (smaller) than a threshold value such as the first threshold value ΔPth1 includes the following determinations and may include determinations equivalent to the following:

(1) The amount of change $|\Delta P1_R|$ of the pressure $P1_R$ is greater (smaller) than the threshold value, and the amount of change $|\Delta P1_L|$ of the pressure $P1_L$ is greater (smaller) than the threshold value;

(2) At least one of the following conditions, i.e., the amount of change $|\Delta P1_R|$ of the pressure $P1_R$ being greater (smaller) than the threshold value, and the amount of change $|\Delta P1_L|$ of the pressure $P1_L$ being greater (smaller) than the threshold value, is satisfied;

(3) An average value of the amount of change $|\Delta P1_R|$ of the pressure $P1_R$ and the amount of change $|\Delta P1_L|$ of the pressure $P1_L$ is greater (smaller) than the threshold value;

(4) Paying attention to only one of the amount of change $|\Delta P1_R|$ of the pressure $P1_R$ and the amount of change $|\Delta P1_L|$ of the pressure $P1_L$, the one of the amounts of change is greater (smaller) than the threshold value.

In this example, the determination of the values of the pressures $P1_R$, $P1_L$ and the amounts of change ΔP will be described using (1) as an example.

Figure 25:
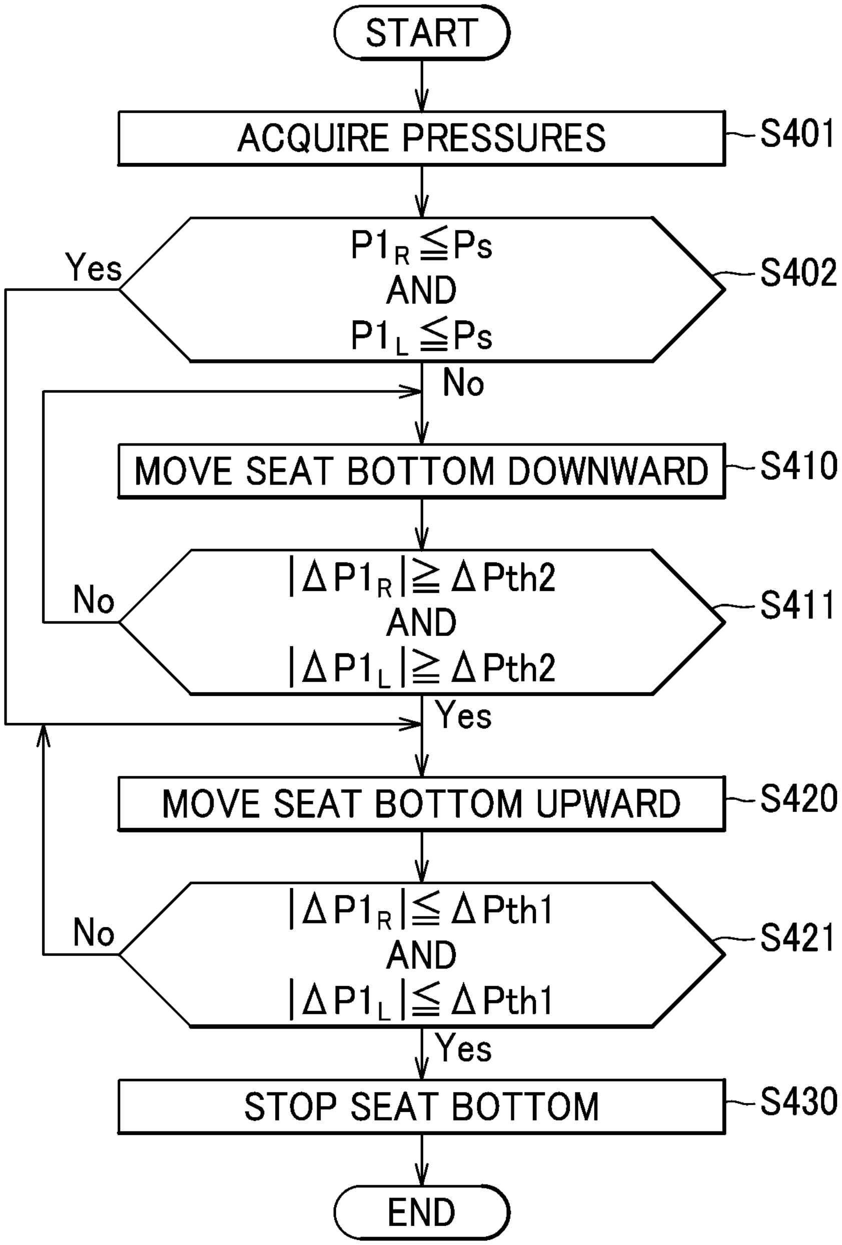
FIG. 25 is a flowchart showing a process executed by a controller.

Next, an example of a process executed by the controller 31 for adjusting the height of the seat bottom SA will be described with reference to FIG. 25. As shown in FIG. 25, when a process for adjustment of the height is started, the controller 31 first acquires the pressure 131R detected by the front-right sensor 21R and the pressure PILL detected by the front-left sensor 21L (S401). Then, the controller 31 determines whether the acquired pressure values $P1_R$, $P1_L$ are both equal to or smaller than the reference value Ps (S402). If it is not determined that the pressure values $P1_R$, $P1_L$ are both equal to or smaller than the reference value Ps (S402, No), the drive source 50 is controlled to move the seat bottom downward (S410). Subsequently, the controller 31 determines whether the amount of change $|\Delta P1_R|$ of the pressure $P1_R$, and the amount of change $|\Delta P1_L|$ of the pressure $P1_L$ are both equal to or greater than the second threshold value ΔPth2 (S411). If it is not determined that the amount of change $|\Delta P1_R|$ and the amount of change $|\Delta P1_L|$ are both equal to or greater than the second threshold value ΔPth2 (S411, No), the controller 31 returns to step S410 and continues to cause the seat bottom SA to move downward.

If it is determined in step S402 that the pressures $P1_R$, $P1_L$ are both equal to or smaller than the reference value Ps (Yes), or if it is determined in step S411 that the amount of change $|\Delta P1_R|$ and the amount of change $|\Delta P1_L|$ are both equal to or greater than the second threshold value ΔPth2 (Yes), the controller 31 controls the drive source 50 to move the seat bottom SA upward (S420).

Subsequently, the controller 31 determines whether the amount of change $|\Delta P1_R|$ and the amount of change $|\Delta P1_L|$ are both equal to or smaller than the first threshold value ΔPth1 (S421). If it is not determined that the amount of change $|\Delta P1_R|$ and the amount of change $|\Delta P1_L|$ are both equal to or smaller than the first threshold value ΔPth1 (S421, No), the controller returns to step S420 and continues to cause the seat bottom SA to move upward. If it is determined that the amount of change $|\Delta P1_R|$ and the amount of change $|\Delta P1_L|$ are both equal to or smaller than the first threshold value ΔPth1 (S421, Yes), the controller 31 stops the drive source 50 to stop the seat bottom SA (S430) and ends the process.

An example of an operation in which the height of the seat bottom SA is adjusted according to such process will be described.

Figure 26A:
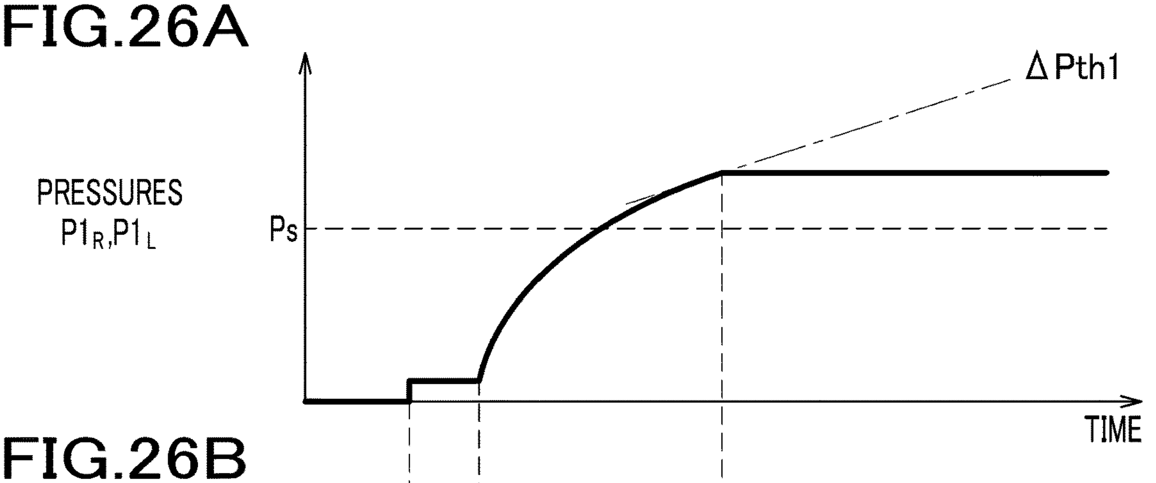
FIG. 26A is a timing chart showing fluctuation of pressure when the seat bottom on which an occupant is seated is too low.
Figure 26B:
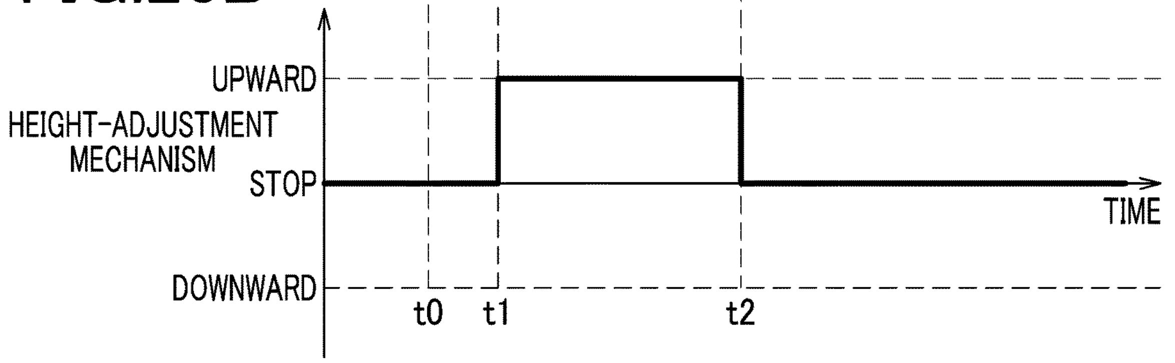
FIG. 26B is a timing chart showing operations of a height-adjustment mechanism when the seat bottom on which the occupant is seated is too low.

First, the case where the seat bottom SA is too low, as shown in FIG. 24A, will be described. As shown in FIGS. 26A, 26B, when the occupant P sits on the seat bottom SA at time to, adjustment of the height of the seat bottom SA is started in response to, for example, operation by the occupant P at time t1. At this point in time, the pressures $P1_R$, $P1_L$ are smaller than the reference value Ps; thus, the controller 31 controls the height-adjustment mechanism 40 to move the seat bottom SA upward (S402, Yes→S420). Then, the legs LG of the occupant P contact the upper surface of the seat bottom SA, and the force exerted on the seat bottom SA gradually increases which causes the pressures $P1_R$, $P1_L$ to increase. The amounts of change per unit time $|\Delta P1_R|$, $|\Delta P1_L|$ in the pressures $P1_R$, $P1_L$, i.e., the inclination of the graph shown in FIG. 26A gradually decreases, and when this inclination becomes equal to the first threshold value ΔPth1 (time t2), the controller 31 causes the seat bottom SA to stop (S421, Yes→S430).

Figure 27A:
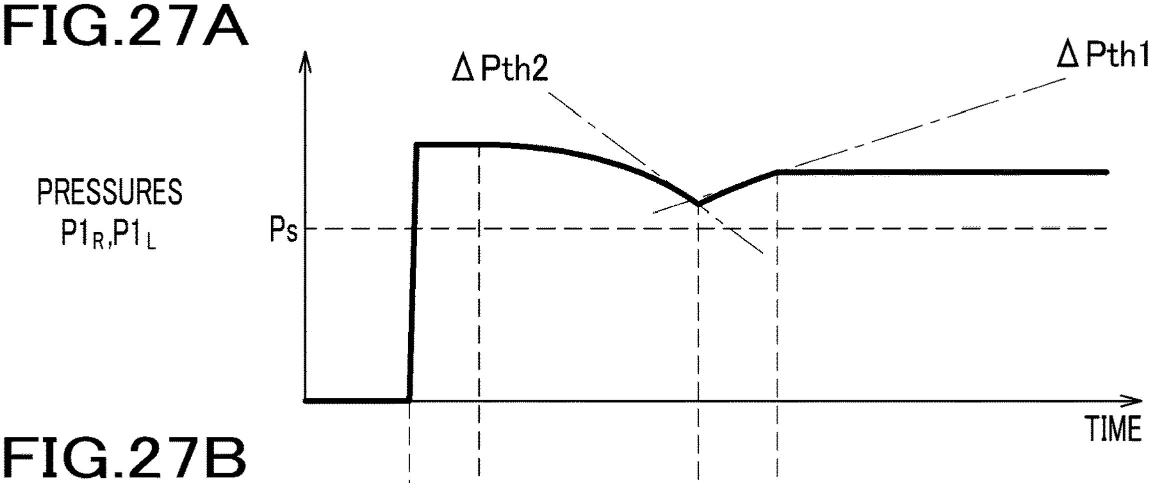
FIG. 27A is a timing chart showing fluctuation of pressure when the seat bottom on which the occupant is seated is too high.
Figure 27B:
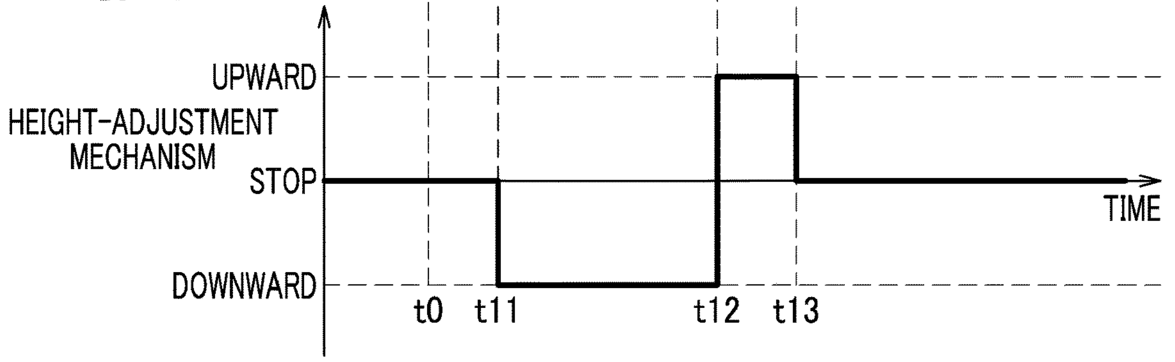
FIG. 27B is a timing chart showing operations of the height-adjustment mechanism when the seat bottom on which the occupant is seated is too high.

Next, the case where the seat bottom SA is too high, as shown in FIG. 24C, will be described. As shown in FIGS. 27A, 27B, when the occupant P sits on the seat bottom SA at time to, the controller 31 starts adjustment of the height of the seat bottom SA in response, for example, to operation by the occupant P at time t1. At this point in time, the pressures $P1_R$, $P1_L$ are greater than the reference value Ps (not equal to or smaller than Ps); thus, the controller 31 controls the height-adjustment mechanism 40 to move the seat bottom SA downward (S402, No→S410). Then, the feet FT of the occupant P contact the floor FLR which causes the pressures $P1_R$, $P1_L$ to decrease, and then the amounts of change per unit time $|\Delta P1_R|$, $|\Delta P1_L|$ in the pressures $P1_R$, $P1_L$, i.e., the inclination of the graph shown in FIG. 27A gradually increases. When this inclination becomes equal to the second threshold value ΔPth2 (time t12), the controller 31 causes the seat bottom SA to start moving upward (S411, Yes→S420). Subsequently, the pressure exerted on the upper surface of the seat bottom SA by the legs LG of the occupant gradually increases which causes the pressures $P1_R$, $P1_L$ to increase. The amounts of change per unit time $|\Delta P1_R|$, $|\Delta P1_L|$ in the pressures $P1_R$, $P1_L$, i.e., the inclination of the graph shown in FIG. 27A gradually decreases, and when this inclination becomes equal to the first threshold value ΔPth1 (time t13), the controller 31 causes the seat bottom SA to stop (S421, Yes→S430).

According to the seat system 1A of the above-described example, since the seat bottom SA comprises the front-right sensor 21R and the front-left sensor 21L, and the controller 31 controls the height-adjustment mechanism 40 such that the pressures detected by the front-right sensor 21R and the front-left sensor 21L satisfy a predetermined condition, it is possible to locate the seat bottom SA at an appropriate height for detecting the motions of the legs LG of the occupant P. Particularly, since the upward movement of the seat bottom SA from a lower position is stopped when the amounts of change per unit time $|\Delta P1_R|$, $|\Delta P1_L|$ in the pressures $P1_R$, $P1_L$ become equal to or smaller than the first threshold value ΔPth1, which is greater than zero, it is possible to set the height of the seat bottom SA at a height at which the pressures $P1_R$, $P1_L$ appropriately change when the occupant P moves his/her legs LG up and down, and to make it easier to detect the motions of the legs LG of the occupant P.

FOURTH EXAMPLE

Next a fourth example will be described. The seat system of the fourth example changes a height of a footrest instead of changing the height of the seat bottom SA as in the third example. Only parts of the fourth example that are different from the third example will be described.

Figures 28A, 28B, 28C:
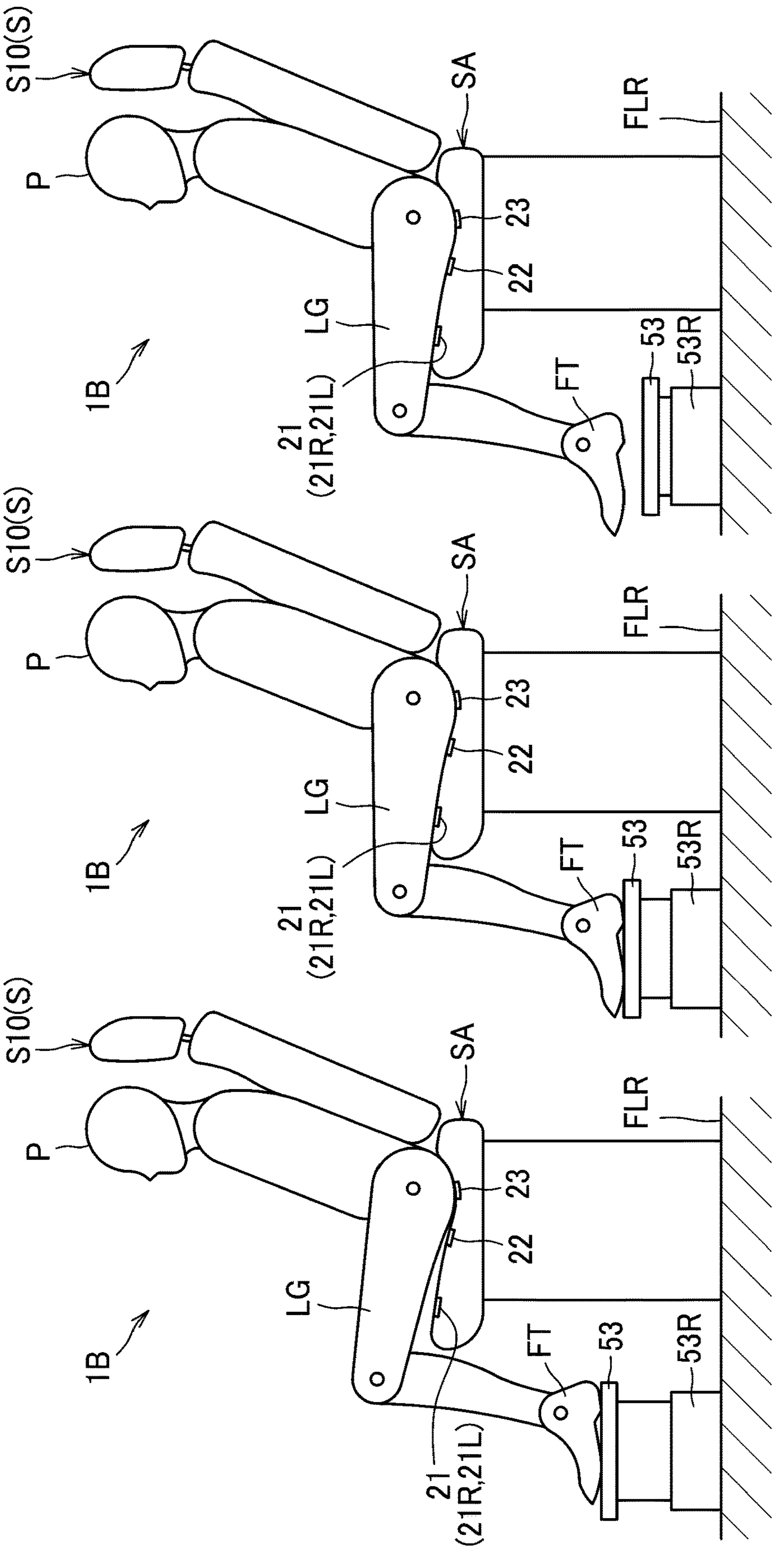
FIG. 28A is an illustration for explaining the vertical movement of a footrest of a fourth example, in which the footrest is located at a raised position.
FIG. 28B is an illustration for explaining the vertical movement of the footrest, in which the footrest is located at an intermediate position.
FIG. 28C is an illustration for explaining the vertical movement of the footrest, in which the footrest is located at a dropped position.

As shown in FIGS. 28A to 28C, a seat system 1B comprises a seat body S10 fixed to the floor FLR. The seat system 1B further comprises a footrest 53 for supporting the feet FT of an occupant P seated on a seat bottom SA, and a footrest-adjustment mechanism 53R for changing a height of the footrest 53. The footrest-adjustment mechanism 53R may be configured to support and move the footrest 53 up and down by, for example, a rack-and-pinion mechanism, a hydraulic cylinder mechanism, or a linear motor.

If the footrest 53 is located at a higher level as shown in FIG. 28A, the feet FT of the occupant P may be lifted up by the footrest 53, and almost no pressure may be exerted on the forward-right sensor 21R and the forward-left sensor 21L. In such case, the pressures $P1_R$, $P1_L$ of the pressure sensors 21 (21R, 21L) barely change even if the occupant P moves his/her legs LG up and down, which is disadvantageous for detecting the motions of the legs LG. If the footrest 53 is located at an intermediate level as shown in FIG. 28B, the feet FT of the occupant P may contact the footrest 53 as shown in FIG. 24B, and the legs LG of the occupant P may press the pressure sensors 21 at just the right amount of pressure and assume an appropriate state. If the height of the seat bottom SA is located at a lower level as shown in FIG. 28C, the feet FT of the occupant P may be located apart from the footrest 53, and the legs LG may press the pressure sensors 21 at a pressure too high.

A controller 31 of the fourth example is different from the third example in that it controls the footrest-adjustment mechanism 53R based on pressures detected by the pressure sensors 21. The controller 31 controls the footrest-adjustment mechanism 53R to change the height of the footrest 53 such that pressures detected by the front-right sensor 21R and the front-left sensor 21L satisfy a predetermined condition. Specifically, the controller 31 causes the footrest 53 to move downward if the pressures $P1_R$, $P1_L$ detected by the front-right sensor 21R and the front-left sensor 21L are equal to or smaller than a reference value Ps, and causes the footrest 53 to stop if amounts of change per unit time ΔP in pressures $P1_R$, $P1_L$ detected by the front-right sensor 21R and the front-left sensor 21L become equal to or smaller than a first threshold value ΔPth1.

If the pressures $P1_R$, $P1_L$ detected by the front-right sensor 21R and the front-left sensor 21L are not equal to or smaller than the reference value Ps, the controller 31 causes the footrest 53 to move upward until the amounts of change per unit time ΔP in the pressures $P1_R$, $P1_L$ detected by the front-right sensor 21R and the front-left sensor 21L become equal to or greater than a second threshold value ΔPth2. Subsequently, the footrest 53 is moved downward, and when the amounts of change per unit time ΔP in the pressures detected by the front-right sensor 21R and the front-left sensor 21L become equal to or smaller than the first threshold value ΔPth1, the footrest 53 is stopped.

Figure 29:
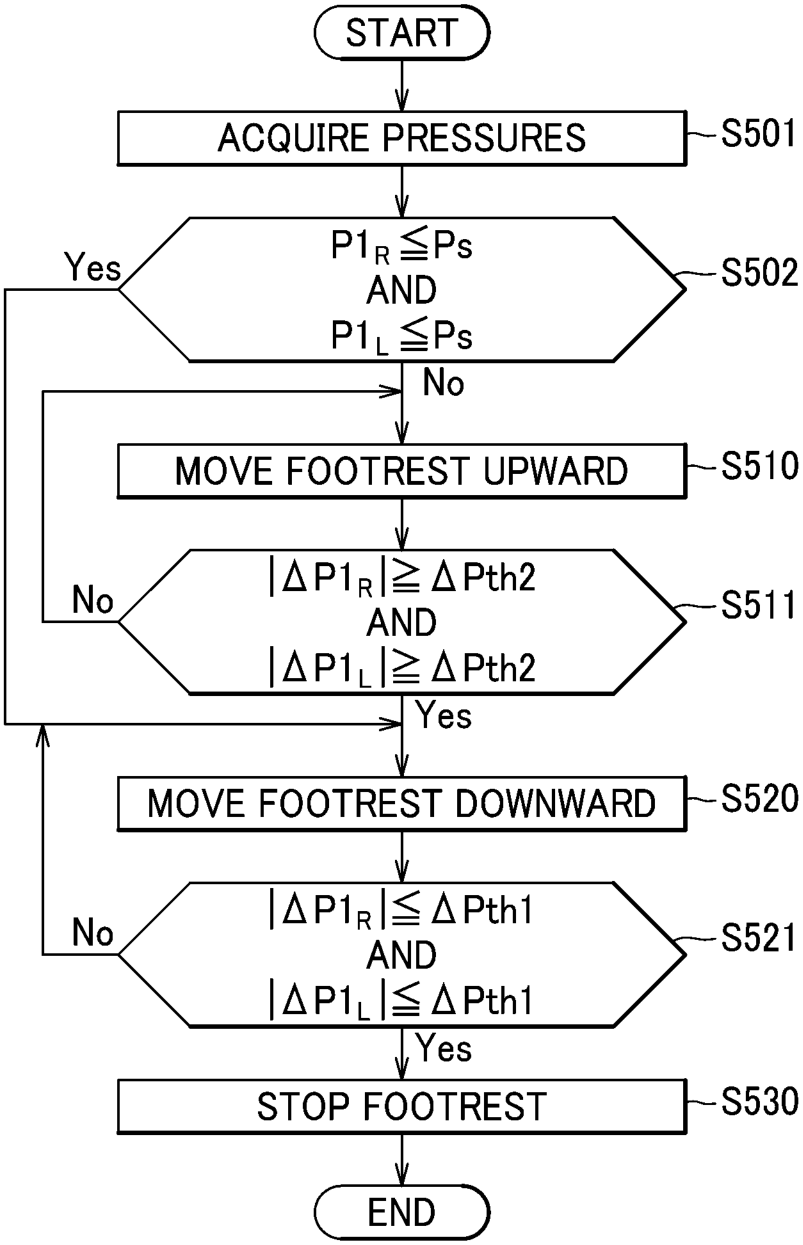
FIG. 29 is a flowchart showing a process executed by a controller of the fourth example.

Next, an example of a process executed by the controller 31 for adjusting the height of the footrest 53 (hereafter referred to as "footrest adjustment") will be described with reference to FIG. 29. As shown in FIG. 29, when the footrest adjustment is started, the controller 31 first acquires the pressure $P1_R$ detected by the front-right sensor 21R and the pressure $P1_L$ detected by the front-left sensor 21L (S501). Then, the controller 31 determines whether the acquired pressure values $P1_R$, $P1_L$ are both equal to or smaller than the reference value Ps (S502). If it is not determined that the pressure values $P1_R$, $P1_L$ are both equal to or smaller than the reference value Ps (S502, No), the controller 31 controls the footrest-adjustment mechanism 53R to move the footrest 53 upward (S510). Subsequently, the controller 31 determines whether the amount of change $|\Delta P1_R|$ of the pressure $P1_R$, and the amount of change $|\Delta P1_L|$ of the pressure $P1_L$ are both equal to or greater than the second threshold value ΔPth2 (S511). If it is not determined that the amount of change $|\Delta P1_R|$ and the amount of change $|\Delta P1_L|$ are both equal to or greater than the second threshold value ΔPth2 (S511, No), the controller 31 returns to step S510 and continues to cause the footrest 53 to move upward.

If it is determined in step S502 that the pressures $P1_R$, $P1_L$ are both equal to or smaller than the reference value Ps (Yes), or if it is determined in step S511 that the amount of change $|\Delta P1_R|$ and the amount of change $|\Delta P1_L|$ are both equal to or greater than the second threshold value ΔPth2 (Yes), the controller 31 controls the footrest-adjustment mechanism 53R to move the footrest 53 downward (S520).

Subsequently, the controller 31 determines whether the amount of change $|\Delta P1_R|$ and the amount of change $|\Delta P1_L|$ are both equal to or smaller than the first threshold value ΔPth1 (S521). If it is not determined that the amount of change $|\Delta P1_R|$ and the amount of change $|\Delta P1_L|$ are both equal to or smaller than the first threshold value ΔPth1 (S521, No), the controller 31 returns to step S520 and continues to cause the seat bottom SA to move downward, and if it is determined that the amount of change $|\Delta P1_R|$ and the amount of change $|\Delta P1_L|$ are both equal to or smaller than the first threshold value ΔPth1 (S521, Yes), the controller 31 controls the footrest-adjustment mechanism 53R to stop the footrest 53 (S530) and ends the process.

An example of an operation in which the height of the footrest 53 is adjusted according to such process will be described.

Figure 30A:
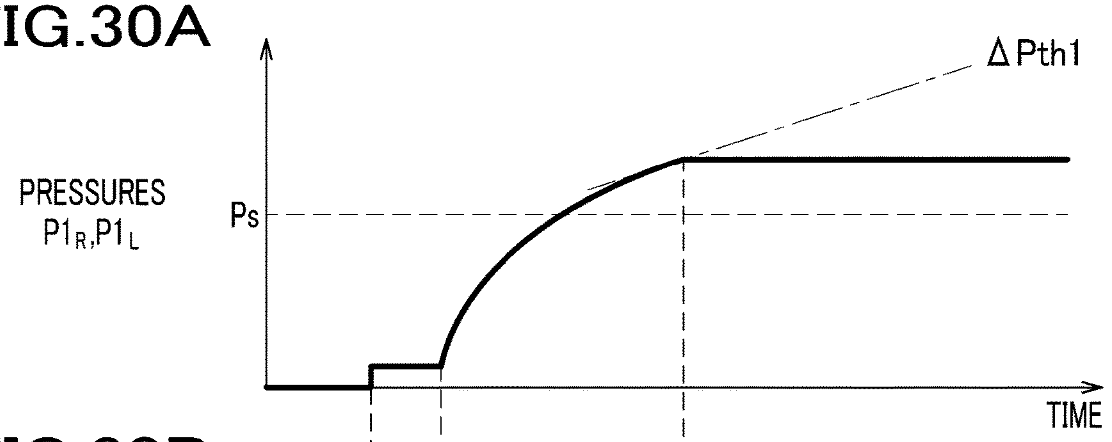
FIG. 30A is a timing chart of the fourth example showing fluctuation of pressure when the footrest for a seated occupant is too high.
Figure 30B:
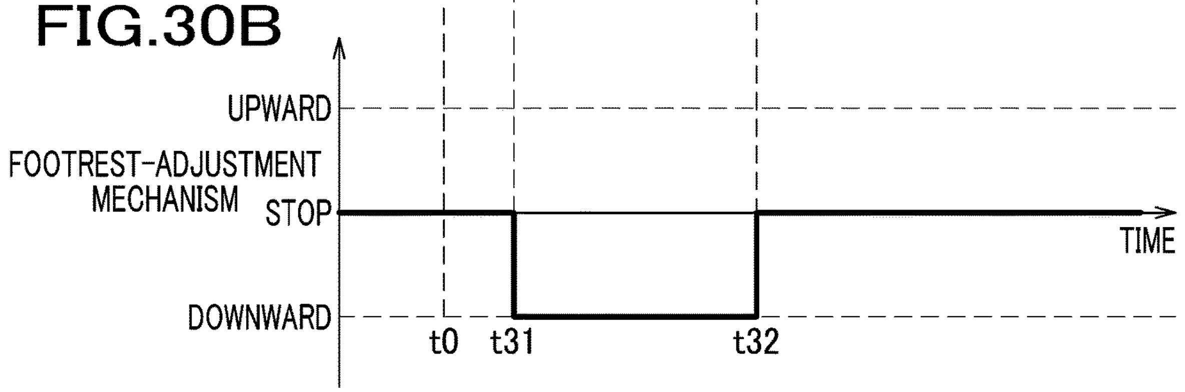
FIG. 30B is a timing chart of the fourth example showing operations of a footrest-adjustment mechanism when the footrest for the seated occupant is too high.

First, the case where the footrest 53 is too high, as shown in FIG. 28A, will be described. As shown in FIGS. 30A, 30B, when the occupant P sits on the seat bottom SA at time t0, the footrest adjustment is started in response to, for example, operation of the occupant P at time t31. At this point in time, the pressures $P1_R$, $P1_L$ are smaller than the reference value Ps; thus, the controller 31 controls the footrest-adjustment mechanism 53R to move the footrest 53 downward (S502, Yes→S520). Then, the legs LG of the occupant P contact the upper surface of the seat bottom SA, and the force exerted on the seat bottom SA gradually increases which causes the pressures $P1_R$, $P1_L$ to increase. The amounts of change per unit time $|\Delta P1_R|$, $|\Delta P1_L|$ in the pressures $P1_R$, $P1_L$, i.e., the inclination of the graph shown in FIG. 30A gradually decreases, and when this inclination becomes equal to the first threshold value ΔPth1 (time t32), the controller 31 causes the footrest 53 to stop (S521, Yes→S530).

Figure 31A:
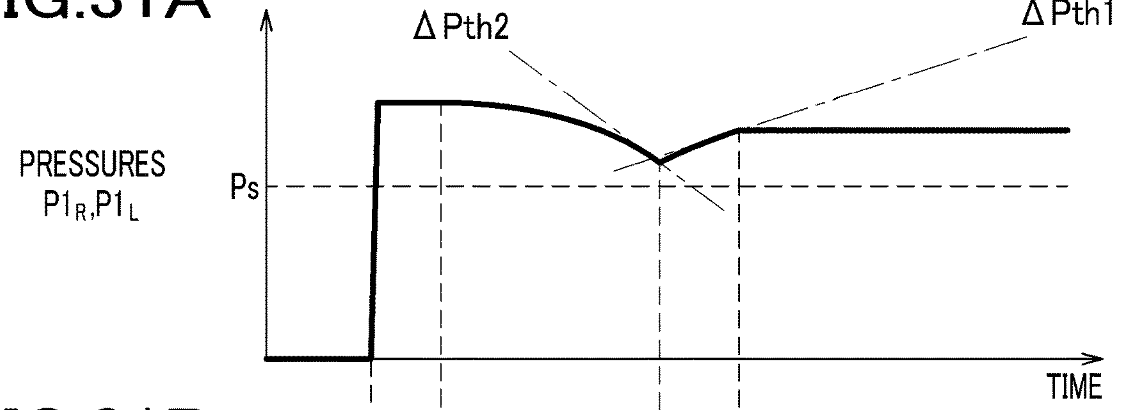
FIG. 31A is a timing chart of the fourth example showing fluctuation of pressure when the footrest for the seated occupant is too low.
Figure 31B:
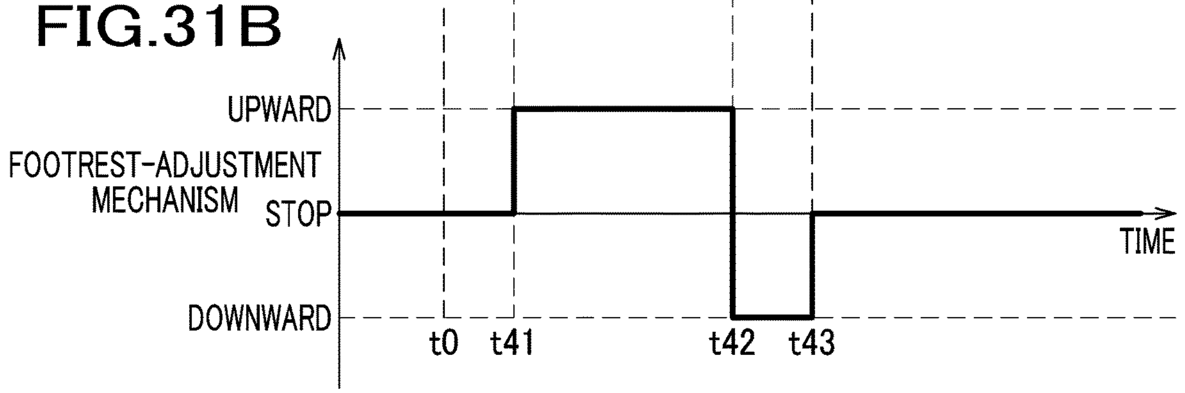
FIG. 31B is a timing chart of the fourth example showing operations of the footrest-adjustment mechanism when the footrest for the seated occupant is too low.

Next, the case where the footrest 53 is too low, as shown in FIG. 28C, will be described. As shown in FIGS. 31A, 31B, when the occupant P sits on the seat bottom SA at time to, the controller 31 starts the footrest adjustment in response to, for example, operation by the occupant P at time t41. At this point in time, the pressures $P1_R$, $P1_L$ are greater than the reference value Ps (not equal to or smaller than Ps); thus, the controller 31 controls the footrest-adjustment mechanism 53R to move the footrest 53 upward (S502, No→S510). Then, the feet FT of the occupant P contact the footrest 53 which causes the pressures $P1_R$, $P1_L$ to decrease. The amounts of change per unit time $|\Delta P1_R|$, $|\Delta P1_L|$ in the pressures $P1_R$, $P1_L$, i.e., the inclination of the graph shown in FIG. 31A gradually increases, and when this inclination becomes equal to the second threshold value ΔPth2 (time t42), the controller 31 causes the footrest 53 to start moving downward (S511, Yes→S520). Subsequently, the pressure exerted on the upper surface of the seat bottom SA by the legs LG of the occupant P gradually increases, which causes the pressures $P1_R$, $P1_L$ to increase. The amounts of change per unit time $|\Delta P1_R|$, $|\Delta P1_L|$ in the pressures $P1_R$, $P1_L$, i.e., the inclination of the graph shown in FIG. 31A gradually decreases, and when this inclination becomes equal to the first threshold value ΔPth1 (time t43), the controller 31 causes the footrest 53 to stop (S521, Yes→S530).

According to the seat system 1B of the above-described fourth example, since the seat bottom SA comprises the front-right sensor 21R and the front-left sensor 21L, and the controller 31 controls the footrest-adjustment mechanism 53R such that pressures detected by the front-right sensor 21R and the front-left sensor 21L satisfy a predetermined condition, it is possible to locate the footrest 53 at an appropriate height for detecting the motions of the legs LG of the occupant P. Particularly, since the downward movement of footrest 53 from a higher position is stopped when the amounts of change per unit time $|\Delta P1_R|$, $|\Delta P1_L|$ in the pressures $P1_R$, $P1_L$ become equal to or smaller than the first threshold value ΔPth1, which is greater than zero, it is possible to set the height of the footrest 53 at a height at which the pressures $P1_R$, $P1_L$ appropriately change when the occupant P moves his/her legs LG up and down, and to make it easier to detect the motions of the legs LG of the occupant P.

The third and fourth examples described above may be modified where appropriate, as will be described below.

Although the controller comprises the terminal 30 in the third and fourth examples, the ECU 100 may comprise the terminal. Further, the controller may be included in the seat body S10.

The configurations of the third and/or the fourth example may be implemented in the seat system of the above-described first or second example. The elements described in the above example embodiments and its modified examples may be implemented selectively and in combination.

FIFTH EXAMPLE

Next, a seat that may be used in the seat systems described in the first, second, third, and fourth examples will be described as a fifth example referring mainly to FIGS. 32 to 36.

Figure 32:
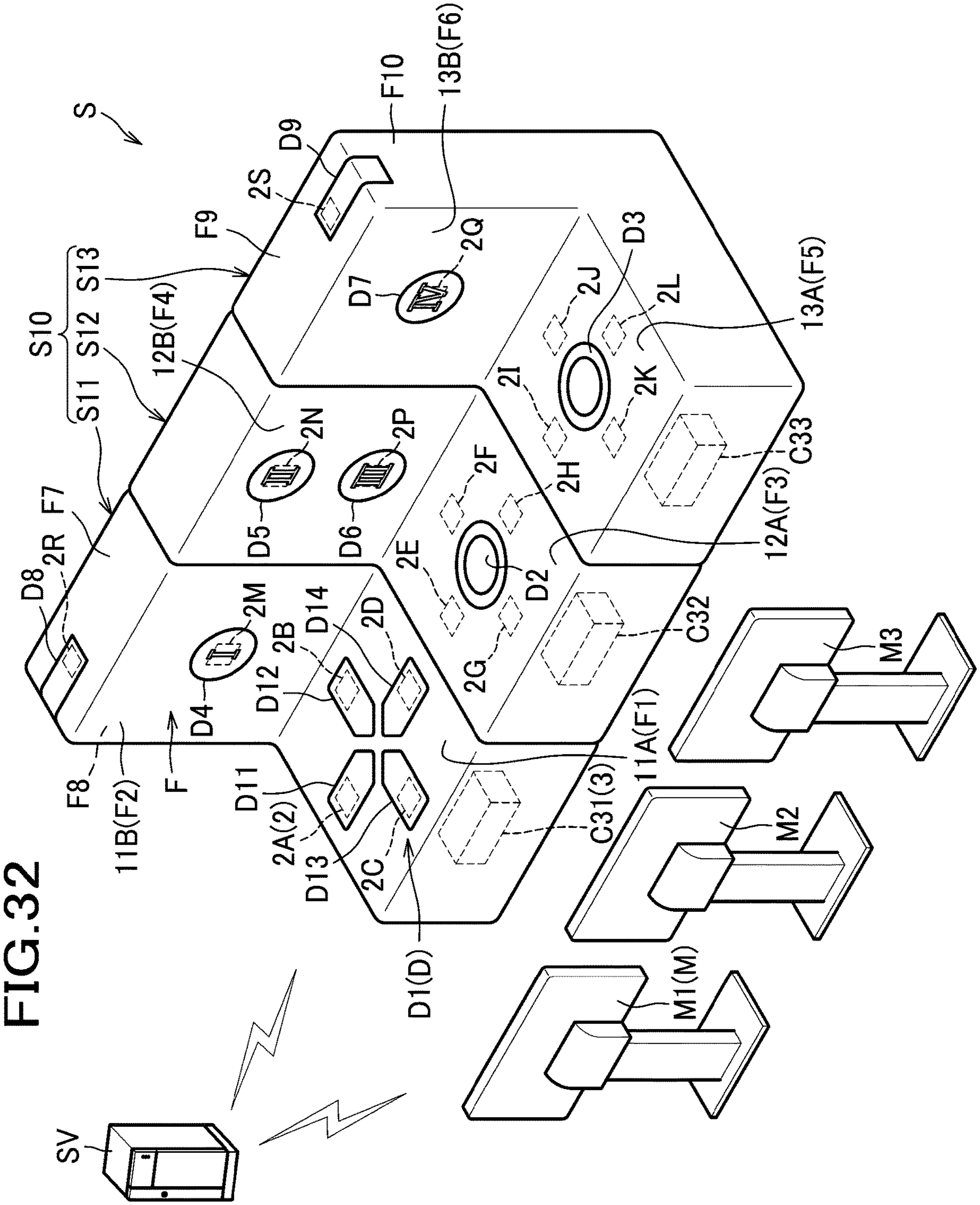
FIG. 32 is a perspective view of a seat system according to a fifth example.

As shown in FIG. 32, the seat S functions as a controller for operating an operable object which is shown on a monitor M as an example of a display device. The seat S is capable of communicating with a server SV. The server SV is capable of communicating with the monitor M. The server SV is capable of executing an application such as a game, displaying on the monitor M (specifically on a screen thereof) an image of an operable object corresponding to the application, and allowing the operable object to move on the screen of the monitor M based on a signal from the seat S. The seat S, the server SV, and the monitor M form a seat system that operates an operable object on the monitor M using the seat S as the controller.

Figure 33:
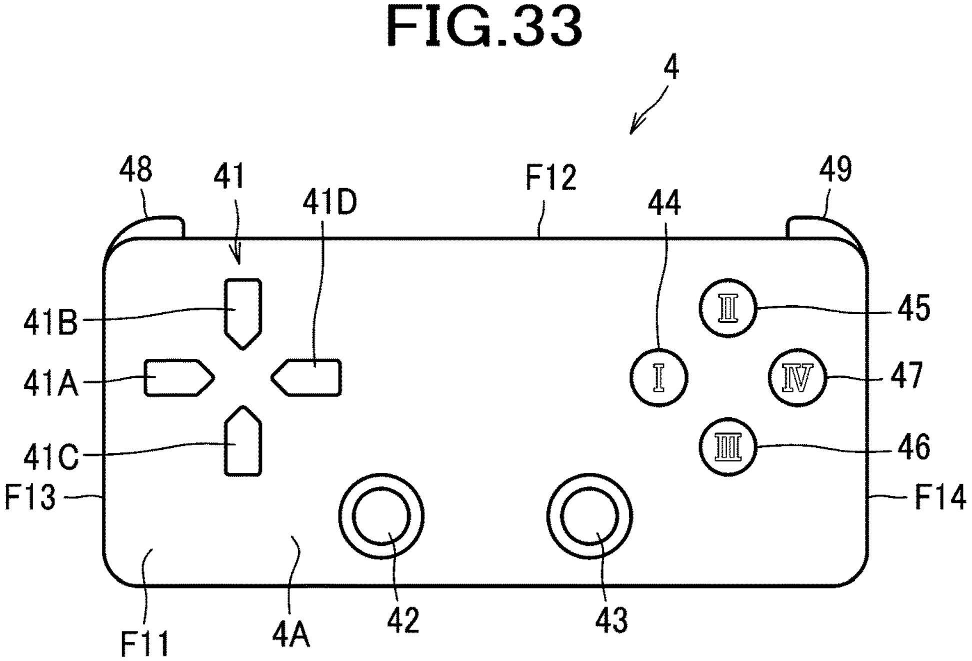
FIG. 33 is a plan view of a hand-held controller.

The server SV is also capable of communicating with a hand-held controller 4 shown in FIG. 33. The hand-held controller 4 is a controller that a user can hold and operate by his/her hand. The server SV can move the operable object on the screen of the monitor M based on a signal from the hand-held controller 4. That is, when the user executes the application, the user can use the seat S or the hand-held controller 4 as the controller to operate the operable object.

The hand-held controller 4 comprises a flat rectangular housing 4A, a cross key 41, two sticks 42, 43, and a plurality of push buttons 44 to 49. The cross key 41 and the two sticks 42, 43 are direction keys for selecting the direction of movement of the operable object. The cross key 41 comprises four keys 41A to 41D disposed to form a shape of a cross. Each stick 42, 43 is disposed upright on the housing 4A of the hand-held controller 4 and may be tilted and moved by the user's fingers. The sticks 42, 43 can be tilted toward the housing 4A and moved 360 degrees about their roots.

As shown in FIG. 32, the seat S comprises a seat body S10, a plurality of sensors 2, and a seat controller 3. The seat body S10 comprises a first seat body S11, a second seat body S12, and a third seat body S13. The second seat body S12 is located between the first seat body S11 and the third seat body S13 in the left-right direction. The first seat body S11, the second seat body S12, and the third seat body S13 may be formed integrally in one piece or separately so that they can be separated one by one.

The first seat body S11 comprises a first seat bottom 11A having a seating surface F1 for supporting the user's buttocks, and a first backrest 11B having a seating surface F2 for supporting the user's back. The first seat bottom 11A and the first backrest 11B comprise a pad and an outer covering that covers the pad. The first backrest 11B further has an upper surface F7 located above the seating surface F2, and a side surface F8 located outward of the seating surface F2 in the left-right direction.

The second seat body S12 has a structure approximately the same as the first seat body S11. The second seat body S12 comprises a second seat bottom 12A having a seating surface F3, and a second backrest 12B having a seating surface F4. The third seat body S13 has a structure approximately the same as the first seat body S11. The third seat body S13 comprises a third seat bottom 13A having a seating surface F5, and a third backrest 13B having a seating surface F6. The third backrest 13B further has an upper surface F9 located above the seating surface F6, and a side surface F10 located outward of the seating surface F6 in the left-right direction.

The surface F of the seat body S10 (the seating surfaces F1 to F6, upper surfaces F7, F9, and the side surfaces F8, F10) has a design D that resembles the operating portions (41 to 49) of the hand-held controller 4. The design D is formed by painting paint, embroidering, sewing a cloth different from the outer covering, etc. on the outer covering of the seat body S10.

The sensors 2 are sensors for acquiring information for use in detecting a motion of the user on the seat body S10. Pressure sensors for acquiring pressure from the user may, for example, be used as the sensors 2. The sensors 2 are provided in correspondence with the design D. The sensors 2 are located between the outer covering and the pad of the seat body S10.

One sensor 2 (2M, 2N, 2P to 2S) is provided for each of the designs D4 to D9 for push buttons. The sensors 2M, 2N, 2P to 2S are located to overlap the designs D4 to D9 for the push buttons.

The seat controller 3 comprises a first seat controller C31 provided at the first seat body S11, a second seat controller C32 provided at the second seat body S12, and a third seat controller C33 provided at the third seat body S13. The seat controllers C31 to C33 acquire information from the sensors 2 installed in the corresponding seat bodies S11 to S13 and transmit the acquired information to the server SV.

The server SV has functions of displaying an image on each monitor M1 to M3 corresponding to an application to be executed, and causing an operable object displayed on each monitor M1 to M3 to move based on information transmitted from the seat controller 3. Specifically, the application executed by the server SV includes a program for correlating information from the sensors 2, which is transmitted from the seat controller 3, to various motions of the operable object. The application may be an already-existing application that can be executed using the hand-held controller 4.

When a pressure value output from the sensors 2 corresponding to the push-button designs D4 to D9 are equal to or greater than a predetermined value, the server SV executes an operation equivalent to that executed when the corresponding push button 44 to 49 of the hand-held controller 4 is pushed. Specifically, if a pressure value detected by the sensor 2M corresponding to the push-button design D4 is equal to or greater than the predetermined value, the server SV determines, for example, that the "I" push button 44 of the hand-held controller has been pushed and moves the operable object in a manner equivalent to that executed when the "I" push button 44 has been pushed.

Further, the server SV determines which direction the posture of the user is tilted to, based on the pressure values of the sensors 2 corresponding to the direction-key designs D1 to D3, and executes an operation, according to the direction, equivalent to that executed when a direction key of the hand-held controller 4 is pushed. Specifically, if the server SV determines, for example, that the user is tilted rearward based on pressure values of the sensors 2 corresponding to the direction-key design D1 in the shape of the cross key, the server SV executes an operation equivalent to that executed when a down key 41C of the cross key 41 on the hand-held controller 4 is pressed.

A car race game, for example, may be given as a specific example of the application. The hand-held controller 4 for the car race game may, for example, be configured such that the orientation of the car, which is the operable object, is selected by the cross key 41 and one of the sticks 42, 43, the press button 44, i.e., the press button "I" corresponds to an accelerator, and the press button "III" corresponds to a brake. The seat S may be configured such that the orientation of the car, which is the operable object, is selected by the plurality of sensors 2 respectively corresponding to the direction-key designs D1 to D3, the sensor 2M corresponding to the press-button design D4 of the press button "I" corresponds to an accelerator, and the sensor 2P corresponding to the press-button design D6 of the press button "III" corresponds to a brake.

According to the above example, since the user can operate the operable object by making a motion corresponding to the design D that resembles the key pad of the controller located on the surface F of the seat body S10, the entertainability of the seat S can be improved.

Further, since the seat S comprises three seat bodies S11 to S13, a plurality of people can cooperate to operate the operable object. Specifically, for example, a first user can sit on the first seat body S11 to operate the first seat body S11, a second user can sit on the third seat body S13 to operate the third seat body S13, and at least one of the first user and the second user can operate the second seat body S12 by his/her hands. The seat S may be configured, according to the type of the application, to allow a plurality of people to operate the same operable object, or to allow each person to operate a corresponding operable object.

Figure 34:
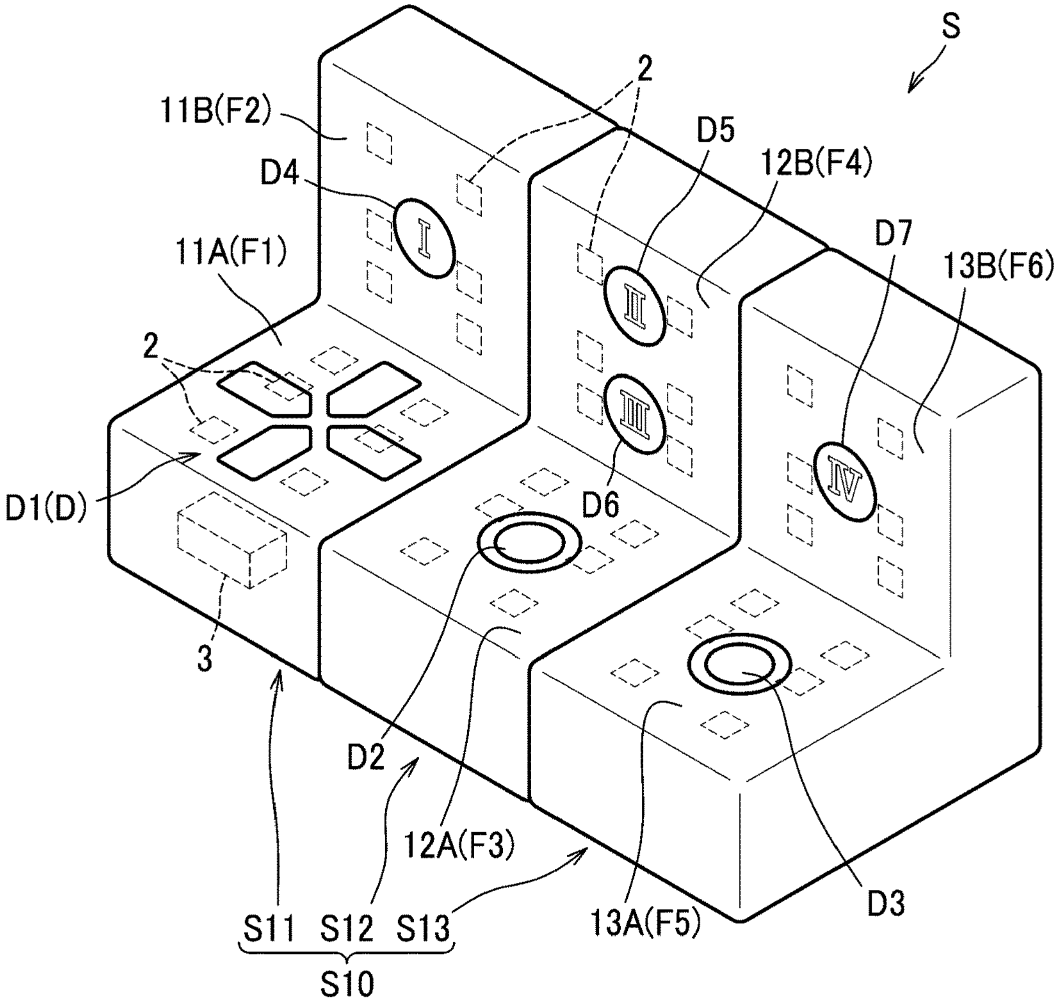
FIG. 34 is a perspective view of a seat according to a first modification.

In the fifth example, the positions of the sensors are not limited to those described above. The sensors may be located at various positions. For example, as shown in FIG. 34, six sensors 2 may be provided in each of the seat bottoms 11A to 13A and the backrests 11B to 13B. Specifically, the sensors 2 may be provided in pairs, i.e., each located left and right, symmetric with respect to laterally central positions of the seat bodies S11 to S13. Three pairs of sensors 2 may be provided separated apart from the other pairs of sensors 2 in the front-rear direction or the up-down direction. The sensors 2 may be provided at positions corresponding to the shoulders, lumbar region, buttocks, and thighs of the user.

Figure 35:
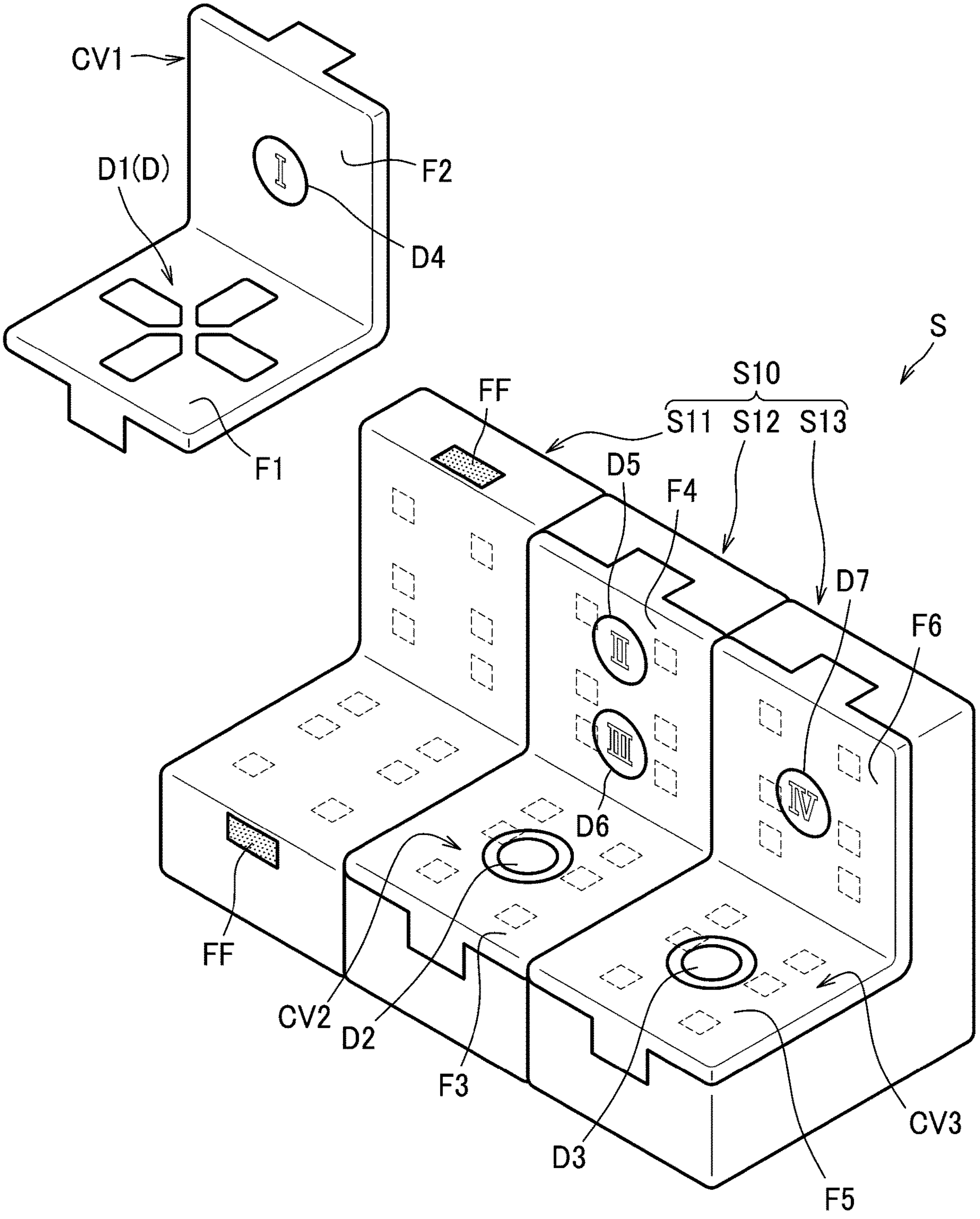
FIG. 35 is perspective view of a seat according to a second modification.

As shown in FIG. 35, the seat S may comprise covers CV1 to CV3 that can be attached to and detached from the seat body S10. Each cover CVn has a seating surface Fp with a design Dm. The covers CV1 to CV3 may be configured to be attached to and detached from the seat body S10, for example, by means of hook-and-loop fasteners FF.

Figure 36:
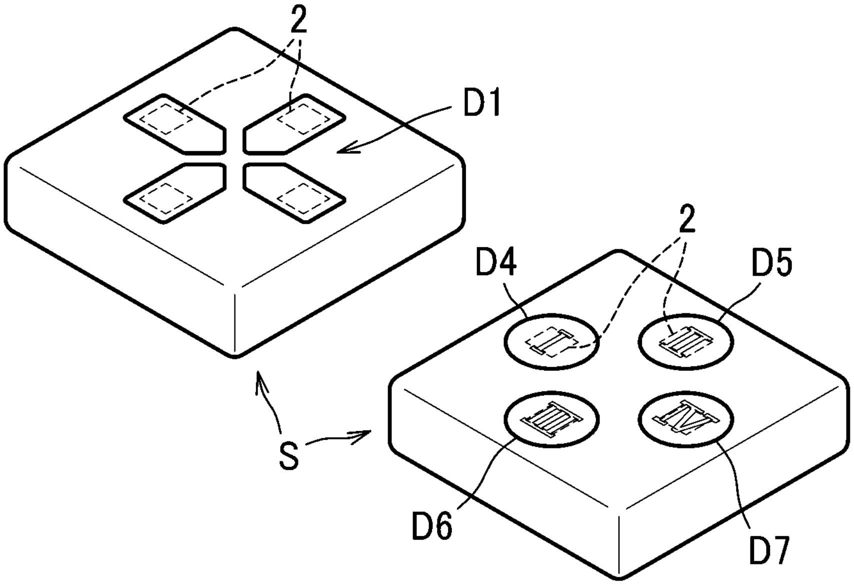
FIG. 36 is perspective view of a seat according to a third modification.

As shown in FIG. 36, the seat S may be configured as cushion placed and used on a seat bottom, a backrest, or on a floor. According to this configuration, the seat S can be easily placed at a position at which the user can conveniently use the seat S, and thus usability can be enhanced.

The configuration of the fifth example may be implemented in the seat system of the above-described first, second, third, or fourth examples. The elements described in the above example embodiments and its modified examples may be implemented selectively and in combination.

SIXTH EXAMPLE

Next, an example of a seat cushion that may be used in the seat systems according to the first, second, third, fourth, and fifth examples will be described as a sixth example referring mainly to FIGS. 37 to 43. Hereafter, front/rear (frontward/rearward), left/right (lateral), up/down (upward/downward or vertical) directions will be defined as directions as viewed from a person (occupant) sitting on a seat (seat body) with the cushion placed on the seat.

Figure 37:
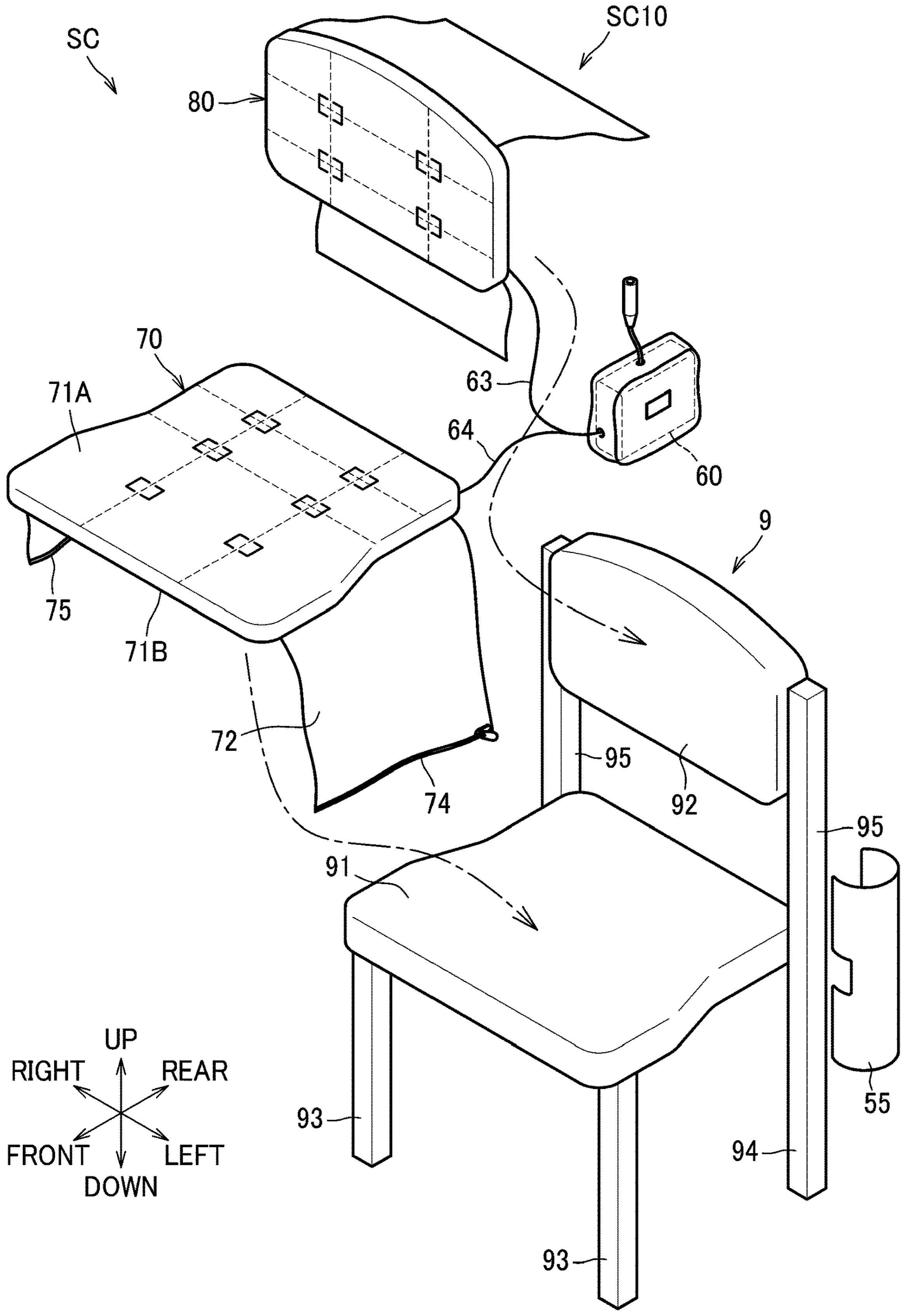
FIG. 37 is a perspective view of a seat cushion and a seat according to a sixth example.

As shown in FIG. 37, a seat cushion SC is placed and used on a chair 9 as an example of a seat body. The seat cushion SC comprises a seat cushion body SC10 and a cover 55.

The seat cushion body SC10 comprises a first cushion 70, a second cushion 80, a controller 60, a first wiring 63, and a second wiring 64.

In this example, the chair 9 comprises a seat bottom 91 on which a person is to be seated, a backrest 92, left and right front legs 93, and left and right rear legs 94. A member that forms each rear leg 94 includes the rear leg 94 and a post 95 formed as one piece. The rear leg 94 extends downward from the seat bottom 91. The post 95 is located above the rear leg 94 and extends in the upward-downward direction to connect the seat bottom 91 and the backrest 92. In this example, the post 95 corresponds to the "post of the backrest".

Figure 38:
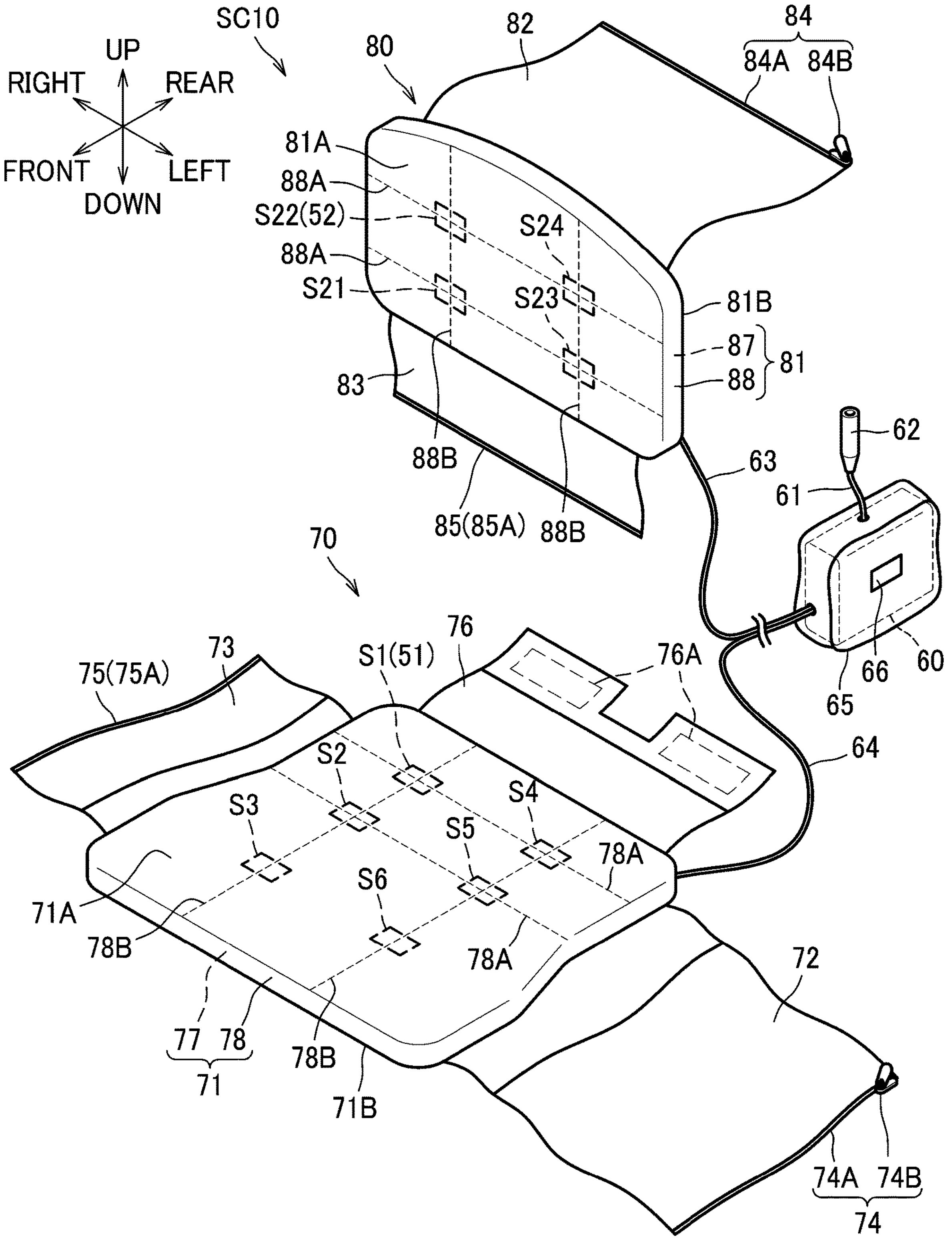
FIG. 38 is a perspective view of a seat cushion body.

The first cushion 70 is a part of the seat cushion SC placed on the seat bottom 91 of the chair 9. As shown in FIG. 38, the first cushion 70 comprises a first cushion body 71, a first band 72, a first ancillary band 73, a first fixing portion 74, a first to-be-fixed portion 75, and a rear ancillary band 76.

Figure 43:
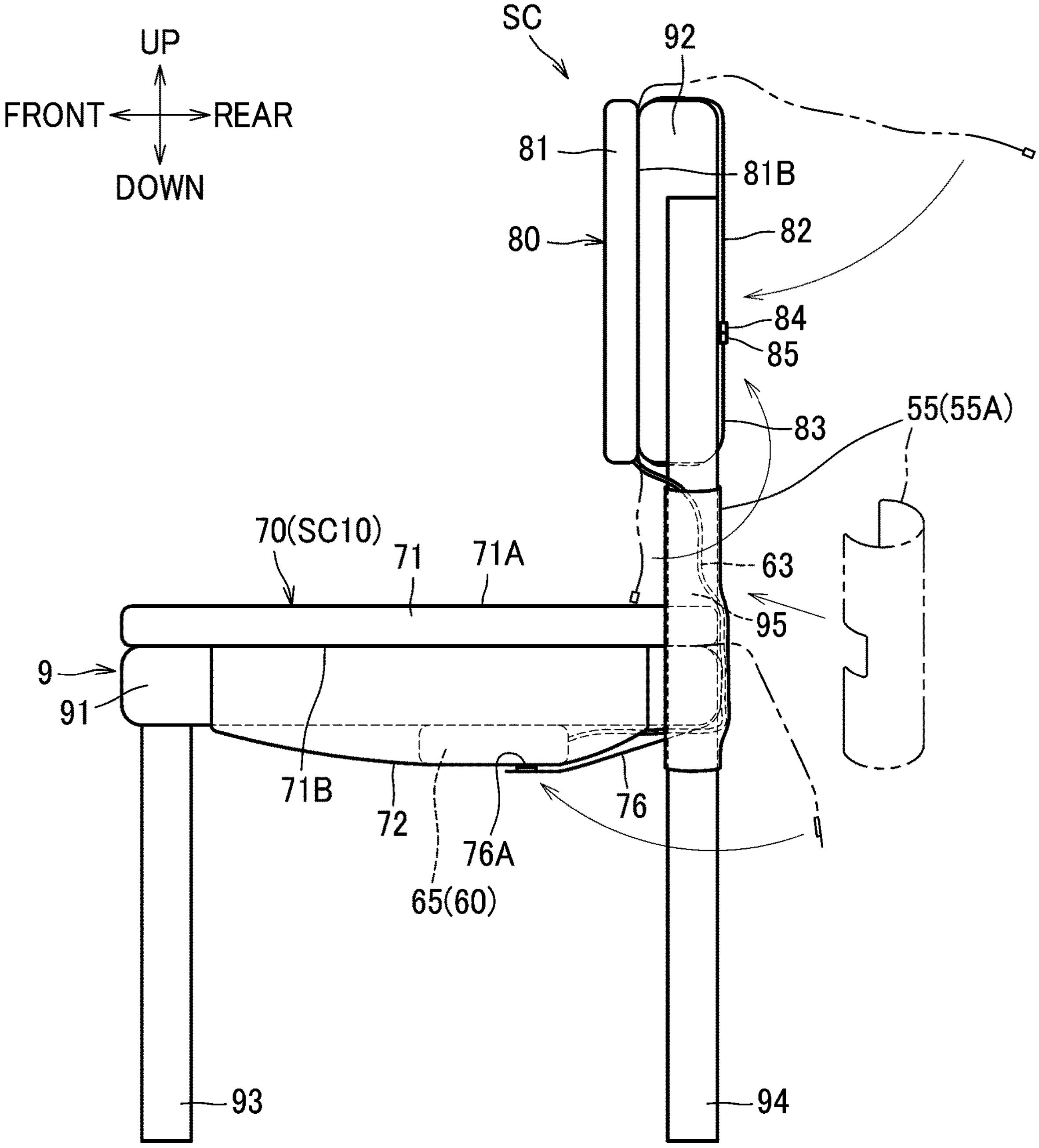
FIG. 43 is a side view of the seat cushion attached to a seat.

The first cushion body 71 is placed on the seat bottom 91 when the seat cushion SC is attached to the chair 9 (see FIG. 43). The first cushion body 71 comprises a first pad 77 having cushioning properties, and a first outer covering member 78 as a covering member that covers the first pad 77.

The first cushion body 71 has a seating surface 71A, and a mounting surface 71B. When the first cushion body 71 is placed on the seat bottom 91, the seating surface 71A faces upward toward the occupant, and the mounting surface 71B faces downward toward an upper surface of the seat bottom 91.

The first band 72 is a sheet-shaped member extending from the left side portion of the first cushion body 71. The first band 72 has a first end fixed to the left side portion of the first cushion body 71, and a second end at which the first fixing portion 74 is provided. That is, the first band 72 comprises the first fixing portion 74.

The first ancillary band 73 is a sheet-shaped member extending from the right side portion of the first cushion body 71. The first ancillary band 73 has a first end fixed to the right side portion of the first cushion body 71, and a second end at which the first to-be-fixed portion 75 is provided.

Widths of the first band 72 and the first ancillary band 73 as measured in the front-rear direction are approximately the same. The widths of the first band 72 and the first ancillary band 73 as measured in the front-rear direction are wider than half of a width of the first cushion body 71 as measured in the front-rear direction. In the state shown in FIG. 38, a length of the first band 72 is longer than a length of the first ancillary band 73 as measured in the left-right direction.

The first fixing portion 74 is fixed to the right side portion of the first cushion body 71 via the first ancillary band 73. The first fixing portion 74 is provided at the second end (left end in the state shown in FIG. 38) of the first band 72.

The first to-be-fixed portion 75 is a portion disengageably engaged with the first fixing portion 74. The first to-be-fixed portion 75 is provided at the second end (right end in the state shown in FIG. 38) of the first ancillary band 73.

The first fixing portion 74 and the first to-be-fixed portion 75 form a slide fastener. The slide fastener comprises a pair of elements 74A, 75A and a slider 74B. In this example, one of the elements 74A and the slider 74B form the first fixing portion 74 and are located at the second end of the first band 72. The other element 75A forms the first to-be-fixed portion 75 and is located at the second end of the first ancillary band 73.

The slider 74B is a two-sided slider, i.e., a slider that can be handled from both the front side and the backside of the first band 72. The two-sided slider may be, for example, a slider that includes one pull tab on the front side and one pull tab on the backside, or a slider that includes a single pull tab that can be moved between the front side and the backside.

The rear ancillary band 76 is a sheet-shaped member extending from the rear end of the first cushion body 71. The rear ancillary band 76 has a first end fixed to the rear end of the first cushion body 71, and a second end at which hook-and-loop fasteners 76A are provided. In the state shown in FIG. 38, the hook-and-loop fasteners 76A are located on an undersurface of the rear ancillary band 76. The hook-and-loop fasteners 76A are disengageably engaged with the mounting surface 71B of the first cushion body 71 and/or the first band 72.

The first cushion 70 further comprises first sensors 51 as sensors for detecting the occupant. The first sensors 51 are located inside the first cushion body 71. Specifically, the first sensors 51 are located between the upper surface of the first pad 77 and the first outer covering member 78 (see FIG. 42). The first sensors 51 are, for example, pressure sensors for acquiring measurement values of pressure from the occupant.

The first sensors 51 comprise pressure sensors S1, S2, S3, S4, S5, S6. The pressure sensors S1 to S6 are located at positions opposed to the occupant. The pressure sensors S1 to S3, and the pressure sensors S4 to S6 are symmetrically arranged with respect to a laterally central position of the first cushion body 71.

The pressure sensors S1, S2, S4, S5 are located at a rear portion of the first cushion body 71, specifically, at positions corresponding to the buttocks of the occupant. More specifically, the pressure sensors S1, S4 are located near positions under the lowermost portions of ischial bones of the occupant. These positions are subjected to the largest load of the user. The pressure sensors S2, S5 are located a little frontward of the pressure sensors S1, S4.

The pressure sensors S3, S6 are located at positions different from the positions of the pressure sensors S1, S2, S4, S5, specifically, in positions located frontward and distanced far from the pressure sensors S1, S2, S4, S5. Specifically, the pressure sensors S3, S6 are located in positions corresponding to the thighs of the occupant. More specifically, the pressure sensors S3, S6 are located near positions under the thighs of the occupant. In more detail, the pressure sensor S3 is located near a position under the right thigh of the occupant, and the pressure sensor S6 is located near a position under the left thigh of the occupant.

The first outer covering member 78 includes first lines 78A and second lines 78B. The first lines 78A and the second lines 78B are formed by seams. The first lines 78A extend in the left-right direction. Two first lines 78A are formed apart from one another in the front-rear direction. The second lines 78B extend in directions that intersect the left-right direction. In this example, the second lines 78B extend in a direction perpendicular to the left-right direction. Specifically, the second lines 78B extend in the front-rear direction. Two second lines 78B are formed side-by-side in the left-right direction.

The pressure sensors S1, S2, S4, S5 of the first pressure sensors 51 are located at positions where the first lines 78A and the second lines 78B intersect each other. Specifically, the pressure sensor S1 is located at a position where the rearward first line 78A and the rightward second line 78B intersect each other, and the pressure sensor S2 is located at a position where the frontward first line 78A and the rightward second line 78B intersect each other. The pressure sensor S4 is located at a position where the rearward first line 78A and the leftward second line 78B intersect each other, and the pressure sensor S5 is located at a position where the frontward first line 78A and the leftward second line 78B intersect each other.

The second cushion 80 is a part of the seat cushion SC placed on the backrest 92 of the chair 9. The second cushion 80 comprises a second cushion body 81, a second band 82, a second ancillary band 83, a second fixing portion 84, and a second to-be-fixed portion 85.

The second cushion body 81 is placed at the front of the backrest 92 when the seat cushion SC is attached to the chair 9 (see FIG. 43). The second cushion body 81 comprises a second pad 87 having cushioning properties, and a second outer covering member 88 as a covering member that covers the second pad 87.

The second cushion body 81 comprises a backrest surface 81A, and an opposing surface 81B. When the second cushion body 81 is placed in front of the backrest 92, the backrest surface 81A faces frontward toward the occupant, and the opposing surface 81B faces rearward to oppose the front surface of the backrest 92.

The second band 82 is a sheet-shaped member extending from an upper end of the second cushion body 81. The second band 82 has a first end fixed to the upper end of the second cushion body 81, and a second end at which the second fixing portion 84 is provided. That is, the second band 82 comprises the second fixing portion 84.

The second ancillary band 83 is a sheet-shaped member extending from the lower end of the second cushion body 81. The second ancillary band 83 has a first end fixed to the lower end of the second cushion body 81, and a second end at which the second to-be-fixed portion 85 is provided.

Widths of the second band 82 and the second ancillary band 83 as measured in the left-right direction are approximately the same. The widths of the second band 82 and the second ancillary band 83 as measured in the left-right direction are wider than half of a width of the second cushion body 81 as measured in the left-right direction. In the state shown in FIG. 38, a length of the second band 82 as measured in the front-rear direction is longer than a length of the second ancillary band 83 as measured in the up-down direction.

The second fixing portion 84 is fixed to the upper end of the second cushion body 81 via the second band 82. The second fixing portion 84 is provided at the second end (rear end in the state shown in FIG. 38) of the second band 82.

The second to-be-fixed portion 85 is a portion disengageably engaged with the second fixing portion 84. The second to-be-fixed portion 85 is provided at the second end (lower end in the state shown in FIG. 38) of the second ancillary band 83.

The second fixing portion 84 and the second to-be-fixed portion 85 form a slide fastener. The slide fastener comprises a pair of elements 84A, 85A and a slider 84B. In this example, one of the elements 84A and the slider 84B form the second fixing portion 84 and are located at the second end of the second band 82. The other element 85A forms the second to-be-fixed portion 85 and is located at the second end of the second ancillary band 83.

The second cushion 80 further comprises second sensors 52 as sensors for detecting the occupant. The second sensors 52 are located inside the second cushion body 81. Specifically, the second sensors 52 are located between the front surface of the second pad 87 and the second outer covering member 88. The second sensors 52 are, for example, pressure sensors for acquiring measurement values of pressure from the occupant.

The second sensors 52 comprise pressure sensors S21, S22, S23, S24. The pressure sensors S21 to S24 are located at positions opposed to the occupant. The pressure sensors S21, S22, and the pressure sensors S23, S24 are symmetrically arranged with respect to a laterally central position of the second cushion body 81.

The pressure sensors S21, S23 are located at positions corresponding to the lumbar region of the occupant. More specifically, the pressure sensors S21, S23 are located near a position behind the lumbar region of the occupant.

The pressure sensors S22, S24 are located at positions located upward and distanced far from the pressure sensors S21, S23, specifically, at positions corresponding to the back of the occupant. More specifically, the pressure sensors S22, S24 are located near a position behind the back of the occupant.

The second outer covering member 88 includes first lines 88A and second lines 88B. The first lines 88A and the second lines 88B are formed by seams. The first lines 88A extend in the left-right direction. Two first lines 88A are formed apart from one another in the up-down direction. The second lines 88B extend in directions that intersect the left-right direction. In this example, the second lines 88B extend in a direction perpendicular to the left-right direction. Specifically, the second lines 88B extend in the up-down direction. Two second lines 88B are arranged side-by-side in the left-right direction.

The second sensors 52 are located at positions where the first lines 88A and the second lines 88B intersect each other. Specifically, the pressure sensor S21 is located at a position where the lower first line 88A and the rightward second line 88B intersect each other, and the pressure sensor S22 is located at a position where the upper first line 88A and the rightward second line 88B intersect each other. The pressure sensor S23 is located at a position where the lower first line 88A and the leftward second line 88B intersect each other, and the pressure sensor S24 is located at a position where the upper first line 88A and the leftward second line 88B intersect each other.

The controller 60 is a device that acquires measurement values from the sensors 51, 52 and outputs the measurement values to an outside computer (not shown). The controller 60 includes a central processing unit (CPU), a read-only memory (ROM), a random-access memory (RAM), etc. (not shown). The controller 60 further includes a communication unit which enables near-field wireless communication, such as Bluetooth (registered trademark), and Wi-Fi (registered trademark). The controller 60 executes a prestored program to output the measurement values acquired from the sensors 51, 52 to the outside computer by near-field wireless communication.

The controller 60 is connected to the first sensors 51 of the first cushion 70 and the second sensors 52 of the second cushion 80. Specifically, the controller 60 is connected to the first sensors 51 (pressure sensors S1 to S6) by the second wiring 64 to be capable of acquiring measurement values from the first sensors 51. The controller 60 is connected to the second sensors (pressure sensors S21 to S24) by the first wiring 63 to be capable of acquiring measurement values from the second sensors 52.

A power supply cable 61 extends outward from the controller 60. The power supply cable 61 has on an end thereof a connector 62 to which a plug of a power supply adapter (not shown) is attached. The controller 60 is contained in a case 65. The case has cushioning properties to protect the controller 60. The case 65 has a hook-and-loop fastener 66 on a side surface thereof. The hook-and-loop fastener 66 is disengageably engaged with the first band 72.

The first wiring 63 is connected to the second sensors 52 (pressure sensors S21 to S24) of the second cushion 80. The first wiring 63 extends outward from the second cushion 80, specifically, from the lower end of the second cushion body 81 and is connected to the controller 60.

The second wiring 64 is connected to the first sensors 51 (pressure sensors S1 to S6) of the first cushion 70. The second wiring 64 extends outward from the first cushion 70, specifically, from the rear end of the first cushion body 71 and is connected to the controller 60.

Figure 39:
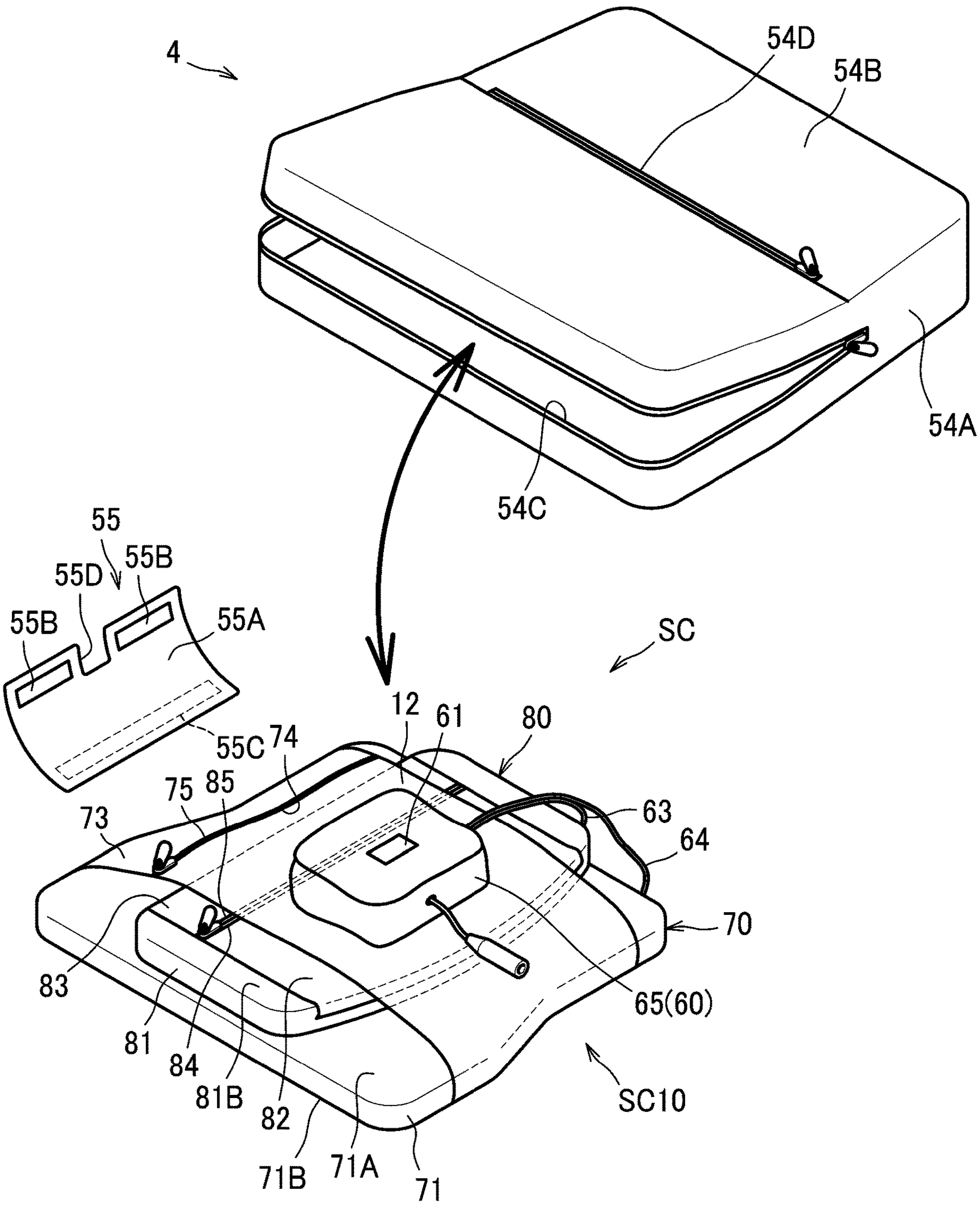
FIG. 39 is a perspective view of the seat cushion in a state for storage and a storage bag.

As shown in FIG. 43, the cover 55 is a member that covers the first wiring 63, extending from the second cushion 80, and the post 95 of the chair 9 when the second cushion 80 is placed on the backrest 92. As shown in FIG. 39, the cover 55 includes a cover body 55A, third fixing portions 55B, and a third to-be-fixed portion 55C.

The cover body 55A is a sheet-shaped member. The cover body 55A can be wrapped around the post 95 of the chair 9 to cover the post 95. The cover body 55A has a recess 55D for receiving the seat bottom 91 when the cover body 55A is wrapped around the post 95.

The third fixing portions 55B are provided at a first end of the cover body 55A, and the third to-be-fixed portion 55C is provided at a second end of the cover body 55A. The third to-be-fixed portion 55C is located on a surface of the cover body 55A opposite to a surface of the cover body 55A on which the third fixing portions 55B are located. The third fixing portions 55B disengageably engage with the third to-be-fixed portion 55C. The third fixing portions 55B and the third to-be-fixed portion 55C are hook-and-loop fasteners.

Next, an example procedure for placing the seat cushion SC in a state for storage for carrying or storing the seat cushion SC will be described.

First, the second cushion 80 is prepared by placing the second band 82 and the second ancillary band 83 to overlap the opposing surface 81B of the second cushion body 81, and engaging the second fixing portion 84 with the second to-be-fixed portion 85. Specifically, the slide fastener formed by the second fixing portion 84 and the second to-be-fixed portion 85 is closed.

Next, the second cushion 80 is placed on the seating surface 71A of the first cushion 70. Then, the first band 72 is placed on the second cushion 80 to cover the second cushion 80, and the first fixing portion 74 is engaged with the first to-be-fixed portion 75 provided on the end of the first ancillary band 73, i.e., the slide fastener formed by the first fixing portion 74 and the first to-be-fixed portion 75 is closed. The first band 72 allows the first fixing portion 74 to be engaged with the first to-be-fixed portion 75 in the state for storage of the seat cushion SC, with the second cushion 80 being sandwiched between the first band 72 and the seating surface 71A.

The rear ancillary band 76 of the first cushion 70 (see FIG. 38) is placed to overlap the mounting surface 71B of the first cushion body 71, and the hook-and-loop fasteners 76A are engaged with the mounting surface 71B beforehand.

The controller 60 is placed on the first band 72. In this way, the seat cushion SC (seat cushion body SC10) is placed in the state for storage. The controller 60 may be placed on the first band 72 with the side on which the hook-and-loop fastener 66 facing downward such that the hook-and-loop fastener 66 engages with the first band 72.

The seat cushion SC in the state for storage can be carried or stored as-is or in a storage bag 54. The storage bag 54 can store the seat cushion SC in the state for storage. Specifically, the storage bag 54 can store the seat cushion body SC10, the cover 55, and the power supply adapter (not shown) which supplies power to the controller 60.

The storage bag 54 includes a main storage portion 54A, and a pocket-shaped sub-storage portion 54B provided on a side surface of the main storage portion 54A. The main storage portion 54A mainly stores the seat cushion SC, and can be opened and closed by a slide fastener 54C. The sub-storage portion 54B also can be opened and closed by a slide fastener 54D. The storage bag 54 may include a handle or belt for carrying the storage bag 54.

Next, an example procedure for attaching the seat cushion SC to the chair 9 will be described.

Figure 40:
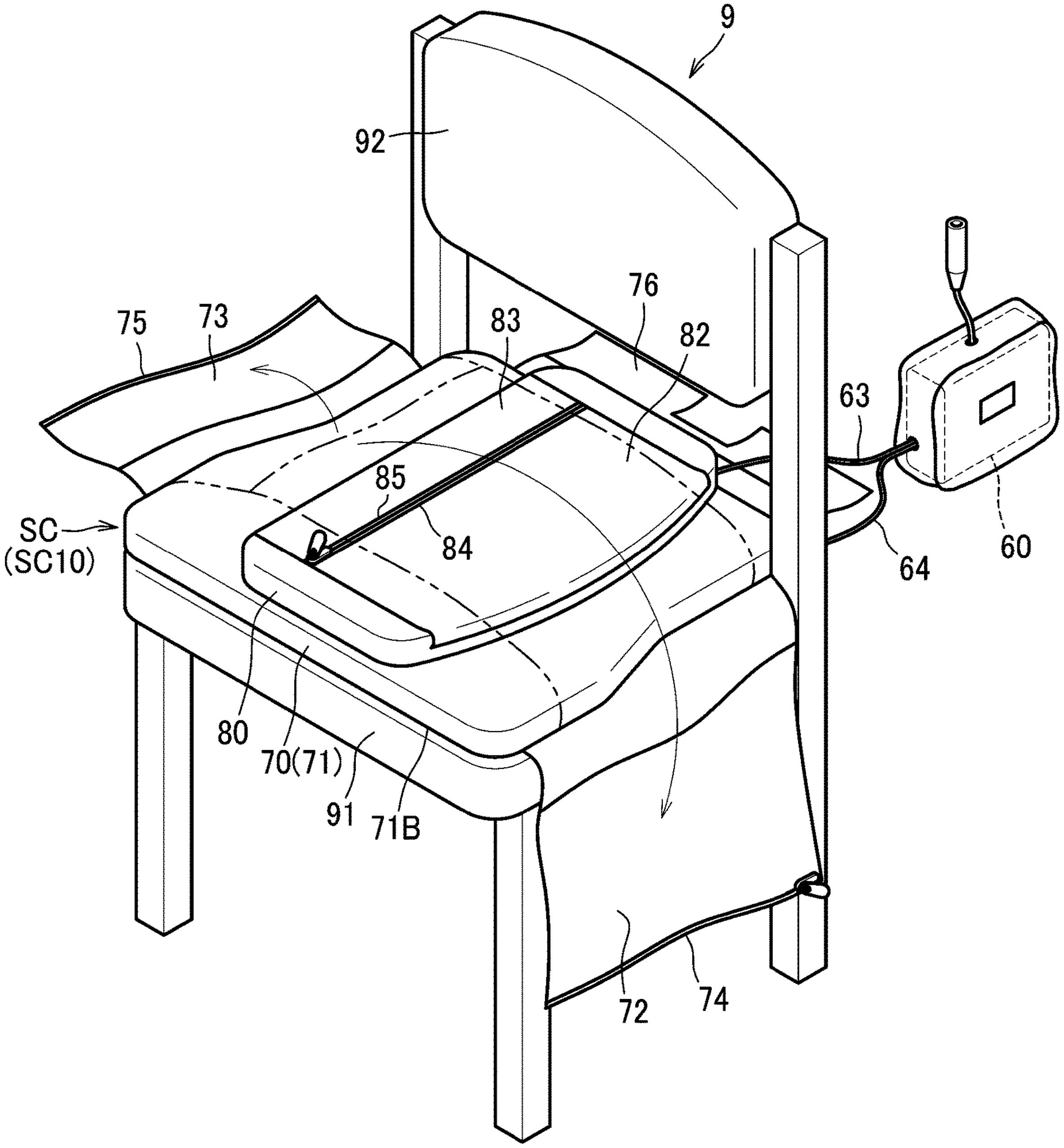
FIG. 40 is a perspective view showing the seat cushion body placed on a seat bottom and a first band and a first ancillary band disengaged.

As shown in FIG. 40, first, the hook-and-loop fasteners 76A of the rear ancillary band 76 are disengaged from the mounting surface 71B of the first cushion body 71, and the rear ancillary band 76 is let to hang down from the first cushion body 71.

The seat cushion SC (seat cushion body SC10) is then placed on the seat bottom 91 so that the mounting surface 71B of the first cushion 70 faces the seat bottom 91.

Next, the controller 60 is set aside, and the first fixing portion 74 is disengaged from the first to-be-fixed portion 75, i.e., the slide fastener formed by the first fixing portion 74 and the first to-be-fixed portion 75 is opened. Then, the first band 72 and the first ancillary band 73 are unfolded.

The second fixing portion 84 and the second to-be-fixed portion 85 of the second seat cushion 80 are subsequently disengaged, i.e., the slide fastener formed by the second fixing portion 84 and the second to-be-fixed portion 85 is opened.

Figure 41:
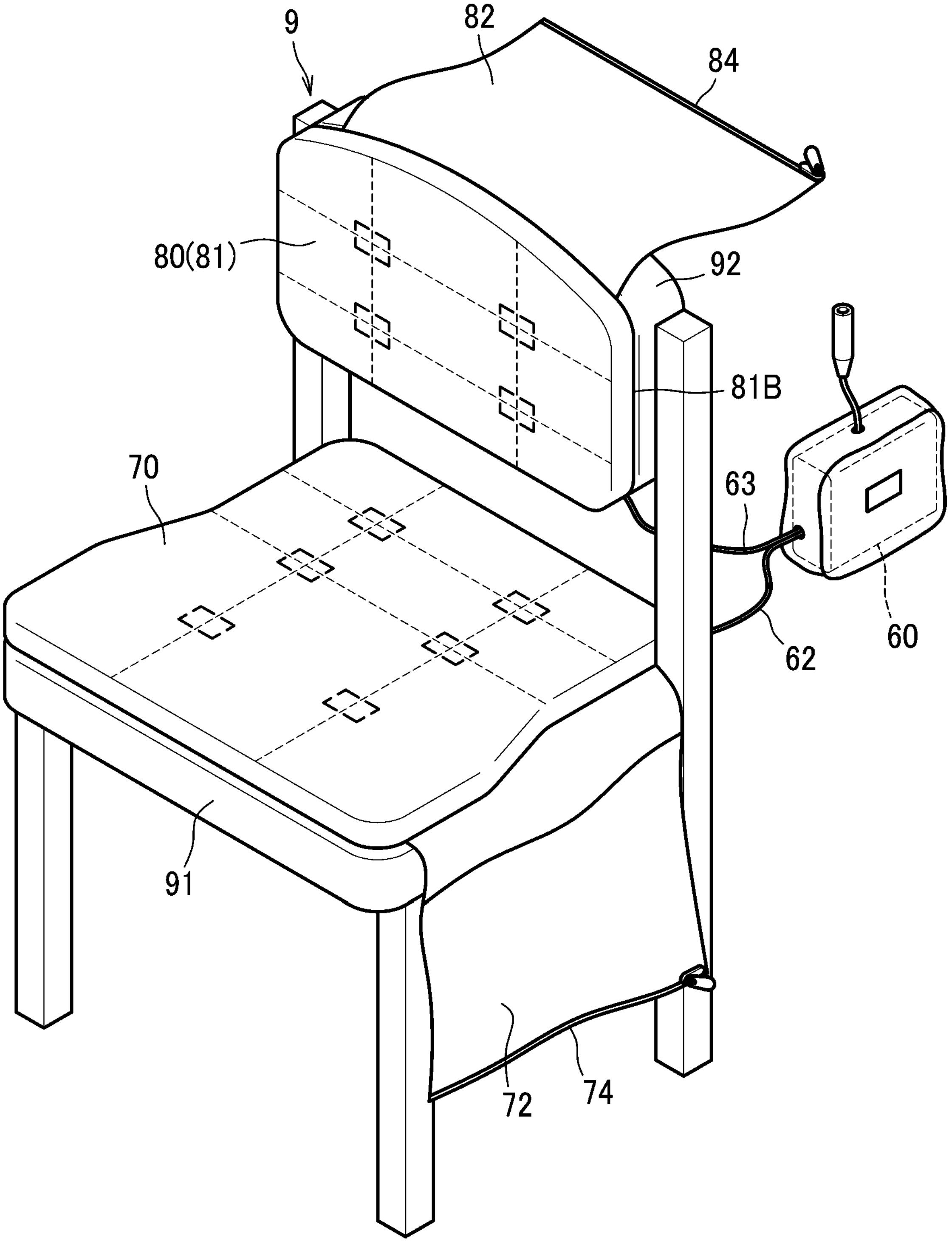
FIG. 41 is a perspective view showing a second cushion placed in front of a backrest.

Next, as shown in FIG. 41, the second cushion 80 is then placed in front of the backrest 92 so that the opposing surface 81B of the second cushion body 81 faces the backrest 92. Thereafter, as shown in FIG. 43, the second band 82 is flipped over the backrest 92 to the rear side of the backrest 92, and the second ancillary band 83 is flipped under the backrest 92 to the rear side of the back rest 92.

The second fixing portion 84 provided on the end of the second band 82 is then engaged with the second to-be-fixed portion 85 provided on the end of the second ancillary band 83, i.e., the slide fastener formed by the second fixing portion 84 and the second to-be-fixed portion 85 is closed. The second fixing portion 84 of the second band 82 is engaged with the second to-be-fixed portion 85, with the backrest 92 sandwiched between the second band 82 and the opposing surface 81B.

Figure 42:
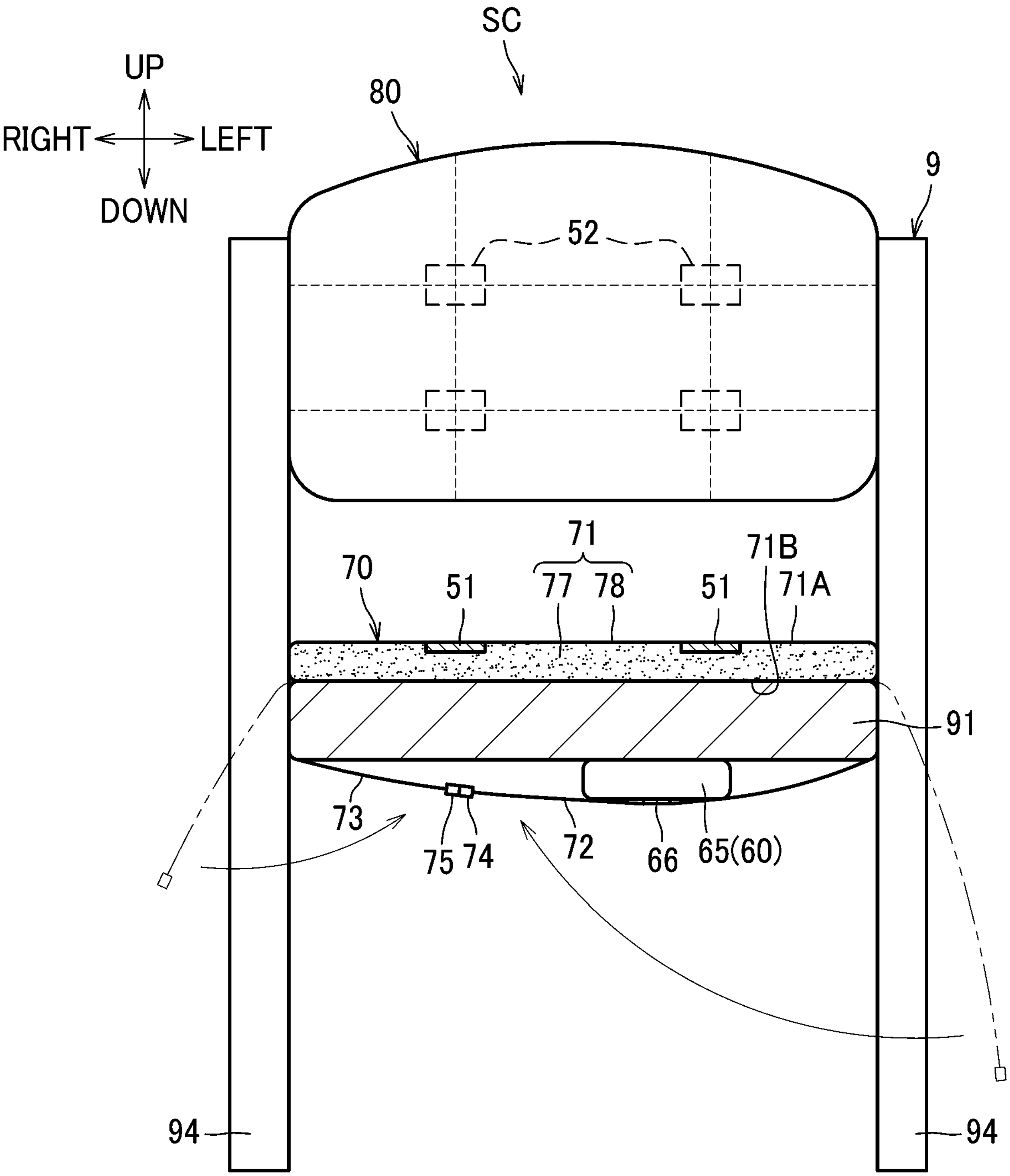
FIG. 42 is a partial cross-sectional view of a first seat cushion and a controller fixed on the seat bottom as viewed from the front.

Next, as shown in FIG. 42, the controller 60 is placed under the seat bottom 91. Then, the first band 72 is flipped under the seat bottom 91 from the left side of the seat bottom 91, and the first ancillary band 73 is flipped under the seat bottom 91 from the right side of the seat bottom 91 to cover the controller 60. At this time, the controller 60, i.e., the hook-and-loop fastener 66 of the case 65 thereof is engaged with the first band 72. If the hook-and-loop fastener 66 is engageable with an undersurface of the seat bottom 91, the hook-and-loop fastener 66 may be engaged with the undersurface of the seat bottom 91 to temporarily fix the controller on the seat bottom 91, before the bands 72, 73 are flipped under the seat bottom 91.

After the bands 72, 73 are flipped under the seat bottom 91, the first fixing portion 74 provided on the end of the first band 72 is engaged with the first to-be-fixed portion 75 provided on the end of the first ancillary band 73, i.e., the slide fastener formed by the first fixing portion 74 and the first to-be-fixed portion 75 is closed.

The first band 72 allows the first fixing portion 74 to be engaged with first to-be-fixed portion 75 when the seat cushion SC is placed on the seat bottom 91, with the seat bottom 91 being sandwiched between the first band 72 and the mounting surface 71B of the first cushion body 71. Further, the first band 72 allows the first fixing portion 74 to be engaged with first to-be-fixed portion 75 when the seat cushion SC is placed on the seat bottom 91 and the controller 60 is placed under the seat bottom 91, with the seat bottom 91 and the controller 60 being sandwiched between the first band 72 and the mounting surface 71B.

Subsequently, as shown in FIG. 43, the rear ancillary band 76 of the first cushion 70 is flipped under the seat bottom 91 from the rear side of the seat bottom 91, and the hook-and-loop fasteners 76A are engaged with the first band 72.

The seat cushion body SC10 is thereby attached to the chair 9.

Thereafter, the first wiring 63 extending from the second cushion 80 to the controller 60 is disposed along the left post 95, and the cover 55 is wrapped over to cover the first wiring 63 and the post 95. Specifically, the cover body 55A is wrapped around the left post 95 and the first wiring 63 disposed thereon, and the third fixing portions 55B, which are hook-and-loop fasteners (see FIG. 39), are engaged with the third to-be-fixed portion 55C to attach the cover 55 to the chair 9.

The seat cushion SC can be attached to the chair 9 by the above-described procedure.

In the above-described procedure, the second cushion 80 is fixed to the backrest 92 by the second band 82 first, and then the first cushion 70 and the controller 60 are fixed to the seat bottom 91 by the first band 72. However, this sequence may be reversed.

According to the above-described example, the first band 72 comprising the first fixing portion 74, and the first to-be-fixed portion 75 disengageably engaged with the first fixing portion 74 allows the seat cushion SC to be stored in a compact state, and to be fixed to the seat bottom 91 of the chair 9. In this way, the seat cushion SC can be kept compact in the state for storage while restraining the number of components of the seat cushion SC from increasing.

Since the first to-be-fixed portion 75 is provided on the first ancillary band 73, it is easier to engage the first fixing portion 74 with the first to-be-fixed portion 75 compared to when the first to-be-fixed portion 75 is directly provided on the right side portion of the first cushion body 71. Storage and attachment of the seat cushion SC is thereby made easier.

Similarly, since the second to-be-fixed portion 85 is provided on the second ancillary band 83, it is easier to engage the second fixing portion 84 with the second to-be-fixed portion 85 compared to when the second to-be-fixed portion 85 is directly provided on the lower end of the second cushion body 81. Attachment of the seat cushion SC is thereby made easier.

Since the first cushion 70 and the second cushion 80 comprise sensors 51, 52 for detecting the occupant, a system using the sensors 51, 52 can be implemented in a simple manner by placing the seat cushion SC on the chair 9 which is an already-existing chair.

Since the first sensors 51 (pressure sensors S1, S2, S4, S5) are located at positions where the first lines 78A and the second lines 78B of the first outer covering member 78 intersect each other, it is possible to make the positions of the first sensors 51 easy to identify. Similarly, since the second sensors 52 (pressure sensors S21 to S24) are located at positions where the first lines 88A and the second lines 88B of the second outer covering member 88 intersect each other, it is possible to make the positions of the second sensors 51 easy to identify.

Since the seat cushion SC comprises the cover 55 which wraps and covers the first wiring 63 and the post 95 of the chair 9, the first wiring 63 connected to the second sensor 52 can be protected by the cover 55.

Since the first band 72 allows the first fixing portion 74 to be engaged with the first to-be-fixed portion 75, with the seat bottom 91 and the controller 60 being sandwiched between the first band 72 and the mounting surface 71B, the controller 60 can be fixed to the seat bottom 91 of the chair 9 by the first band 72. This makes it unnecessary to provide a dedicated member for fixing the controller 60 to the seat bottom 91, and thus restrains the number of components of the seat cushion SC from increasing.

It is possible to fix the first cushion 70 to the seat bottom 91 of the chair 9, and to fix the second cushion 80 to the backrest 92 by engagement of the second fixing portion 84 of the second band 82 with the second to-be-fixed portion 85. This allows the seat cushion SC to be more securely fixed to the chair 9 compared to when only the first cushion 70 is fixed to the chair 9.

The above-described sixth example may be implemented in other forms modified where appropriate as described below.

For example, although the first fixing portion 74 and the first to-be-fixed portion 75 form a slide fastener in the sixth example, the first fixing portion and the first to-be-fixed portion may, for example, form a hook-and-loop fastener. In this case, by providing a member that forms a hook-and-loop fastener, for example, on both sides of each band, the first fixing portion is engageable with the first to-be-fixed portion in both situations, i.e., when the seat cushion is in the state for storage and when the seat cushion is placed on a seat.

A hook-and-loop fastener or the like may also be used instead of the slide fastener formed by the second fixing portion and the second to-be-fixed portion.

Although, the first band 72 and the first ancillary band 73 are sheet-shaped members having longer widths in the front-rear direction in the sixth example, the first band and the first ancillary band may be formed as belts having widths in the front-rear direction shorter than the widths of the bands 72, 73 of the sixth example, or may be formed as cords having widths in the front-rear direction shorter than the widths of the belts. The same applies to the second band and the second ancillary band.

Although the sixth example only comprises one first band 72, a plurality of first bands, for example, formed as belts and aligned in the front-rear direction may be provided. In this case, the first ancillary band may comprise a plurality of bands formed as belts and aligned in the front-rear direction in correspondence with the first bands, or may include a single sheet-shaped band similar to the first ancillary band 73 of the sixth example, and the plurality of first bands may be engaged with this single first ancillary band. On the contrary, a single first band may be engaged with a plurality of first ancillary bands. The same applies to the second band and the second ancillary band.

Although the first band 72 extends from the left side portion of the first cushion body 71, the first ancillary band 73 extends from the right side portion of the first cushion body 71, and the first fixing portion 74 is fixed to the right side portion of the first cushion body 71 via the first ancillary band 73 in the sixth example, for example, the first band may extend from the right side portion of the first cushion body, the first ancillary band may extend from the left side portion of the first cushion body, and the first fixing portion may be fixed to the left side portion of the first cushion body via the first ancillary band.

Although the first to-be-fixed portion 75 is provided on the first ancillary band 73 in the sixth example, the seat cushion SC may, for example, not comprise the first ancillary band 73, and the first to-be-fixed portion 75 may be directly provided on the first cushion body. That is, the first fixing portion may be directly fixed to a side portion of the first cushion body.

Although the second band 82 extends from the upper end of the second cushion body 81, the second ancillary band 83 extends from the lower end of the second cushion body 81, and the second fixing portion 84 is fixed to the lower end of the second cushion body 81 via the second ancillary band 83 in the sixth example, for example, the second band may extend from the lower end of the second cushion body, the second ancillary band may extend from the upper end of the second cushion body, and the second fixing portion may be fixed to the upper end of the second cushion body via the second ancillary band.

Although the second to-be-fixed portion 85 is provided on the second ancillary band 83 in the sixth example, the seat cushion SC may, for example, not comprise the second ancillary band, and the second to-be-fixed portion may be directly provided on the second cushion body. That is, the second fixing portion may be directly fixed to an end of the second cushion body.

Although only one cover 55 is included in the sixth example, and the cover 55 is attached to wrap and cover the first wiring 63 and the left post 95, along which the first wiring 63 is disposed, when the second cushion 80 is placed on the back rest 92, in the sixth example, for example, a second cover having the same configuration as that of the cover 55 may be included in addition to the cover 55, and the second cover may be attached to wrap and cover the right post 95, along which the first wiring 63 is not disposed, when the second cushion 80 is placed on the back rest. As a result, both of the right and left posts 95 are covered with covers, and thus, the aesthetic appearance (design) of the chair 9 on which the seat cushion SC is placed can be improved. In an alternative configuration, the seat cushion may not comprise a cover.

Although the controller 60 is provided outside of the first cushion 70 and the second cushion 80 in the sixth example, the controller may, for example, be provided inside at least one of the first cushion and the second cushion. In an alternative configuration, the seat cushion SC may not comprise a controller.

Although only a subset of the first sensors 51 is located at positions at which the first lines 78A and the second lines 78B of the first outer covering member 78 intersect each other in the sixth example, all of the first sensors may, for example, be located at positions at which the first lines and the second lines intersect each other. Further, although all of the second sensors 52 are located at positions at which the first lines 88A and the second lines 88B of the second outer covering member 88 intersect each other in the sixth example, only a subset of the first sensors may, for example, be located at positions at which the first lines and the second lines intersect each other. The sensors may also be located independently of the positions of the seams. In an alternative configuration, the outer covering member may not include first lines and second lines formed by seams.

Although a pressure sensor is given as an example of a sensor in the sixth example, the sensor may be a sensor for detecting the occupant other than a pressure sensor, such as a capacitance sensor or an optical sensor. The number and positions of the sensors can be determined as appropriate.

Although the first cushion 70 and the second cushion 80 comprise sensors in the sixth example, for example, only one of the first cushion and the second cushion may include sensors, and the other may not include sensors. In an alternative configuration, both of the first cushion and the second cushion may not include sensors.

Although the first cushion 70 and the second cushion 80 are connected by wirings 63, 64 in the sixth example, the first cushion 70 and the second cushion 80 may be connected by a member other than a wiring, such as a member dedicated for connecting the cushions. The first cushion 70 and the second cushion 80 may also be connected by being integrally formed in one piece. In an alternative configuration, the seat cushion may not comprise wirings, and the first cushion and the second cushion may be completely separated apart from one another.

Although the second cushion 80 comprises a second band 82 comprising a second fixing portion 84 and a second to-be-fixed portion 85 with which the second fixing portion 84 is disengageably engaged, the second cushion may be fixed to the backrest by an expandable band having a first end fixed to the right side portion of the second cushion body and a second end fixed to the left side portion of the second cushion. Further, if the first cushion and the second cushion are integrally formed in one piece, only the first cushion may be fixed to the seat, and the second cushion may not be fixed to the seat.

By using the seat cushion including sensors, the seat systems of the above-described first, second, third, fourth, and fifth examples may be implemented in a seat such as a chair that does not include sensors. The elements described in the above example embodiments and its modified examples may be implemented selectively and in combination.

What is claimed is:

1. A seat system comprising:
- a seat, comprising:
  - a seat body, and
  - a plurality of sensors configured to acquire information for use in detecting a motion of a user seated on the seat body;
- a controller; and
- a terminal comprising:
  - a screen,
    - wherein the controller is configured to:
      - acquire the information from the sensors, and
      - cause an object operated by the user to move based on the information acquired from the sensors, and
      - cause a movable object on the screen to move according to a motion of the object operated by the user,
    - wherein the screen comprises:
      - a first screen, and
      - a second screen disposed on the right of the first screen, and
    - wherein the controller is further configured to:
      - cause the object operated by the user to move onto the second screen if it is determined, based on the information acquired from the sensors, that the object operated by the user is located at a right end of the first screen and is heading to the right.

2. The seat system according to claim 1, wherein the movable object is a character representing an animal, and wherein the controller is further configured to:

determine, based on the information acquired from the sensors, that the user has made a first motion to feed the character, display a food icon for the animal on the screen, and cause the character to move toward a location of the food icon.

3. The seat system according to claim 1, wherein the movable object is a character representing an animal, and wherein the controller is further configured to:

determine, based on the information acquired from the sensors, that the user has made a second motion to attack the character, display an image indicating the attack on the screen, and cause the character to run away or to fall to the ground.

4. The seat system according to claim 1, wherein the movable object is a character representing an animal, and wherein the controller is further configured to:

determine whether an output value from the sensors has changed, and cause the character on the screen to increase in number if it is determined that the output value from the sensors has not changed, or cause the character on the screen to run away if it is determined that the output value from the sensors has changed.

5. The seat system according to claim 3, wherein the controller is further configured to:

determine that the user is surprised if an amount of fluctuation per unit time in an output value of the sensors is greater than a predetermined value, and display an image indicating a surprise on the screen.

6. The seat system according to claim 5, wherein the controller is further configured to:

cause the character on the screen to increase in number if it is determined that the user is surprised.

7. A seat system, comprising:

a seat, comprising:

a seat body, and a plurality of sensors configured to acquire information for use in detecting a motion of a user seated on the seat body;

a controller;

a terminal, comprising:

a screen; and a height-adjustment mechanism configured to change a height of at least a part of the seat body, wherein the controller is configured to:

acquire the information from the plurality of sensors, cause an object operated by the user to move based on the information acquired from the sensors, and cause a movable object on the screen to move according to a motion of the object operated by the user; and wherein the seat body comprises a seat bottom, wherein the plurality of sensors comprise:

a plurality of pressure sensors provided at the seat bottom, and the plurality of pressure sensors are configured to detect pressures exerted on a seating surface of the seat bottom, the plurality of pressure sensors comprising:

a front-right sensor located frontward in the front-rear direction and rightward in the left-right direction of a midsection of the seating surface of the seat bottom; and a front-left sensor located frontward in the front-rear direction and leftward in the left-right direction of the midsection of the seating surface of the seat bottom, and wherein the controller is further configured to:

control the height-adjustment mechanism to change the height of at least the part of the seat body such that pressures detected by the front-right sensor and the front-left sensor satisfy a predetermined condition.

8. The seat system according to claim 7, wherein the controller is further configured to:

move the seat bottom upward if it is determined that the pressures detected by the front-right sensor and the front-left sensor are equal to or smaller than a predetermined value, and stop the seat bottom when amounts of change per unit time in the pressures detected by the front-right sensor and the front-left sensor become equal to or smaller than a first threshold value.

9. The seat system according to claim 7, wherein the controller is further configured to:

move the seat bottom downward, if it is determined that the pressures detected by the front-right sensor and the front-left sensor are not equal to or smaller than a predetermined value, until amounts of change per unit time in the pressures detected by the front-right sensor and the front-left sensor become equal to or greater than a second threshold value, move the seat bottom upward, and stop the seat bottom when the amounts of change per unit time in the pressures detected by the front-right sensor and the front-left sensor become equal to or smaller than a first threshold value.

10. The seat system according to claim 7, wherein the seat body comprises:

a seat bottom, and a footrest configured to support a foot of an occupant seated on the seat bottom, wherein the height-adjustment mechanism comprises:

a footrest-adjustment mechanism configured to change a height of the footrest relative to the seat bottom, and wherein the controller is further configured to:

control the footrest-adjustment mechanism to change the height of the footrest such that the pressures detected by the front-right sensor and the front-left sensor satisfy a predetermined condition.

11. The seat system according to claim 10, wherein the controller is further configured to:

move the footrest downward if it is determined that the pressures detected by the front-right sensor and the front-left sensor are equal to or smaller than a predetermined value, and stop the footrest when amounts of change per unit time in the pressures detected by the front-right sensor and the front-left sensor become equal to or smaller than a first threshold value.

12. The seat system according to claim 10, wherein the controller is further configured to:

move the footrest upward, if it is determined that the pressures detected by the front-right sensor and the front-left sensor are not equal to or smaller than a predetermined value, until amounts of change per unit time in the pressures detected by the front-right sensor and the front-left sensor become equal to or greater than a second threshold value, and move the footrest downward, and stop the footrest when the amounts of change per unit time in the pressures detected by the front-right sensor and the front-left sensor become equal to or smaller than a first threshold value.

13. The seat system according to claim 8, wherein the first threshold value is a value greater than zero.

14. The seat system according to claim 7, wherein the controller is further configured to:

determine that a right leg of an occupant seated on the seat body has been lifted based on a pressure detected by the front-right sensor decreasing; and determine that a left leg of the occupant seated on the seat body has been lifted based on a pressure detected by the front-left sensor decreasing.

15. A seat system, comprising:

a seat, comprising:

a seat body, and a plurality of sensors configured to acquire information for use in detecting a motion of a user seated on the seat body;

a controller; and a terminal, comprising:

a screen, and wherein the controller is configured to:

acquire the information from the plurality of sensors, cause an object operated by the user to move based on the information acquired from the sensors, and cause a movable object on the screen to move according to a motion of the object operated by the user, wherein the seat body comprises:

a seat bottom, and a backrest, wherein the seat further comprises:

a seat cushion placed and used on the seat body, the seat cushion comprising:

a first cushion placed on the seat bottom, the first cushion having:

a seating surface facing an occupant, and a mounting surface facing the seat bottom, the first cushion comprising:

a first band extending from one of a right side portion and a left side portion of the first cushion, the first band comprising:

a first fixing portion fixed to another of the right side portion and the left side portion; and a first to-be-fixed portion disengageably engaged with the first fixing portion; and a second cushion placed on the backrest;

wherein, when the seat cushion is in a state for storage, the first band allows the first fixing portion to be engaged with the first to-be-fixed portion, with the second cushion being sandwiched between the first band and the seating surface, and wherein when the seat cushion is placed on the seat bottom, the first band allows the first fixing portion to be engaged with the first to-be-fixed portion, with the seat bottom being sandwiched between the first band and the mounting surface.

16. A seat system according to claim 15, wherein the first cushion further comprises:

a first ancillary band extending from the another of the right side portion or the left side portion of the first cushion, and wherein the first to-be-fixed portion is provided on the first ancillary band.

17. A seat system according to claim 15, wherein the sensors comprise:

a sensor provided at the first cushion for detecting the occupant, and a sensor provided at the second cushion for detecting the occupant.

18. A seat system according to claim 17, wherein the sensors are pressure sensors.

19. The seat system according to claim 17, wherein the first cushion and the second cushion both comprise:

outer coverings, the outer coverings including:

a first line formed by a seam extending in a left-right direction, and a second line formed by a seam extending in a direction intersecting the left-right direction, and wherein at least one of the sensors is located at a position in which the first line intersects the second line.

20. A seat system according to claim 17, further comprising:

a first wiring that extends from the second cushion, the first wiring being connected to the sensor of the second cushion; and a cover that covers a post of the backrest and the first wiring disposed along the post when the second cushion is placed on the backrest.

21. A seat system according to claim 17, wherein the controller is connected to the sensor of the first cushion and the sensor of the second cushion, and wherein, when the seat cushion is placed on the seat bottom and the controller is located under the seat bottom, the first band allows the first fixing portion to be engaged with the first to-be-fixed portion, with the seat bottom and the controller being sandwiched between the first band and the mounting surface.

22. A seat system according to claim 15, wherein the second cushion comprises:

a second band extending from an upper end of the second cushion, the second band comprising a second fixing portion fixed to a lower end of the second cushion;

a second to-be-fixed portion disengageably engaged with the second fixing portion; and an opposing surface facing the backrest; and wherein the second band is engaged with the second to-be-fixed portion, with the backrest being sandwiched between the second band and the opposing surface.

23. A seat system according to claim 22, wherein the second cushion further comprises a second ancillary band extending from the lower end of the second cushion, and wherein the second to-be-fixed portion is provided on the second ancillary band.

24. A seat system according to claim 15, wherein the first fixing portion and the first to-be-fixed portion form a slide fastener, the slide fastener comprising a two-sided slider.

* * * * *